United States Patent [19]
Konno

[11] Patent Number: 6,081,390
[45] Date of Patent: Jun. 27, 2000

[54] ZOOM LENS SYSTEM HAVING CAMERA SHAKE COMPENSATING FUNCTION

[75] Inventor: Kenji Konno, Sakai, Japan

[73] Assignee: Minolta Co., Ltd., Osaka, Japan

[21] Appl. No.: 09/130,266

[22] Filed: Aug. 6, 1998

[30] Foreign Application Priority Data

Aug. 7, 1997 [JP] Japan .................................. 9-213673
Aug. 8, 1997 [JP] Japan .................................. 9-214974

[51] Int. Cl.$^7$ ............................ G02B 15/14; G02B 27/64
[52] U.S. Cl. ...................... 359/689; 359/676; 359/554; 359/557
[58] Field of Search .................................. 359/676, 689, 359/554, 557

[56] References Cited

U.S. PATENT DOCUMENTS 5,638,210   6/1997   Sato et al. ................................. 359/557
5,760,958   6/1998   Shibayama ................................ 359/557

FOREIGN PATENT DOCUMENTS 6-130203   5/1994   Japan .
6-265826   9/1994   Japan .
6-265827   9/1994   Japan .
7-318865   12/1995  Japan .
8-101362   4/1996   Japan .

Primary Examiner—Georgia Epps
Assistant Examiner—Michael A Lucas
Attorney, Agent, or Firm—Sidley & Austin

[57] ABSTRACT

A zoom lens system has at least three lens units. A first lens unit situated at an object side of the zoom lens system has a positive optical power. Zooming is performed by varying distances among the lens units. A camera shake compensating lens unit, including at least one positive lens element and at least one negative lens element, is provided in the first lens unit. The camera shake compensating lens unit is parallelly decentered to perform camera shake compensation. The ratio of the focal length f of the zoom lens system to the composite lateral magnification ($\beta r$) of the lens units situated on the image side of the camera shake compensating lens unit fulfills a condition $30 < f/\beta r < 120$.

20 Claims, 46 Drawing Sheets

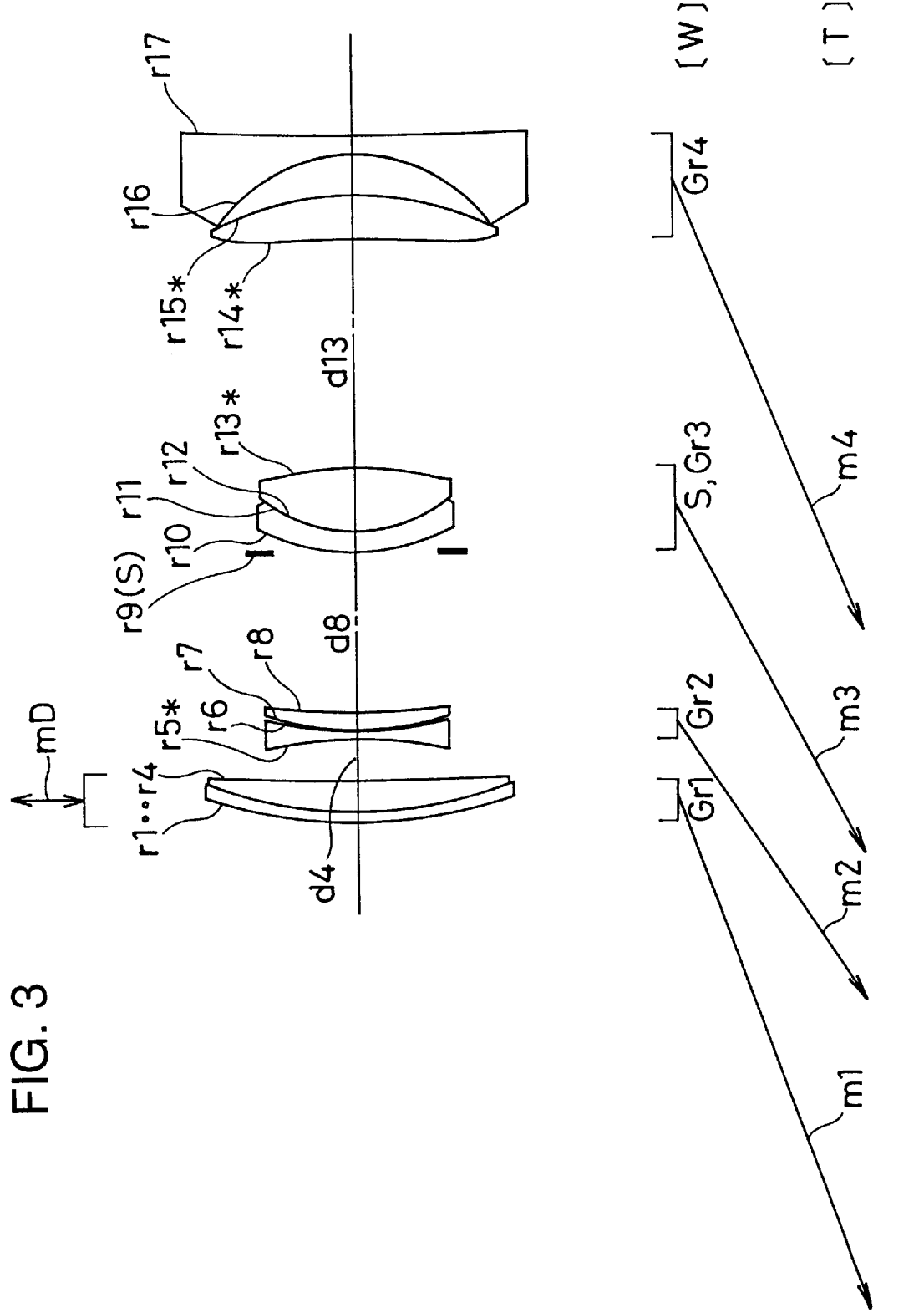

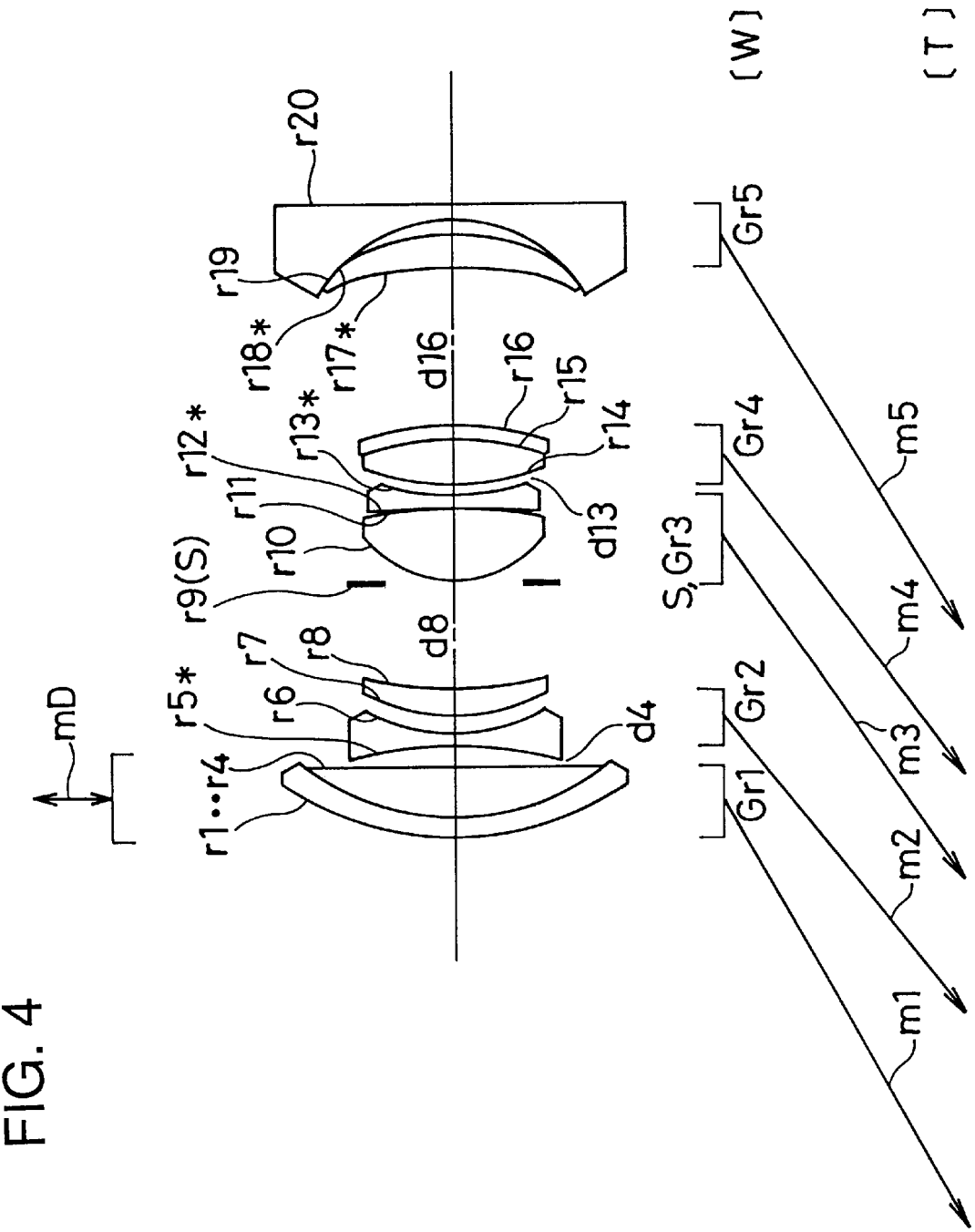

FNO=3.60

-0.5   0.5
SPHERICAL SINE
ABERRATION CONDITION

Y'=17.3

-0.5   0.5
ASTIGMATISM

Y'=17.3

-5.0   5.0
DISTORTION %

FNO=7.84

-0.5   0.5
SPHERICAL SINE
ABERRATION CONDITION

Y'=17.3

-0.5   0.5
ASTIGMATISM

Y'=17.3

-5.0   5.0
DISTORTION %

FNO=10.45

-0.5   0.5
SPHERICAL SINE
ABERRATION CONDITION

Y'=17.3

-0.5   0.5
ASTIGMATISM

Y'=17.3

-5.0   5.0
DISTORTION %

FNO=5.60

— d
---- SC

-0.5  0.5
SPHERICAL SINE
ABERRATION CONDITION

Y'=17.3

---- DM
— DS

-0.5  0.5
ASTIGMATISM

Y'=17.3

-5.0  5.0
DISTORTION %

FNO=8.00

— d
---- SC

-0.5  0.5
SPHERICAL SINE
ABERRATION CONDITION

Y'=17.3

---- DM
— DS

-0.5  0.5
ASTIGMATISM

Y'=17.3

-5.0  5.0
DISTORTION %

FNO=12.00

— d
---- SC

-0.5  0.5
SPHERICAL SINE
ABERRATION CONDITION

Y'=17.3

---- DM
— DS

-0.5  0.5
ASTIGMATISM

Y'=17.3

-5.0  5.0
DISTORTION %

EFFECTIVE FNO=6.18
— d
---- SC
-0.5   0.5
SPHERICAL SINE
ABERRATION CONDITION

Y'=17.3
---- DM
— DS
-0.5   0.5
ASTIGMATISM

Y'=17.3
-5.0   5.0
DISTORTION %

EFFECTIVE FNO=18.08
— d
---- SC
-0.5   0.5
SPHERICAL SINE
ABERRATION CONDITION

Y'=17.3
---- DM
— DS
-0.5   0.5
ASTIGMATISM

Y'=17.3
-5.0   5.0
DISTORTION %

FNO=4.50

—— d
----- SC

-0.5  0.5
SPHERICAL SINE
ABERRATION CONDITION

Y'=17.3

----- DM
—— DS

-0.5  0.5
ASTIGMATISM

Y'=17.3

-5.0  5.0
DISTORTION %

FNO=7.00

—— d
----- SC

-0.5  0.5
SPHERICAL SINE
ABERRATION CONDITION

Y'=17.3

----- DM
—— DS

-0.5  0.5
ASTIGMATISM

Y'=17.3

-5.0  5.0
DISTORTION %

FNO=10.00

—— d
----- SC

-0.5  0.5
SPHERICAL SINE
ABERRATION CONDITION

Y'=17.3

----- DM
—— DS

-0.5  0.5
ASTIGMATISM

Y'=17.3

-5.0  5.0
DISTORTION %

FNO=5.76
—— d
---- SC
-0.5   0.5
SPHERICAL SINE
ABERRATION CONDITION

Y'=17.3
---- DM
—— DS
-0.5   0.5
ASTIGMATISM

Y'=17.3
-5.0   5.0
DISTORTION %

FNO=7.40
—— d
---- SC
-0.5   0.5
SPHERICAL SINE
ABERRATION CONDITION

Y'=17.3
---- DM
—— DS
-0.5   0.5
ASTIGMATISM

Y'=17.3
-5.0   5.0
DISTORTION %

FNO=10.20
—— d
---- SC
-0.5   0.5
SPHERICAL SINE
ABERRATION CONDITION

Y'=17.3
---- DM
—— DS
-0.5   0.5
ASTIGMATISM

Y'=17.3
-5.0   5.0
DISTORTION %

FNO=5.76

-0.5　0.5
SPHERICAL　SINE
ABERRATION　CONDITION
— d
----- SC

Y'=17.3

-0.5　0.5
ASTIGMATISM
----- DM
— DS

Y'=17.3

-5.0　5.0
DISTORTION %

FNO=8.00

-0.5　0.5
SPHERICAL　SINE
ABERRATION　CONDITION
— d
----- SC

Y'=17.3

-0.5　0.5
ASTIGMATISM
----- DM
— DS

Y'=17.3

-5.0　5.0
DISTORTION %

FNO=12.00

-0.5　0.5
SPHERICAL　SINE
ABERRATION　CONDITION
— d
----- SC

Y'=17.3

-0.5　0.5
ASTIGMATISM
----- DM
— DS

Y'=17.3

-5.0　5.0
DISTORTION %

EFFECTIVE FNO=6.07
-0.5  0.5
SPHERICAL SINE
ABERRATION CONDITION

Y'=17.3
-0.5  0.5
ASTIGMATISM

Y'=17.3
-5.0  5.0
DISTORTION %

EFFECTIVE FNO=16.62
-0.5  0.5
SPHERICAL SINE
ABERRATION CONDITION

Y'=17.3
-0.5  0.5
ASTIGMATISM

Y'=17.3
-5.0  5.0
DISTORTION %

FNO=5.76

-0.5  0.5
SPHERICAL   SINE
ABERRATION  CONDITION

Y'=17.3

-0.5  0.5
ASTIGMATISM

Y'=17.3

-5.0  5.0
DISTORTION %

FNO=7.40

-0.5  0.5
SPHERICAL   SINE
ABERRATION  CONDITION

Y'=17.3

-0.5  0.5
ASTIGMATISM

Y'=17.3

-5.0  5.0
DISTORTION %

FNO=10.20

-0.5  0.5
SPHERICAL   SINE
ABERRATION  CONDITION

Y'=17.3

-0.5  0.5
ASTIGMATISM

Y'=17.3

-5.0  5.0
DISTORTION %

EFFECTIVE FNO=5.99
—— d
---- SC
SPHERICAL SINE
ABERRATION CONDITION

Y'=17.3
---- DM
—— DS
ASTIGMATISM

Y'=17.3
DISTORTION %

EFFECTIVE FNO=11.70
—— d
---- SC
SPHERICAL SINE
ABERRATION CONDITION

Y'=17.3
---- DM
—— DS
ASTIGMATISM

Y'=17.3
DISTORTION %

FNO=5.76

—— d
---- SC

-0.5  0.5
SPHERICAL  SINE
ABERRATION  CONDITION

Y'=17.3

---- DM
—— DS

-0.5  0.5
ASTIGMATISM

Y'=17.3

-5.0  5.0
DISTORTION %

FNO=7.86

—— d
---- SC

-0.5  0.5
SPHERICAL  SINE
ABERRATION  CONDITION

Y'=17.3

---- DM
—— DS

-0.5  0.5
ASTIGMATISM

Y'=17.3

-5.0  5.0
DISTORTION %

FNO=11.30

—— d
---- SC

-0.5  0.5
SPHERICAL  SINE
ABERRATION  CONDITION

Y'=17.3

---- DM
—— DS

-0.5  0.5
ASTIGMATISM

Y'=17.3

-5.0  5.0
DISTORTION %

EFFECTIVE FNO=5.94
—— d
---- SC
-0.5   0.5
SPHERICAL SINE
ABERRATION CONDITION

Y'=17.3
---- DM
—— DS
-0.5   0.5
ASTIGMATISM

Y'=17.3
-5.0   5.0
DISTORTION %

EFFECTIVE FNO=13.61
—— d
---- SC
-0.5   0.5
SPHERICAL SINE
ABERRATION CONDITION

Y'=17.3
---- DM
—— DS
-0.5   0.5
ASTIGMATISM

Y'=17.3
-5.0   5.0
DISTORTION %

FNO=5.76

-0.5　0.5
SPHERICAL　SINE
ABERRATION　CONDITION

— d
----- SC

Y'=17.3

-0.5　0.5
ASTIGMATISM

----- DM
——— DS

Y'=17.3

-5.0　5.0
DISTORTION %

FNO=8.00

-0.5　0.5
SPHERICAL　SINE
ABERRATION　CONDITION

— d
----- SC

Y'=17.3

-0.5　0.5
ASTIGMATISM

----- DM
——— DS

Y'=17.3

-5.0　5.0
DISTORTION %

FNO=12.00

-0.5　0.5
SPHERICAL　SINE
ABERRATION　CONDITION

— d
----- SC

Y'=17.3

-0.5　0.5
ASTIGMATISM

----- DM
——— DS

Y'=17.3

-5.0　5.0
DISTORTION %

EFFECTIVE FNO=6.04
-0.5  0.5
SPHERICAL SINE
ABERRATION CONDITION

Y'=17.3
-0.5  0.5
ASTIGMATISM

Y'=17.3
-5.0  5.0
DISTORTION %

EFFECTIVE FNO=16.99
-0.5  0.5
SPHERICAL SINE
ABERRATION CONDITION

Y'=17.3
-0.5  0.5
ASTIGMATISM

Y'=17.3
-5.0  5.0
DISTORTION %

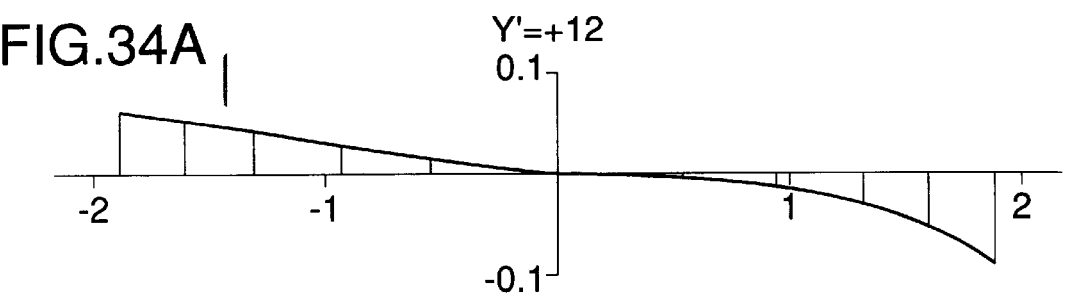
FIG.34A  Y'=+12
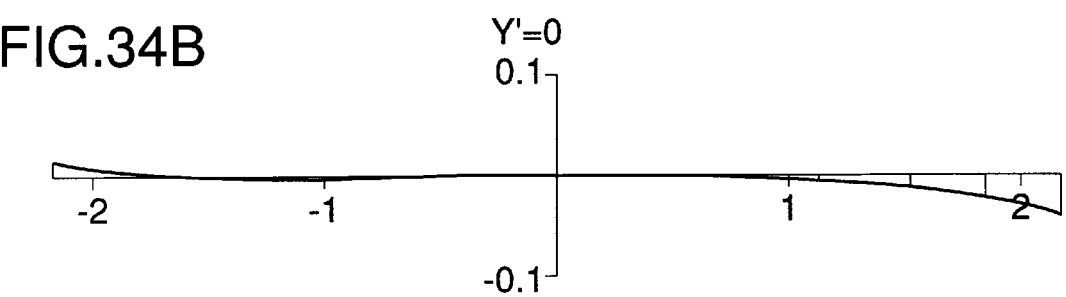
FIG.34B  Y'=0
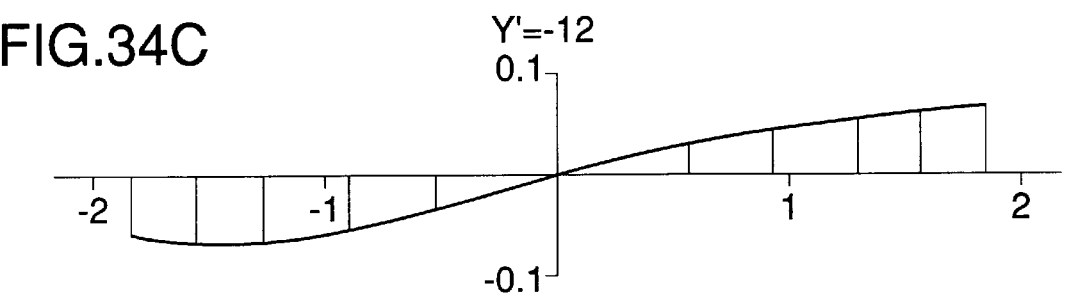
FIG.34C  Y'=−12
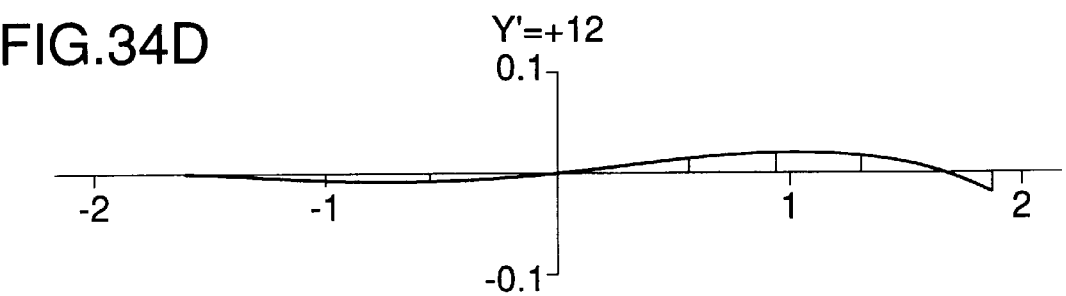
FIG.34D  Y'=+12
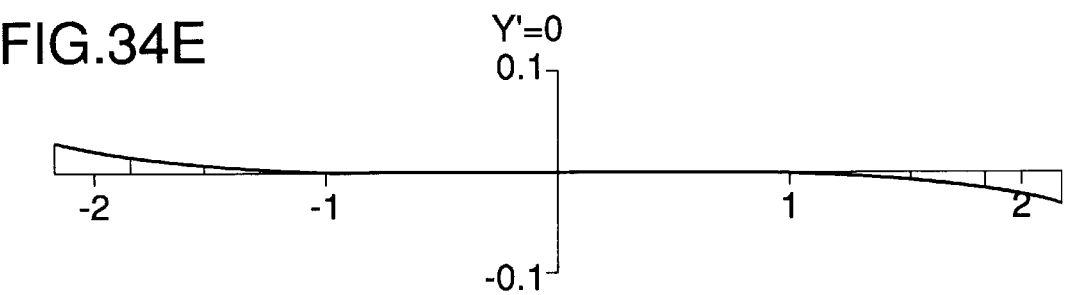
FIG.34E  Y'=0

ZOOM LENS SYSTEM HAVING CAMERA SHAKE COMPENSATING FUNCTION

This application is based on applications Nos. H9-213673 and H9-214974 filed in Japan, the contents of which are hereby incorporated by reference.

BACKGROUND OF THE INVENTION

1. Field of the Invention

The present invention relates to a zoom lens system having a camera shake compensating function, and more specifically, to a zoom lens system having a camera shake compensating function being suitable for use in lens-shutter cameras, said zoom lens system being capable of preventing image blurs due to camera shake (for example, vibrations caused when photographing is performed with the camera being hand held).

2. Description of the Prior Art

Conventionally, failures in photographing have resulted mostly from camera shake and being conducted in an out-of-focus state. In recent years, however, the automatic focusing mechanism has been employed in most cameras and as the focusing accuracy of the automatic focusing mechanism improves, the failure in photographing due to an out-of-focus state has been virtually solved. On the other hand, lens systems which come standard on cameras have shifted from fixed focal length lens systems to zoom lens systems. As a result, at present, it is no exaggeration to say that failures in photographing are caused by camera shake. For this reason, a camera shake compensating function is indispensable to zoom lens systems.

With the intention of solving this problem, various zoom lens systems have been proposed. For example, Japanese Laid-open Patent Application H8-101362 discloses a five-unit zoom lens system of positive, negative, positive, positive, negative configuration in which a fourth lens unit is subdivided into three units and the central lens unit of the three is parallelly decentered to perform camera shake compensation. Japanese Laid-open Patent Application No. H6-265827 discloses a three-unit zoom lens system of positive, positive, negative configuration in which a second lens unit is subdivided into front and rear lens units and the rear lens unit is parallelly decentered to perform camera shake compensation. Japanese Laid-open Patent Application No. H7-318865 discloses a five-unit zoom lens system of positive, negative, positive, positive, negative configuration in which a fourth lens unit is parallelly decentered to perform camera shake compensation. Japanese Laid-open Patent Application No. H6-265856 discloses a two-unit zoom lens system of positive, negative configuration in which a first lens unit is parallelly decentered to perform camera shake compensation. Japanese Laid-open Patent Application No. H6-130203 discloses a three-unit zoom lens system of positive, positive, negative configuration in which a second lens unit comprises a lens unit having a transparent liquid sealed therein and the lens unit is inclined to perform camera shake compensation.

However, in the zoom lens systems disclosed in Japanese Laid-open Patent Applications Nos. H8-101362, H6-265827 and H7-318865, since the movement amount of the camera shake compensating lens unit varies according to the focal length, it is necessary to provide means for detecting the focal length during zooming to calculate the camera shake compensation drive amount. This increases cost. Since the movement of the axial image point and the movement of the off-axial image point are different from each other during camera shake compensation, the off-axial image point largely moves, so that excellent optical performance cannot be obtained. In the zoom lens system disclosed in Japanese Laid-open Patent Application No. H6-265856, although the first lens unit is parallelly decentered, magnification can be varied only up to approximately 2x since there are only two zooming units, so that a higher magnification cannot be achieved. In the zoom lens system disclosed in Japanese Laid-open Patent Application No. H6-130203, when the lens unit having a transparent liquid sealed therein is inclined to perform camera shake compensation, axial chromatic aberration is generated. Since it is difficult to correct the axial chromatic aberration, excellent imaging quality cannot be obtained.

SUMMARY OF THE INVENTION

An object of the present invention is to provide a compact, high-magnification zoom lens system having a camera shake compensating function in which excellent optical performance is obtained even when large camera shake occurs.

To achieve the above-mentioned object, in a zoom lens system according to the present invention comprising at least three lens units in which a first lens unit situated at the most object side has a positive optical power and the distances among the lens units are varied to perform zooming, a camera shake compensating lens unit including at least one positive lens element and at least one negative lens element is provided in the first lens unit and the camera shake compensating lens unit is parallelly decentered to perform camera shake compensation. The ratio of the focal length f of the entire lens system to the composite lateral magnification $\beta r$ of the lens units situated on the image side of the camera shake compensating lens unit fulfills a condition $30 < f/\beta r < 120$ at a given position during zooming.

Moreover, to achieve the above-mentioned object, in a zoom lens system according to the present invention comprising from the object side, a first lens unit having a positive optical power, a second lens unit having a negative optical power, and a third lens unit having a positive optical power, and with a rearmost lens unit having a negative optical power at the most image side, wherein the third lens unit is the camera shake compensating lens unit including at least one positive lens element and at least one negative lens element. The third lens unit is decentered in a direction perpendicular to the optical axis to perform camera shake compensation. At a given position during zooming, the relationship among the focal length f of the entire lens system, the composite lateral magnification $\beta r$ of the lens units situated on the image side of the camera shake compensating lens units, and the lateral magnification $\beta d$ of the camera shake compensating lens unit fulfills a condition $8 < f/\{\beta r \times (1-\beta d)\} < 100$, and the ratio of the focal length $f_{last}$ of the rearmost lens unit and the focal length $f_w$ of the entire lens system at the shortest focal length condition fulfills a condition $-0.8 < f_{last}/f_w < -0.5$.

BRIEF DESCRIPTION OF THE DRAWINGS

This and other objects and features of this invention will become clear from the following description, taken in conjunction with the preferred embodiments with reference to the accompanied drawings in which:

FIG. 3 shows the lens arrangement of a third embodiment;

FIG. 4 shows the lens arrangement of a fourth embodiment;

FIG. 34A to 34E are graphic representations of meridional lateral aberrations of the fifth embodiment in a pre-and post-decentering states, at a shortest focal length condition, and in an infinity shooting state;

DESCRIPTION OF THE PREFERRED EMBODIMENTS

Figure 1:
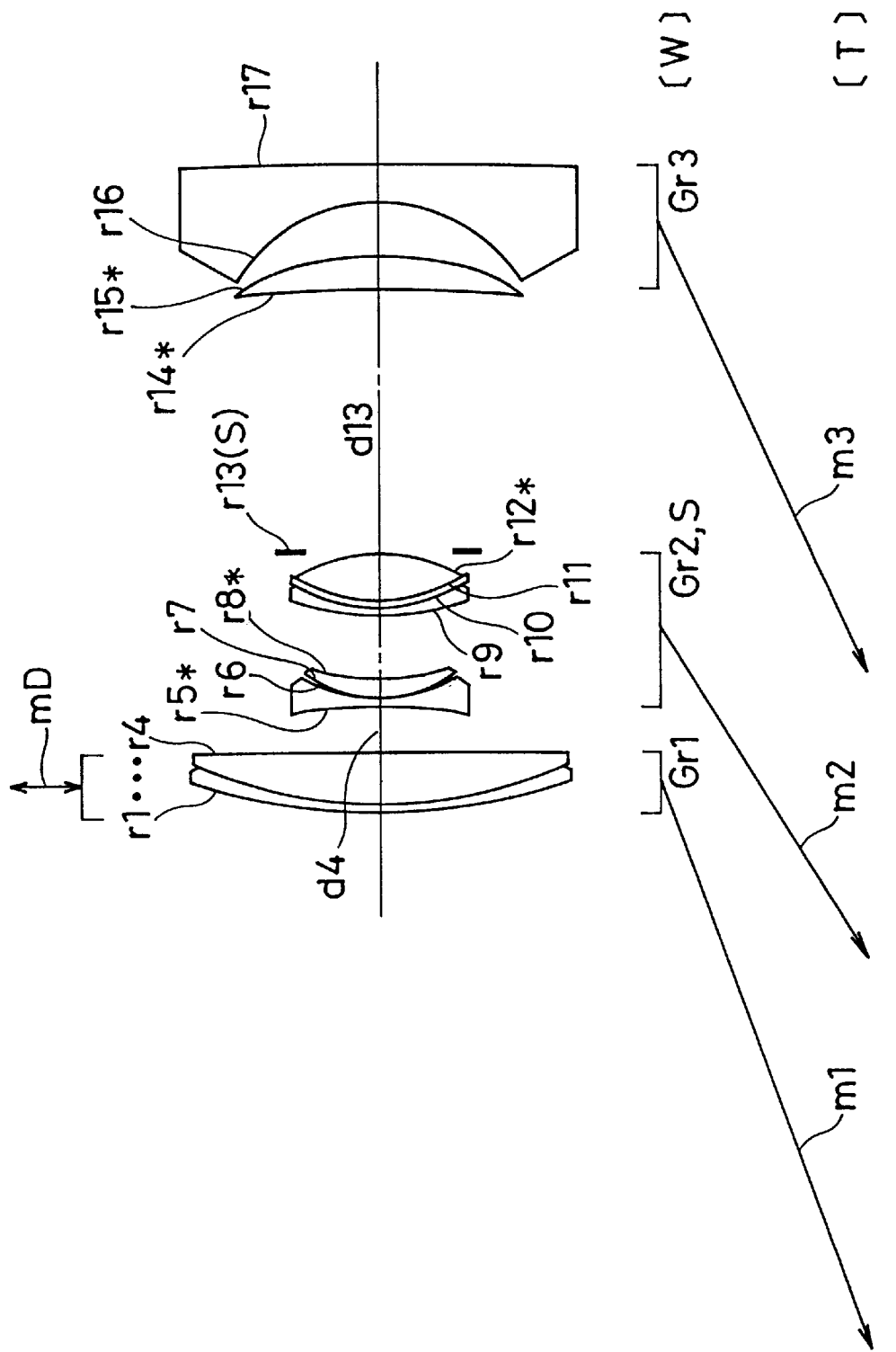
FIG. 1 shows the lens arrangement of a first embodiment.

Hereinafter, zoom lens systems having a camera shake compensating function embodying the present invention will be described with reference to the drawings. FIGS. 1 to 4 and 22 to 25 show the lens arrangements of first to eight embodiments at the shortest focal length condition [W], respectively. The arrows mi (i=1,2,3, . . . ) in the figures schematically show the movements of the ith lens units (Gri) during zooming from the shortest focal length condition [W] to the longest focal length condition [T]. In the figures, ri (i=1,2,3 . . . ) represents an ith surface counted from the object side, and the surfaces marked with asterisks at ri are aspherical. Of the ith axial distances counted from the object side, the axial distances between the lens units represented by di (i=1,2,3, . . . ) are variable distances which vary during zooming. In the figures, the arrow mD shows parallel decentering (i.e., movement in a direction perpendicular to the optical axis) of a camera shake compensating lens unit, and the arrow mF shows a focusing movement of a focusing lens unit.

A zoom lens system according to the first embodiment comprises, from the object side, a first lens unit Gr1 having a positive optical power, a second lens unit Gr2 having a positive optical power, and a third lens unit Gr3 having a negative optical power. As shown by the arrows m1 to m3 in FIG. 1, during zooming from the shortest focal length condition [W] to the longest focal length condition [T], the lens units move so that the distance between the first lens unit Gr1 and the second lens unit Gr2 increases and the distance between the second lens unit Gr2 and the third lens unit Gr3 decreases. Between the most image side surface of the second lens unit Gr2 and the most object side surface of the third lens unit Gr3, a diaphragm S which moves together with the second lens unit Gr2 during zooming is disposed.

A zoom lens system according to the second embodiment comprises, from the object side, a first lens unit Gr1 having a positive optical power, a second lens unit Gr2 having a positive optical power and a third lens unit Gr3 having a negative optical power. As shown by the arrows m1 to m3 in FIG. 2, during zooming from the shortest focal length condition [W] to the longest focal length condition [T], the lens units move so that the distance between the first lens unit Gr1 and the second lens unit Gr2 increases and the distance between the second lens unit Gr2 and the third lens unit Gr3 decreases. In the second lens unit Gr2, a diaphragm S which moves together with the second lens unit Gr2 during zooming is disposed.

A zoom lens system according to the third embodiment comprises, from the object side, a first lens unit Gr1 having a positive optical power, a second lens unit Gr2 having a negative optical power, a third lens unit Gr3 having a positive optical power and a fourth lens unit Gr4 having a negative optical power. As shown by the arrows m1 to m4 in FIG. 3, during zooming from the shortest focal length condition [W] to the longest focal length condition [T], the lens units move so that the distance between the first lens unit Gr1 and the second lens unit Gr2 increases, the distance between the second lens unit Gr2 and the third lens unit Gr3 decreases and the distance between the third lens unit Gr3 and the fourth lens unit Gr4 decreases. Between the most image side surface of the second lens unit Gr2 and the most object side surface of the third lens unit Gr3, a diaphragm S which moves together with the third lens unit Gr3 during zooming is disposed.

A zoom lens system according to the fourth embodiment comprises, from the object side, a first lens unit Gr1 having a positive optical power, a second lens unit Gr2 having a negative optical power, a third lens unit Gr3 having a positive optical power, a fourth lens unit Gr4 having a positive optical power and a fifth lens unit Gr5 having a negative optical power. As shown by the arrows m1 to m5 in FIG. 4, during zooming from the shortest focal length condition [W] to the longest focal length condition [T], the lens units move so that the distance between the first lens unit Gr1 and the second lens unit Gr2 increases, the distance between the second lens unit Gr2 and the third lens unit Gr3 decreases and the distance between the fourth lens unit Gr4 and the fifth lens unit Gr5 decreases. Between the most image side surface of the second lens unit Gr2 and the most object side surface of the third lens unit Gr3, a diaphragm S which moves together with the third lens unit Gr3 during zooming is disposed.

In the first embodiment, the lens units include the following lens elements from the object side: The first lens unit Gr1 includes a negative meniscus lens element convex to the object side and a positive lens element convex to the object side. The second lens unit Gr2 includes a bi-concave negative lens element, a positive lens element convex to the object side, a negative meniscus lens element convex to the object side and a bi-convex positive lens element. The third lens unit Gr3 includes a positive lens element convex to the image side and a negative lens element concave to the object side.

In the second embodiment, the lens units include the following lens elements from the object side: The first lens unit Gr1 includes a negative meniscus lens element convex to the object side and a positive lens element convex to the object side. The second lens unit Gr2 includes a bi-concave negative lens element, a positive lens element convex to the object side, a negative meniscus lens element convex to the object side and a bi-convex positive lens element. The third lens unit Gr3 includes a positive lens element convex to the image side and a negative lens element concave to the object side.

In the third embodiment, the lens units include the following lens elements from the object side: The first lens unit Gr1 includes a negative meniscus lens element convex to the object side and a positive lens element convex to the object side. The second lens unit Gr2 includes a bi-concave negative lens element and a positive lens element convex to the object side. The third lens unit Gr3 includes a negative meniscus lens convex to the object side and a bi-convex positive lens element. The fourth lens unit Gr4 includes a positive lens element convex to the image side and a negative lens element concave to the object side.

In the fourth embodiment, the lens units include the following lens elements from the object side: The first lens unit Gr1 includes a negative meniscus lens element convex to the object side and a positive lens element convex to the object side. The second lens unit Gr2 includes a bi-concave negative lens element and a positive lens element convex to the object side. The third lens unit Gr3 includes a bi-convex positive lens element and a negative lens element concave to the image side. The fourth lens unit Gr4 includes a bi-convex positive doublet lens element. The fifth lens unit Gr5 includes a positive lens element concave to the object side and a negative lens element concave to the object side.

Figure 2:
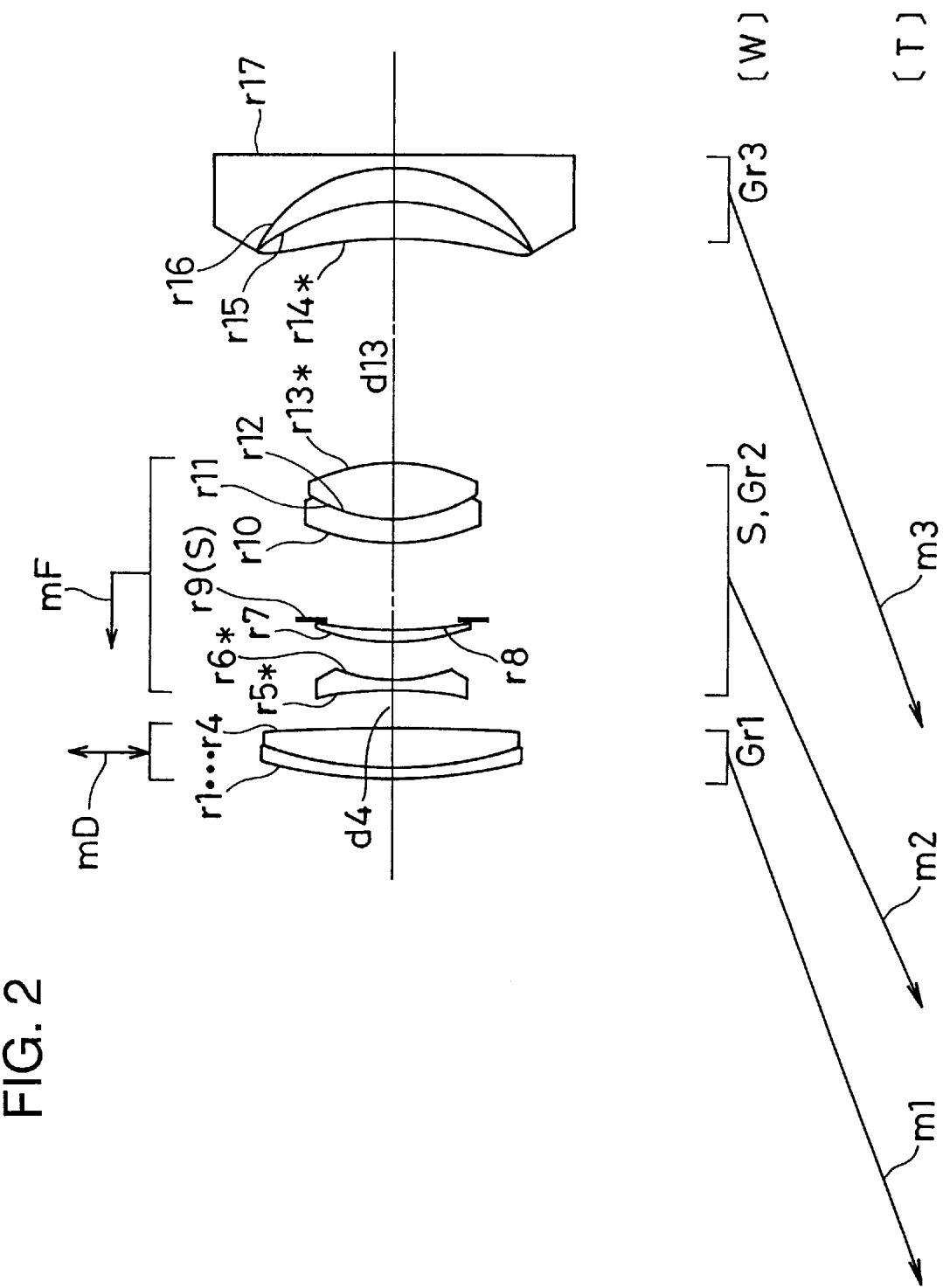
FIG. 2 shows the lens arrangement of a second embodiment.
Figure 5A:
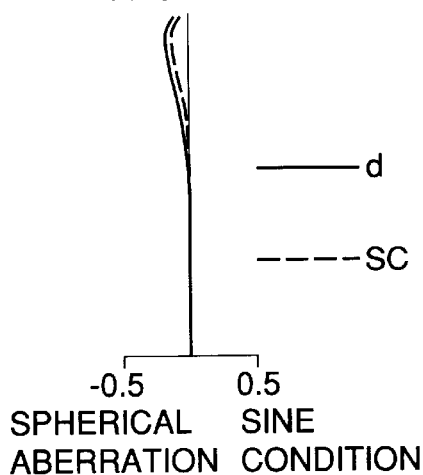
FIGS. 5A to 5I are graphic representations of longitudinal aberrations of the first embodiment in a pre-decentering state and in an infinity shooting state.
Figure 5B:
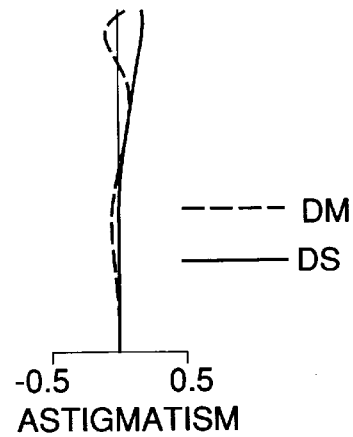
Figure 5C:
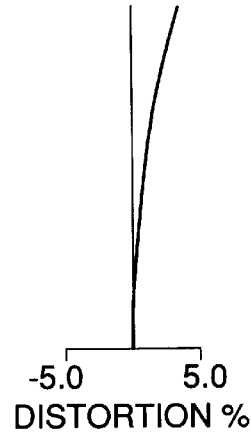
Figure 5D:
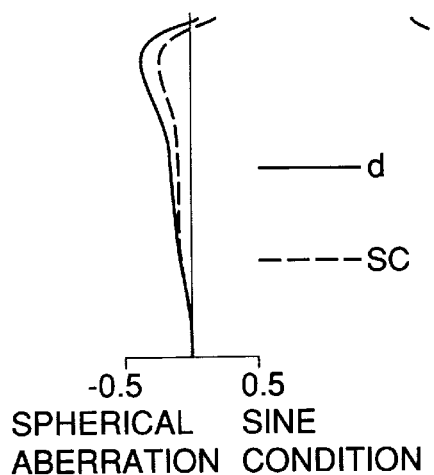
Figure 5E:
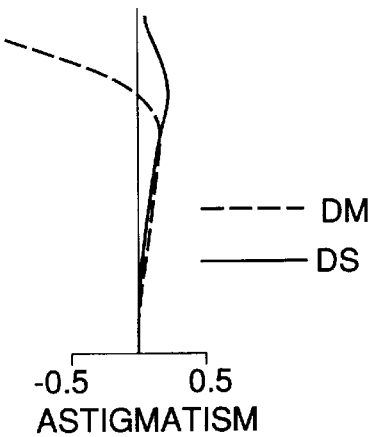
Figure 5F:
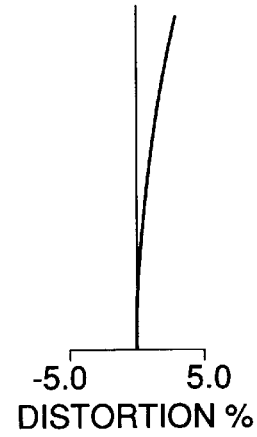
Figure 5G:
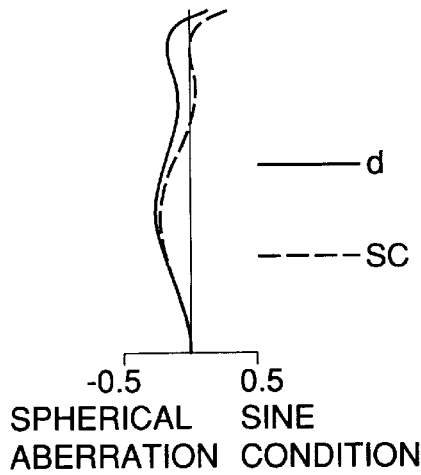
Figure 5H:
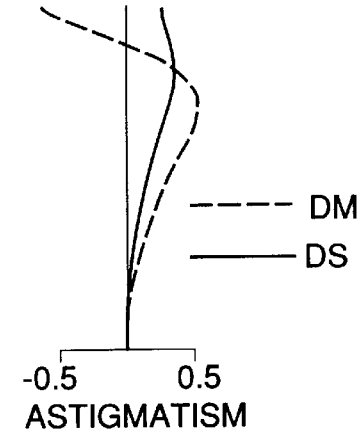
Figure 5I:
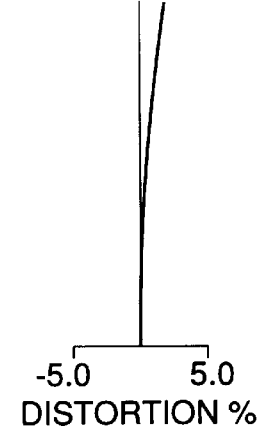
Figure 6A:
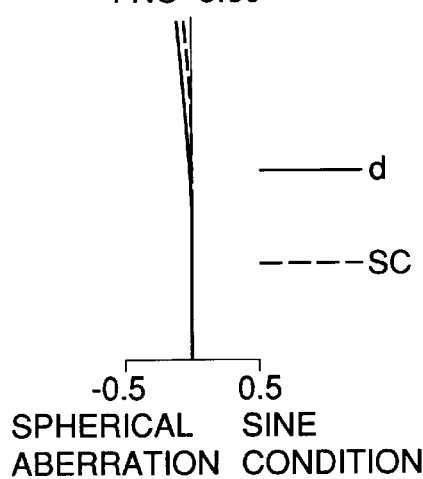
FIGS. 6A to 6I are graphic representations of longitudinal aberrations of the second embodiment in a pre-decentering state and in an infinity shooting state.
Figure 6B:
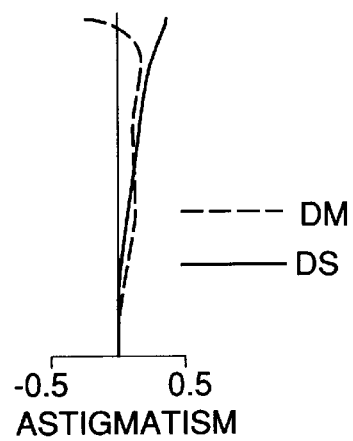
Figure 6C:
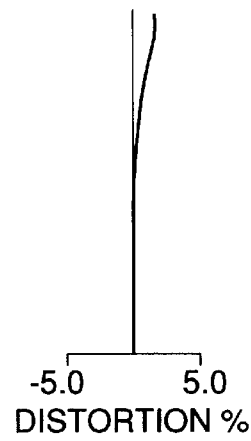
Figure 6D:
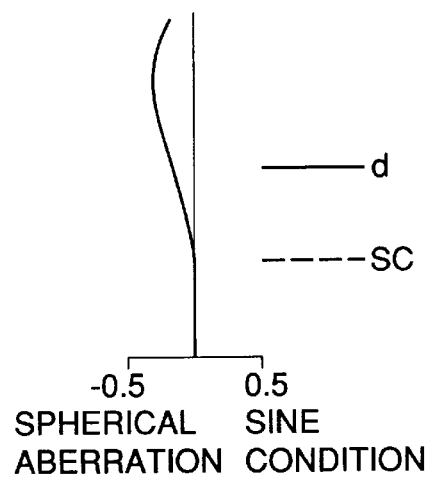
Figure 6E:
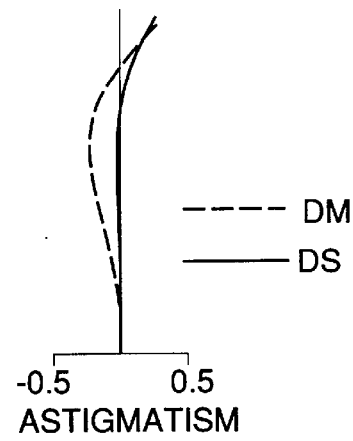
Figure 6F:
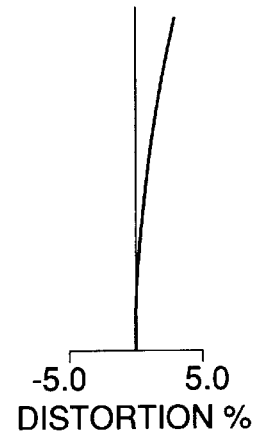
Figure 6G:
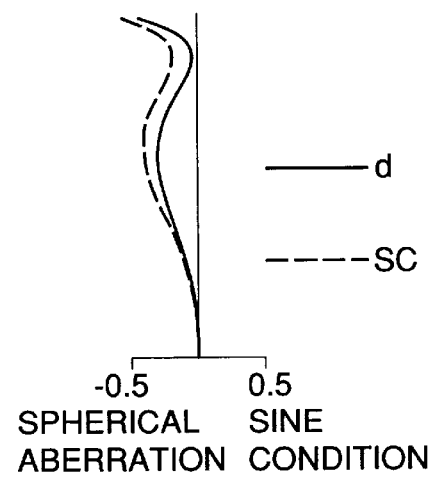
Figure 6H:
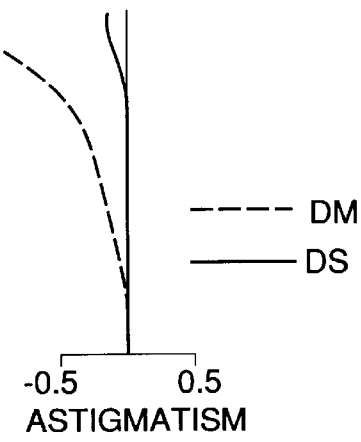
Figure 6I:
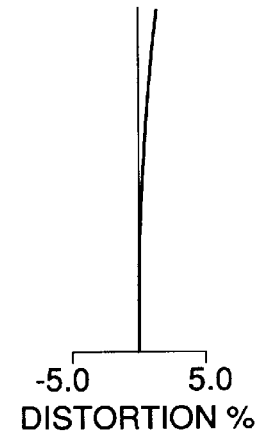
Figure 7A:
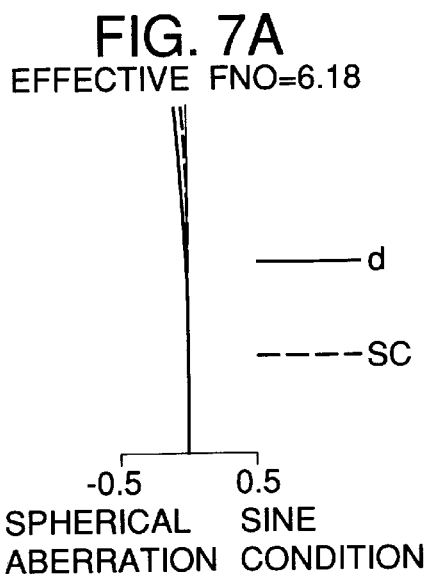
FIGS. 7A to 7F are graphic representations of longitudinal aberrations of the second embodiment in a pre-decentering state and in a close shooting state (shooting distance 50 cm)
Figure 7B:
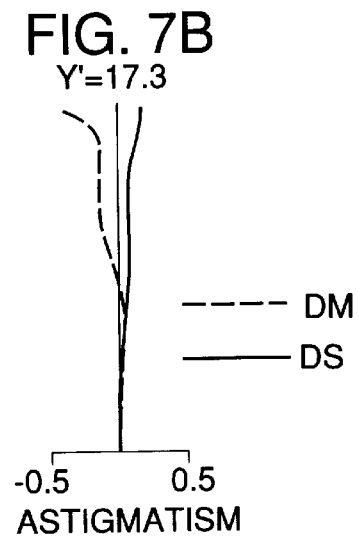
Figure 7C:
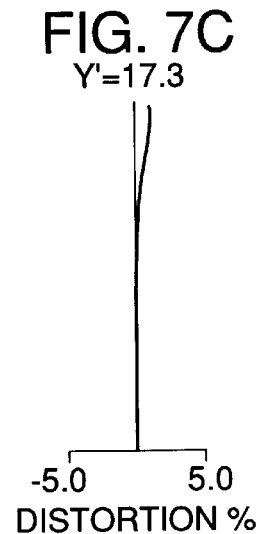
Figure 7D:
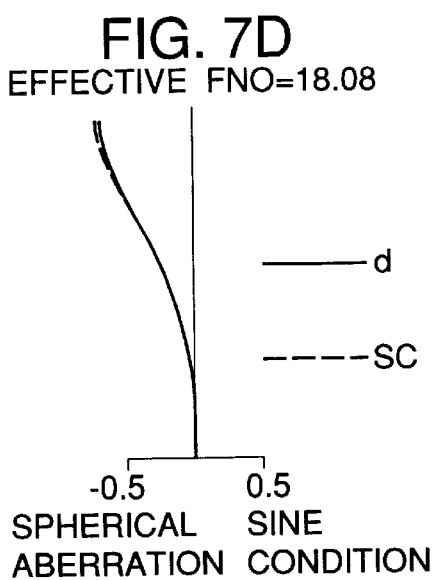
Figure 7E:
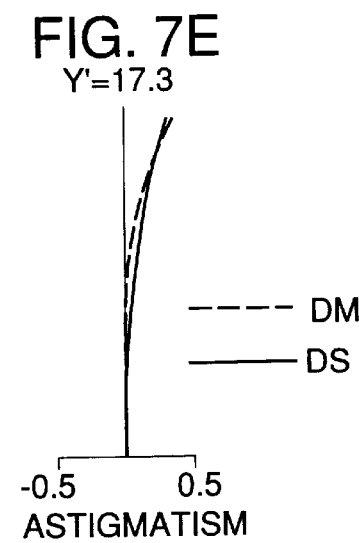
Figure 7F:
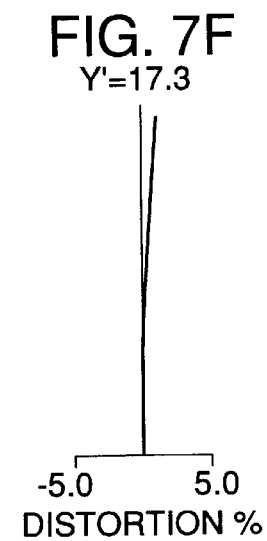
Figure 8A:
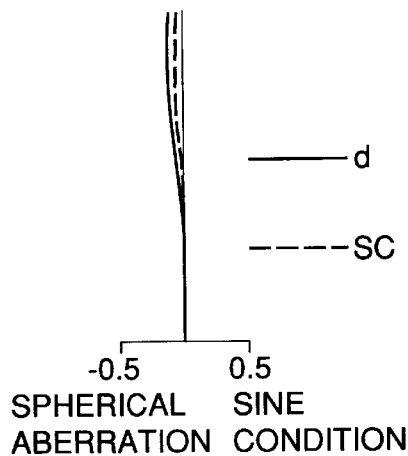
FIGS. 8A to 8I are graphic representations of longitudinal aberrations of the third embodiment in a pre-decentering state and in an infinity shooting state.
Figure 8B:
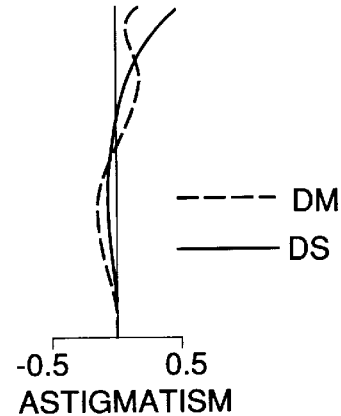
Figure 8C:
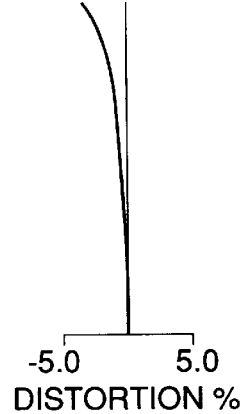
Figure 8D:
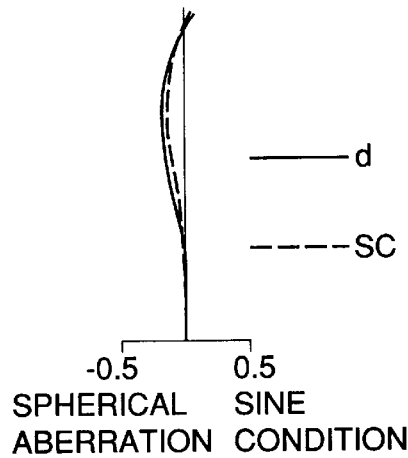
Figure 8E:
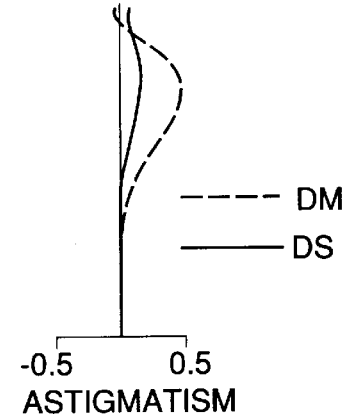
Figure 8F:
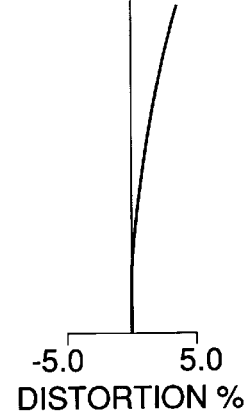
Figure 8G:
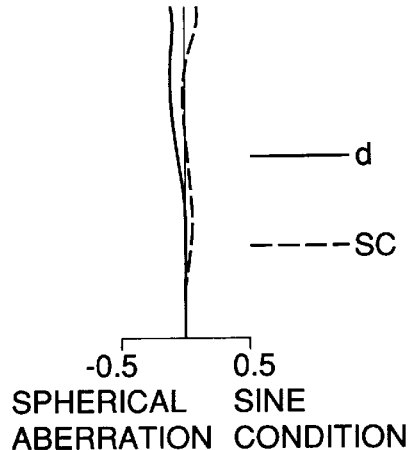
Figure 8H:
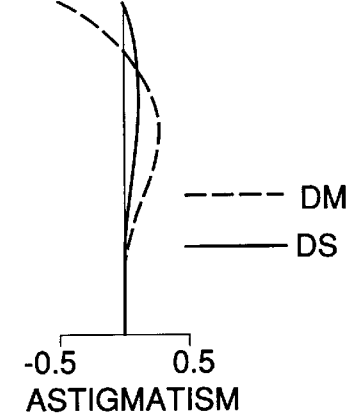
Figure 8I:
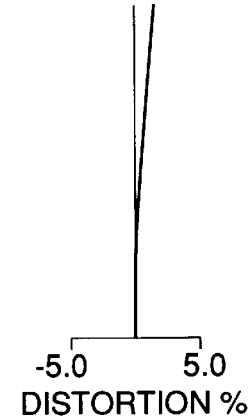
Figure 9A:
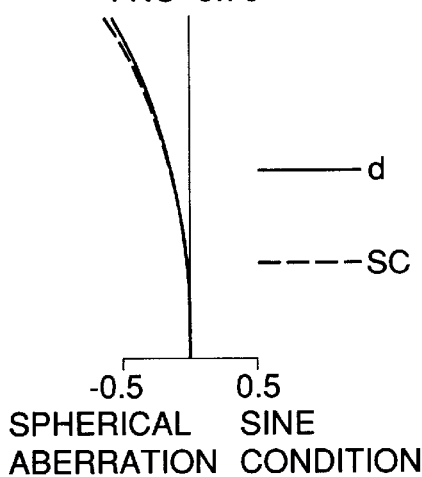
FIGS. 9A to 9I are graphic representations of longitudinal aberrations of the fourth embodiment in a pre-decentering state and in an infinity shooting state.
Figure 9B:
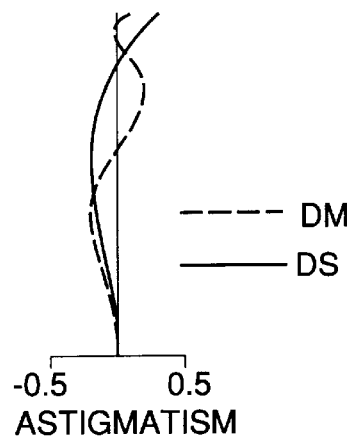
Figure 9C:
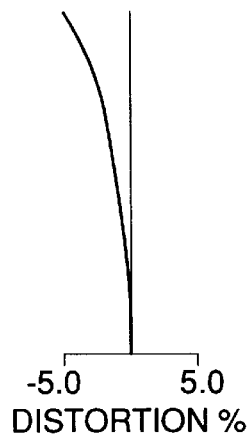
Figure 9D:
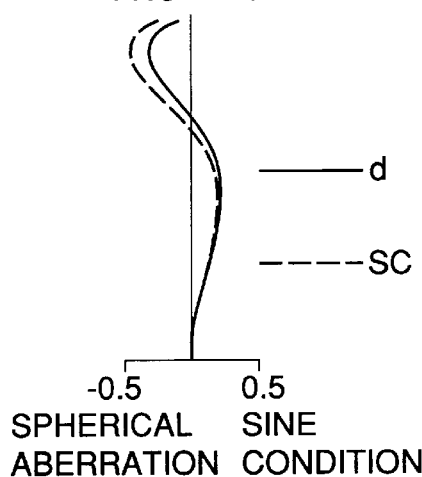
Figure 9E:
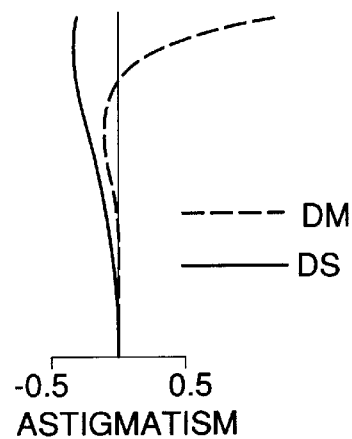
Figure 9F:
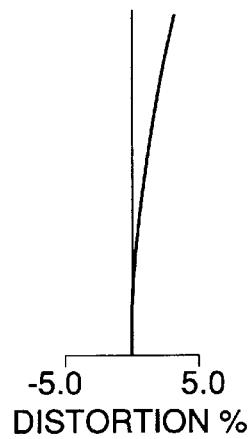
Figure 9G:
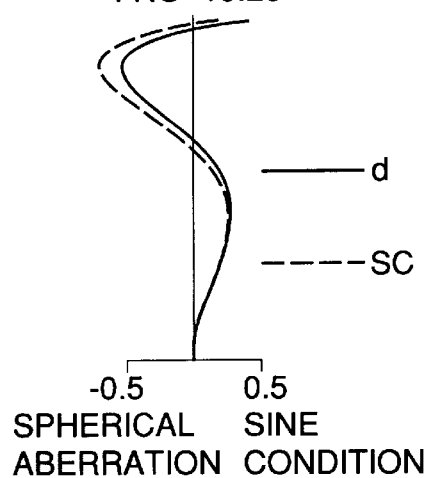
Figure 9H:
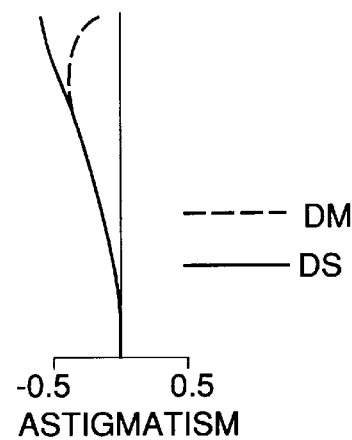
Figure 9I:
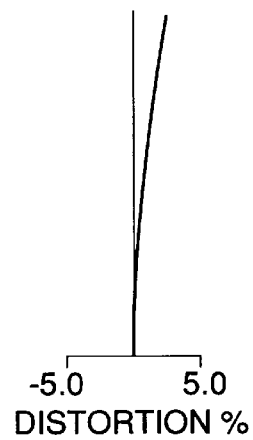
Figure 10A:
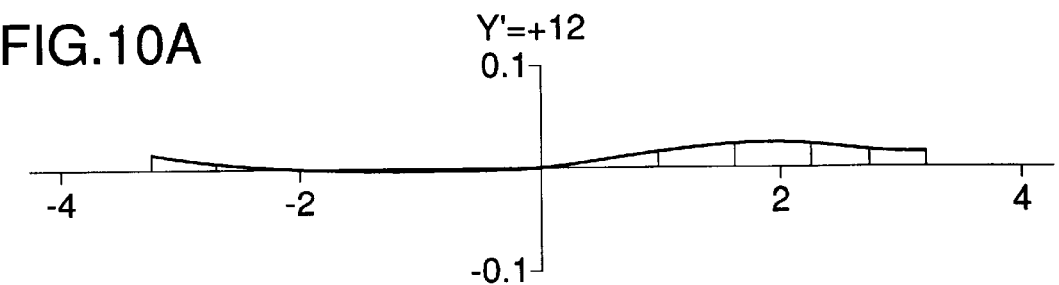
FIGS. 10A to 10E are graphic representations of meridional lateral aberrations of the first embodiment in a pre-and post-decentering states, at the shortest focal length condition and in an infinity shooting state.
Figure 10B:
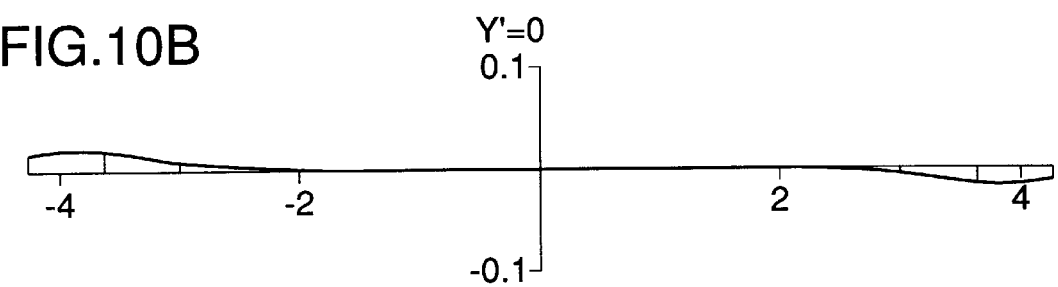
Figure 10C:
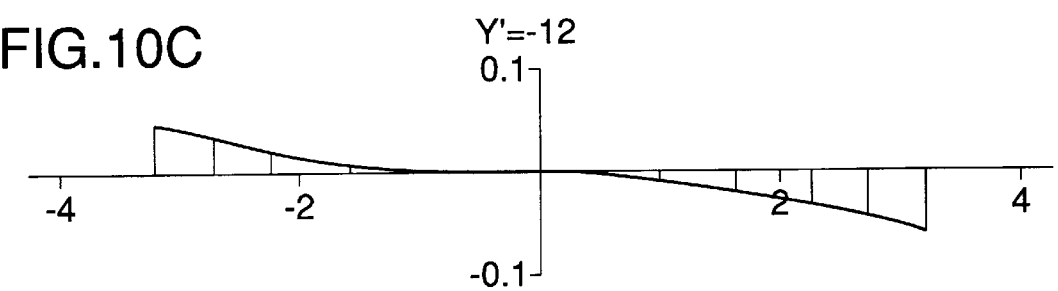
Figure 10D:
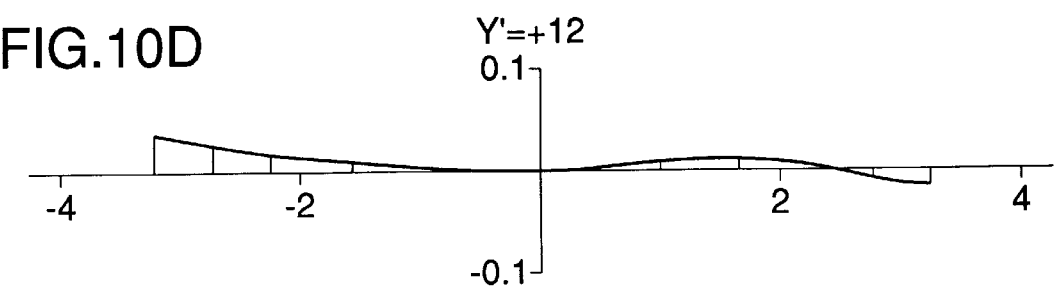
Figure 10E:
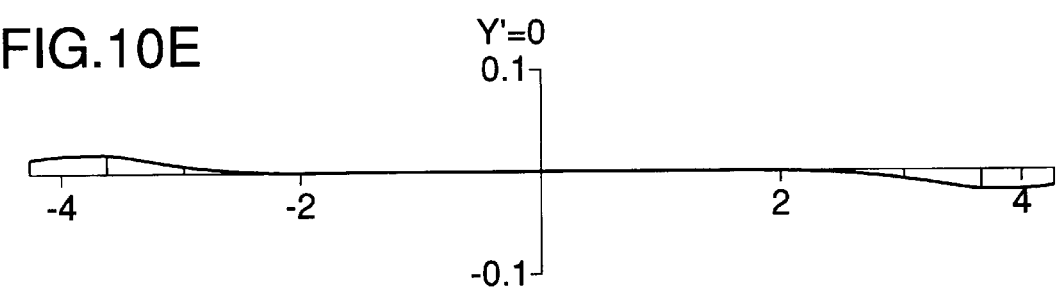
Figure 11A:
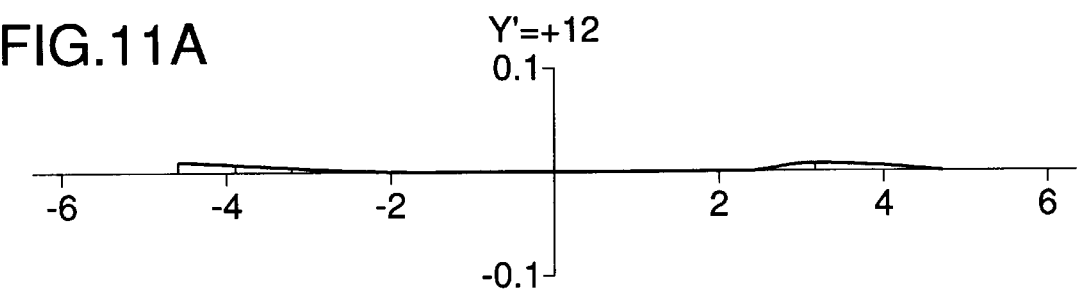
FIGS. 11A to 11E are graphic representations of meridional lateral aberrations of the first embodiment in a pre-and post-decentering states, at a middle focal length condition, and in an infinity shooting state.
Figure 11B:
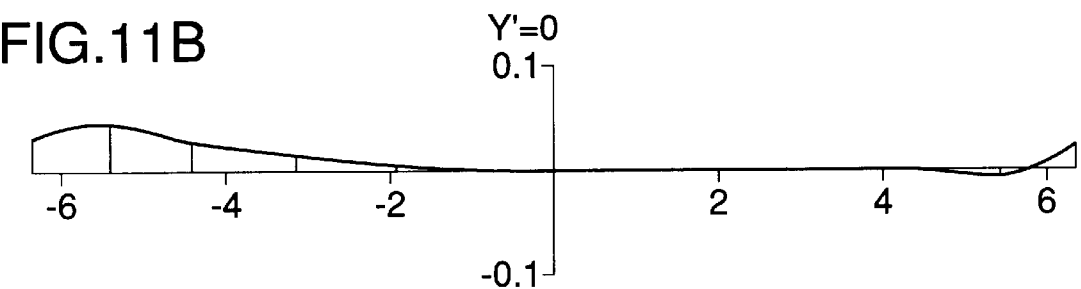
Figure 11C:
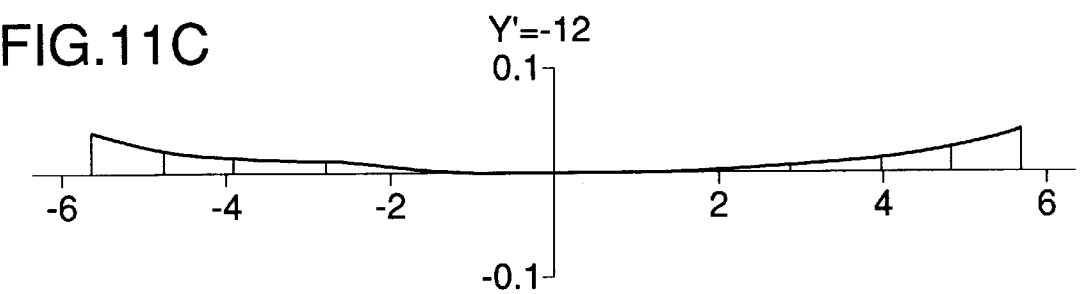
Figure 11D:
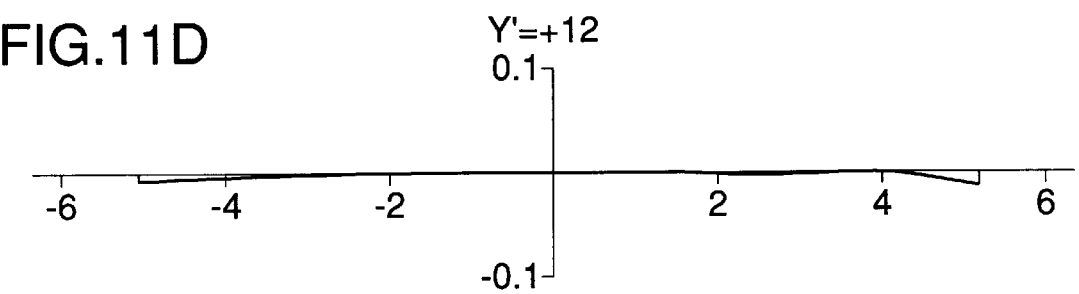
Figure 11E:
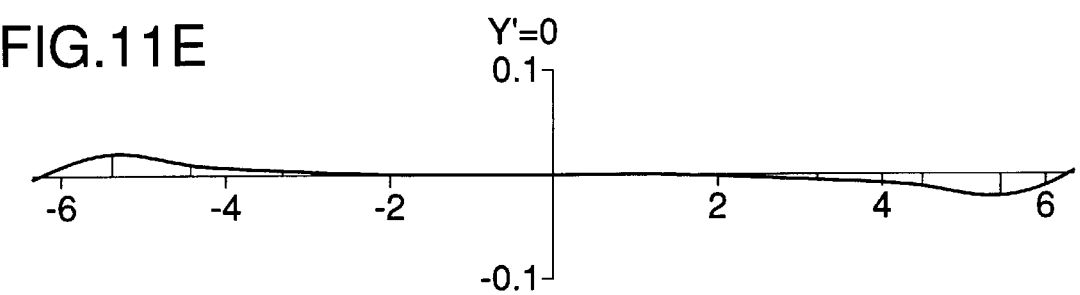
Figure 12A:
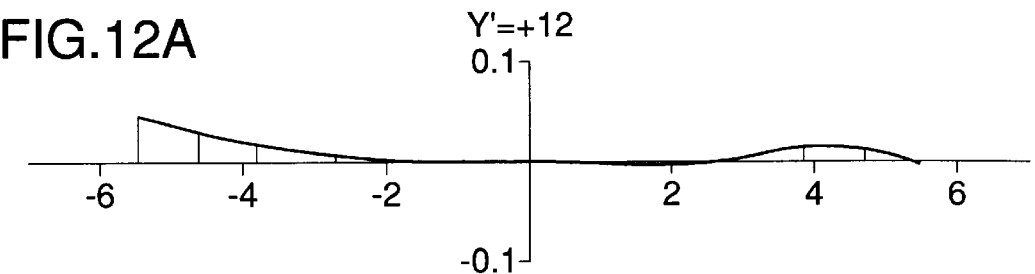
FIGS. 12A to 12E are graphic representations of meridional lateral aberrations of the first embodiment in a pre-and post-decentering states, at a longest focal length condition, and in an infinity shooting state.
Figure 12B:
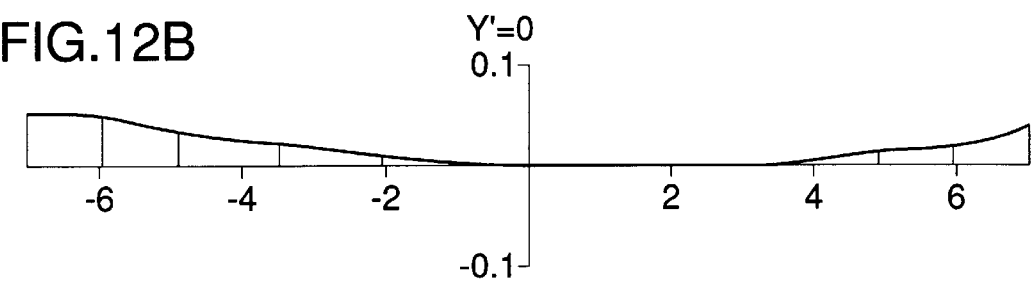
Figure 12C:
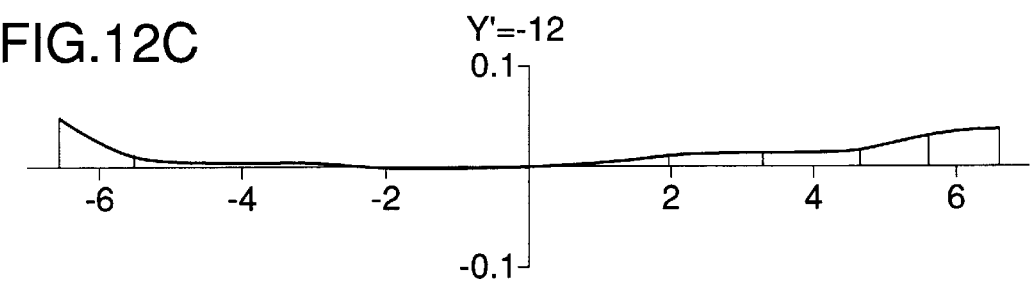
Figure 12D:
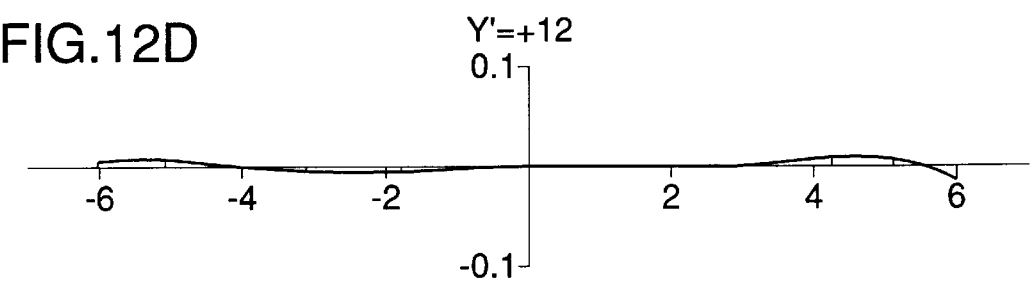
Figure 12E:
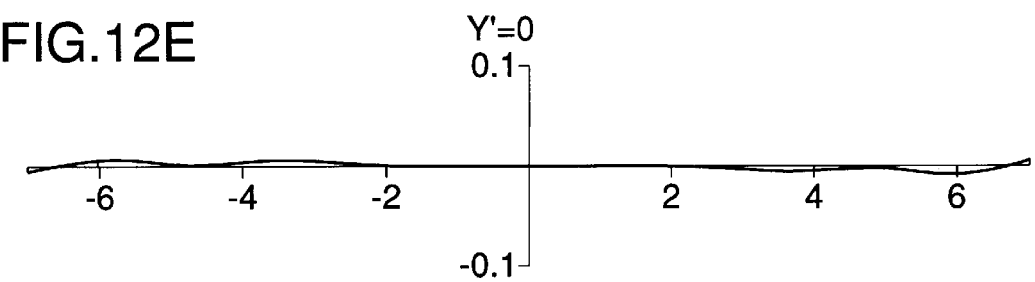
Figure 13A:
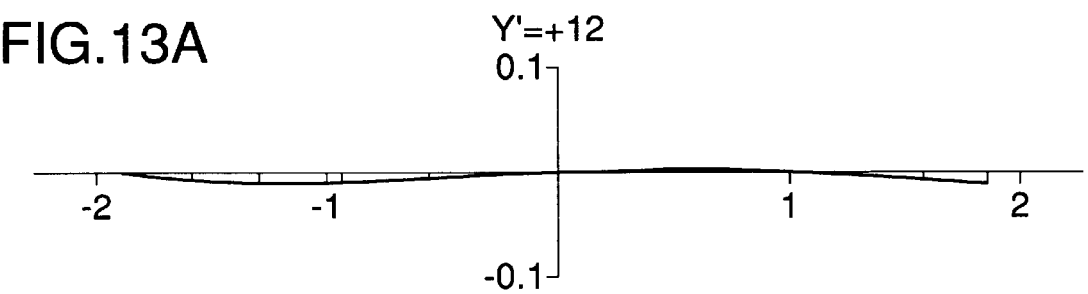
FIGS. 13A to 13E are graphic representations of meridional lateral aberrations of the second embodiment in a pre-and post-decentering states, at a shortest focal length condition, and in an infinity shooting state.
Figure 13B:
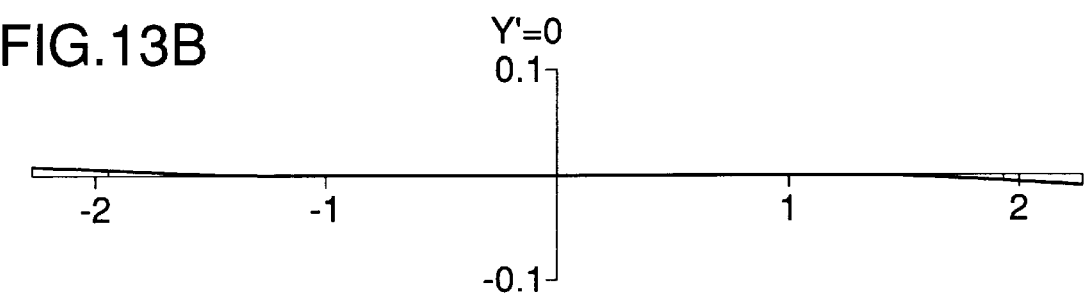
Figure 13C:
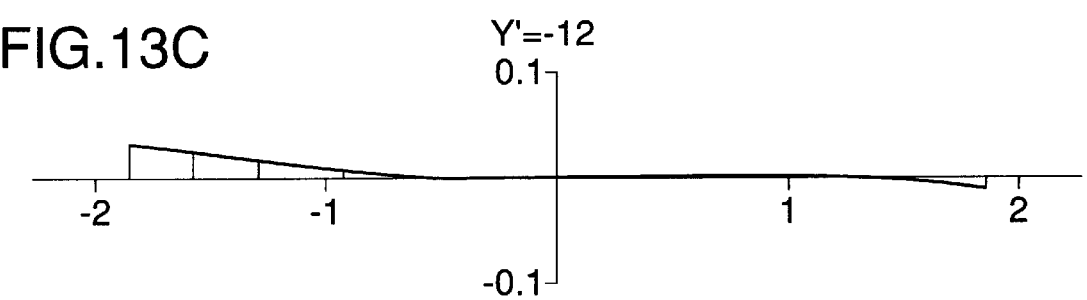
Figure 13D:
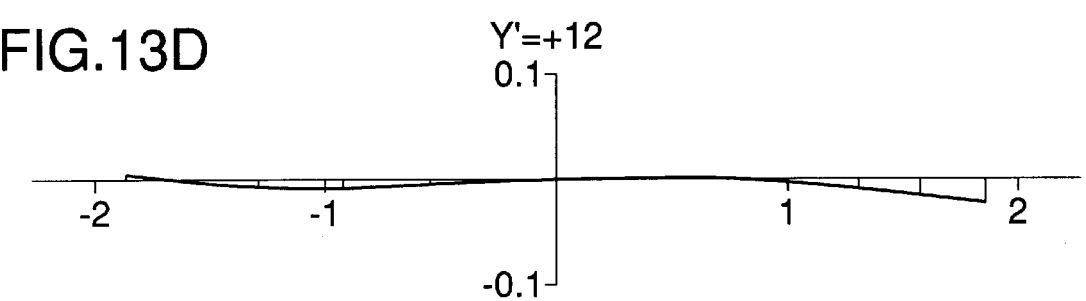
Figure 13E:
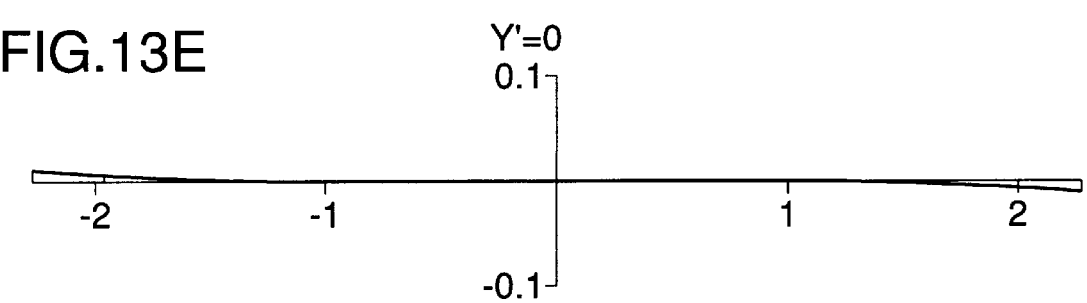
Figure 14A:
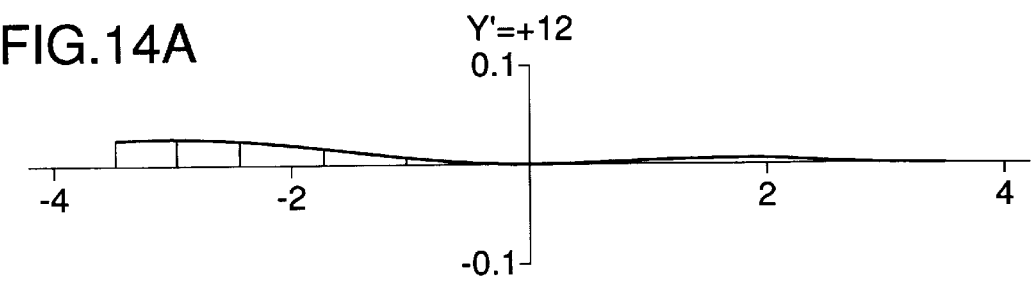
FIGS. 14A to 14E are graphic representations of meridional lateral aberrations of the second embodiment in a pre-and post-decentering states, at a middle focal length condition, and in an infinity shooting state.
Figure 14B:
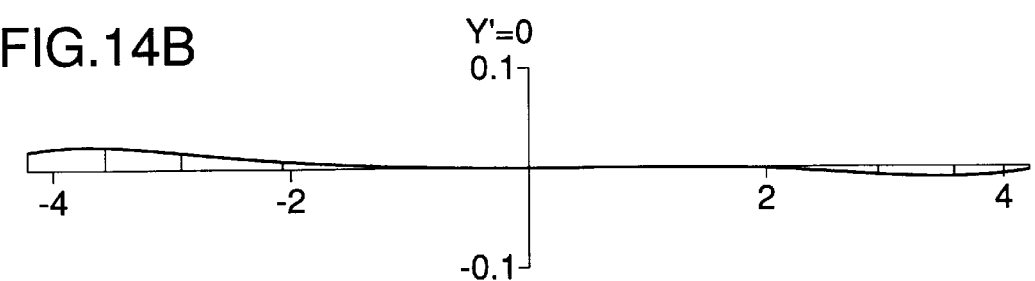
Figure 14C:
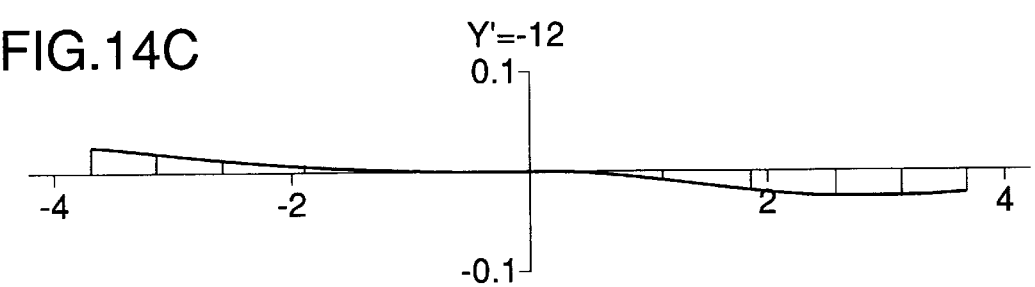
Figure 14D:
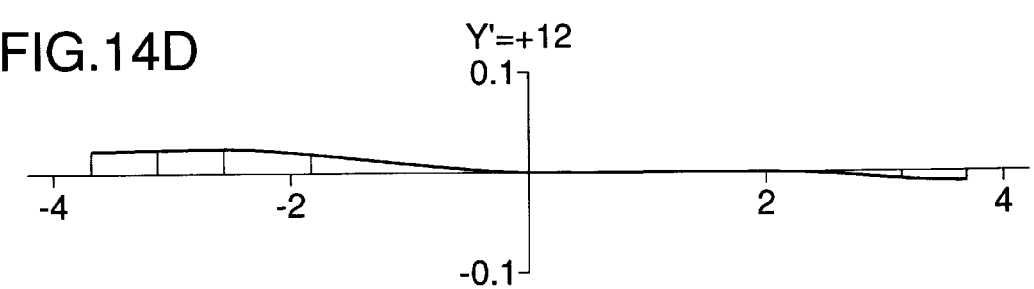
Figure 14E:
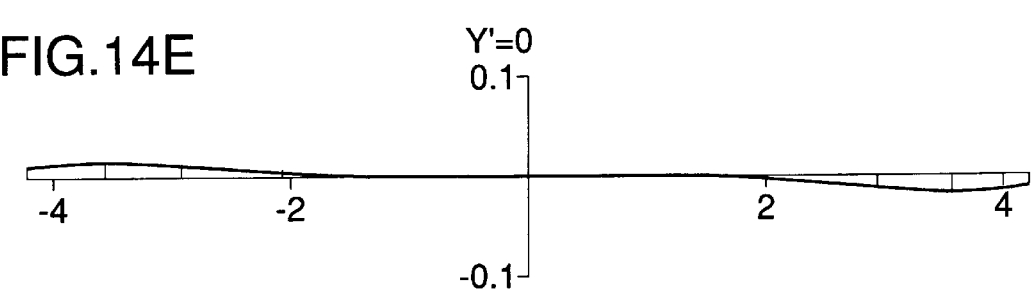
Figure 15A:
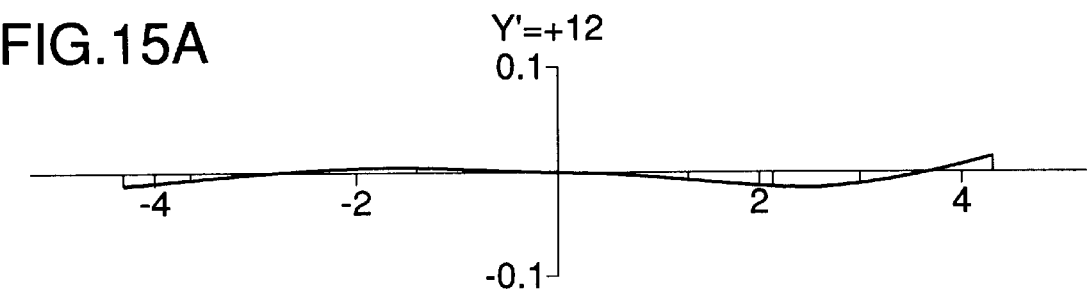
FIGS. 15A to 15E are graphic representations of meridional lateral aberrations of the second embodiment in a pre-and post-decentering states, at a longest focal length condition, and in an infinity shooting state.
Figure 15B:
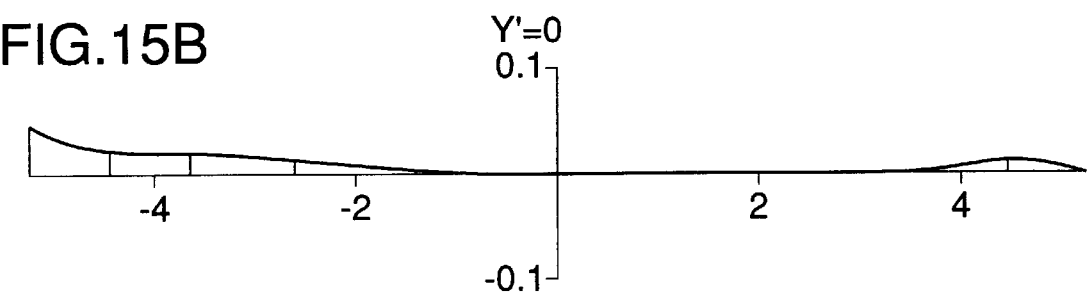
Figure 15C:
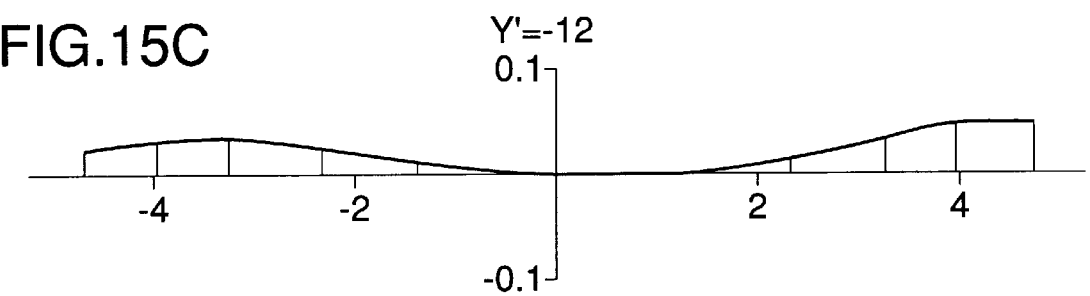
Figure 15D:
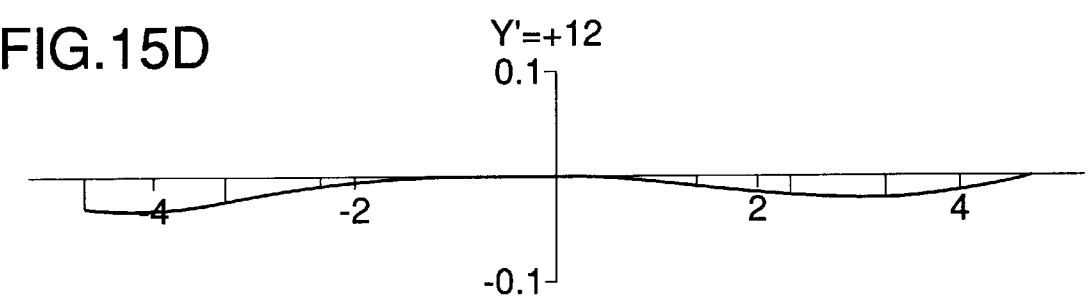
Figure 15E:
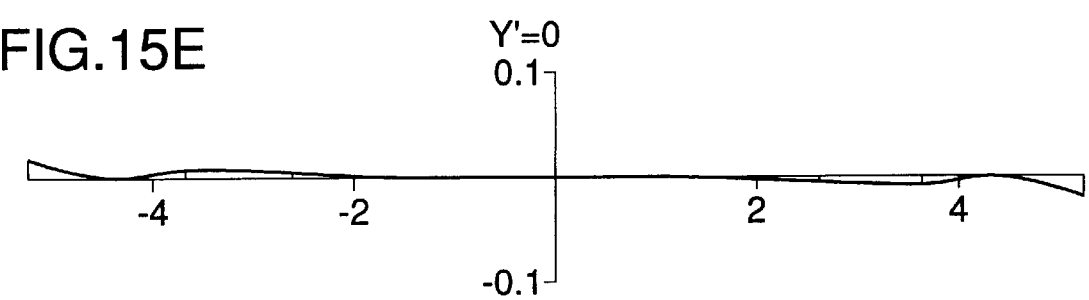
Figure 16A:
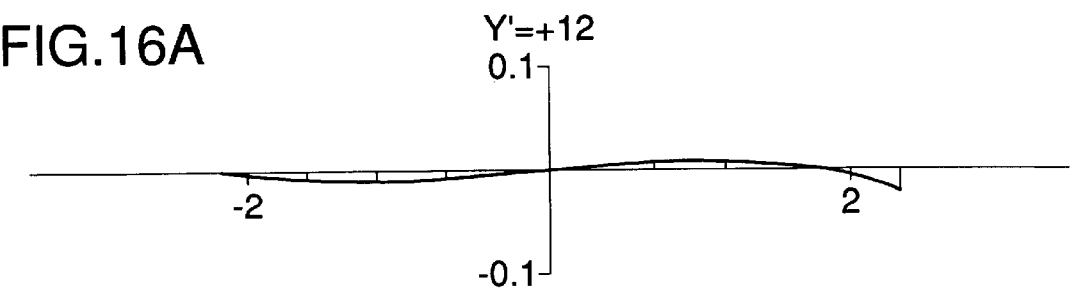
FIGS. 16A to 16E are graphic representations of meridional lateral aberrations of the third embodiment in a pre-and post-decentering states, at a shortest focal length condition, and in an infinity shooting state.
Figure 16B:
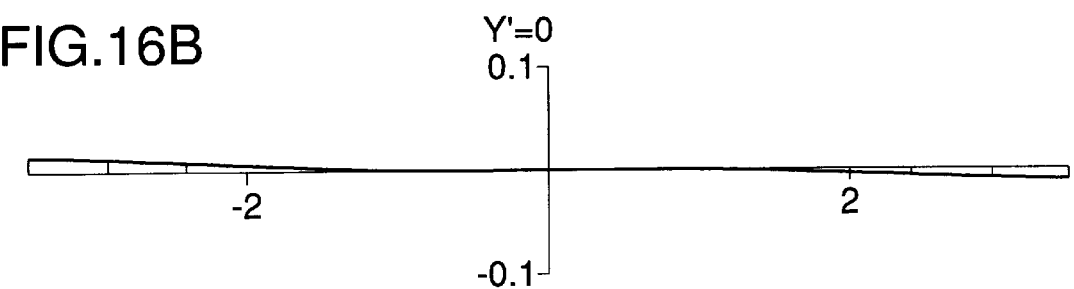
Figure 16C:
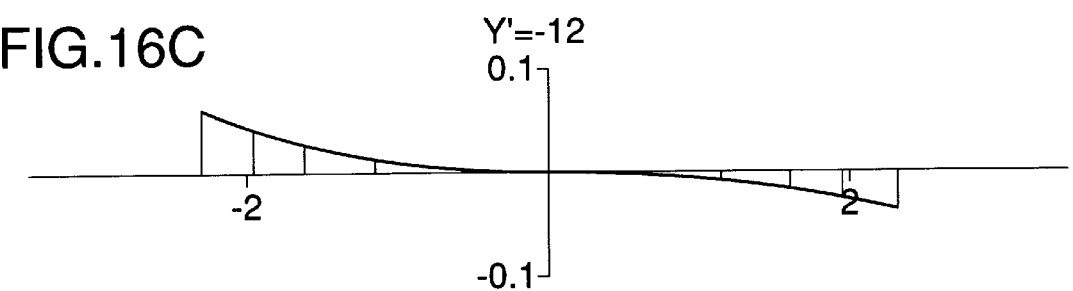
Figure 16D:
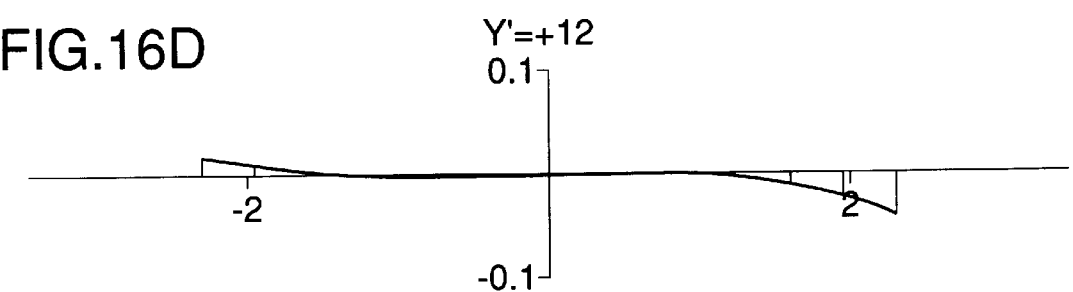
Figure 16E:
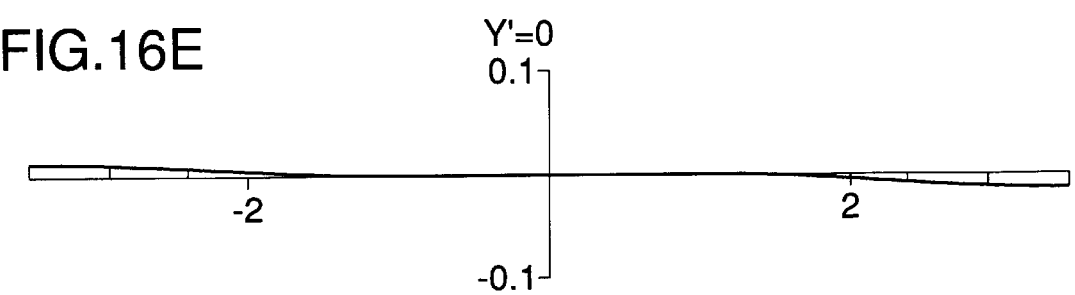
Figure 17A:
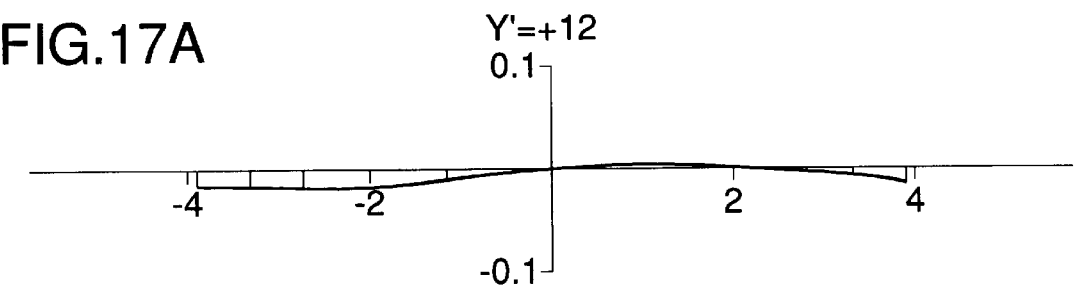
FIGS. 17A to 17E are graphic representations of meridional lateral aberrations of the third embodiment in a pre-and post-decentering states, at a middle focal length condition, and in an infinity shooting state.
Figure 17B:
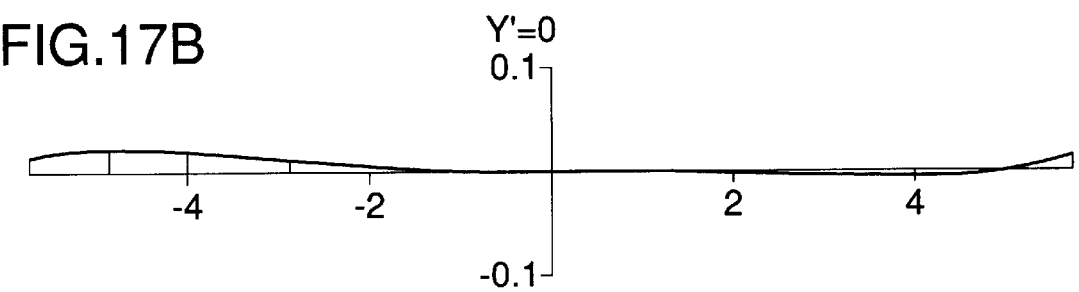
Figure 17C:
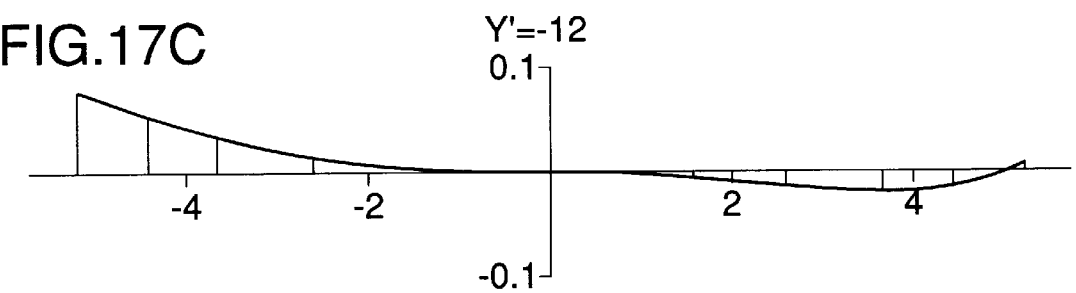
Figure 17D:
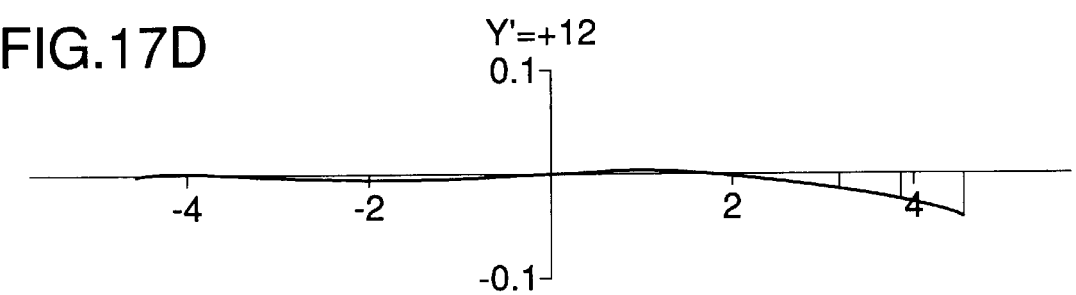
Figure 17E:
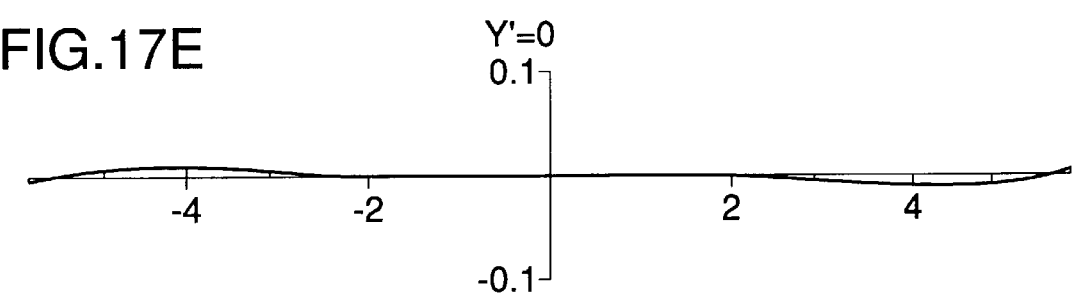
Figure 18A:
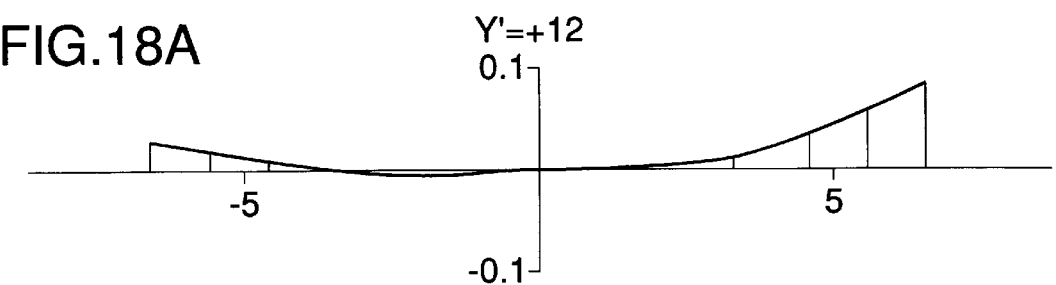
FIGS. 18A to 18E are graphic representations of meridional lateral aberrations of the third embodiment in a pre-and post-decentering states, at a longest focal length condition, and in an infinity shooting state.
Figure 18B:
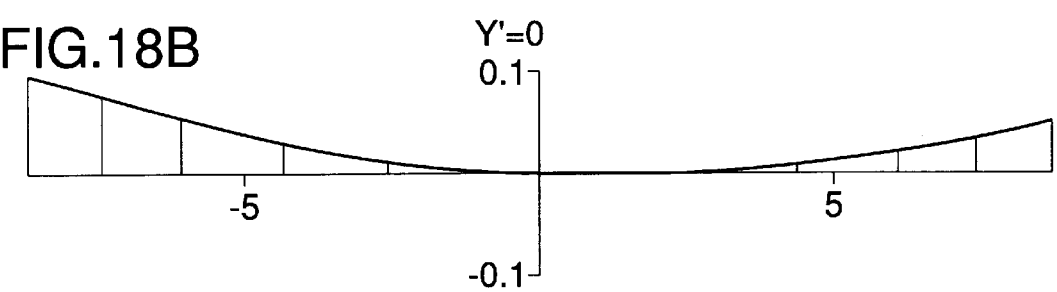
Figure 18C:
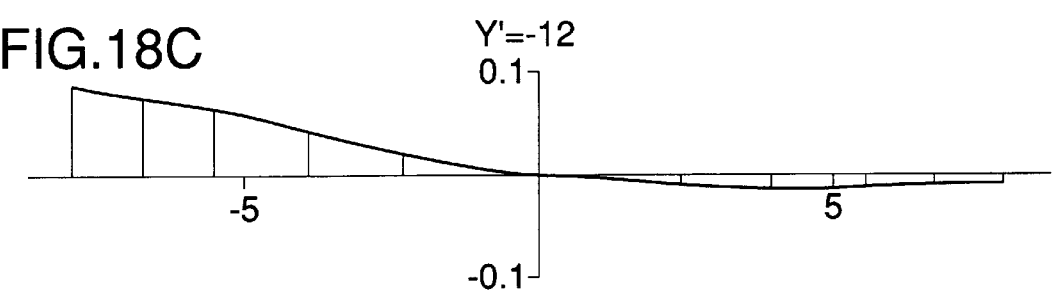
Figure 18D:
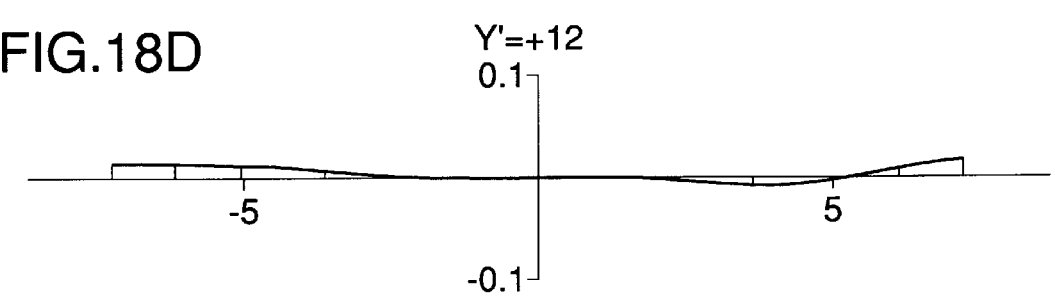
Figure 18E:
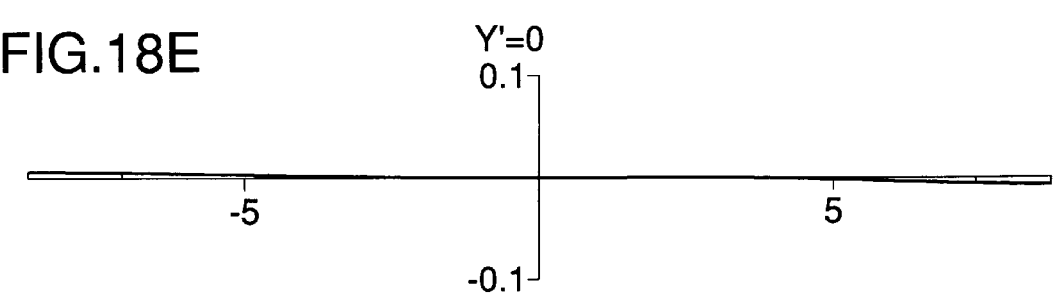
Figure 19A:
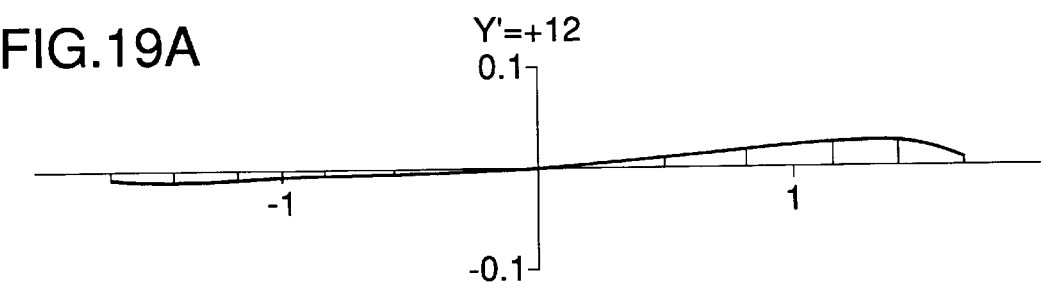
FIGS. 19A to 19E are graphic representations of meridional lateral aberrations of the fourth embodiment in a pre-and post-decentering states, at a shortest focal length condition, and in an infinity shooting state.
Figure 19B:
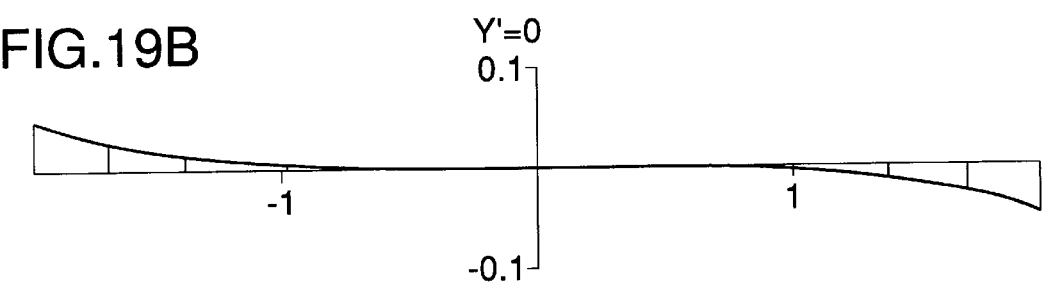
Figure 19C:
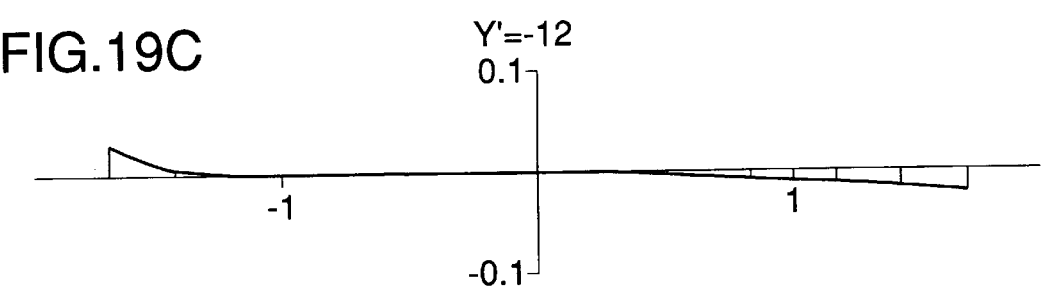
Figure 19D:
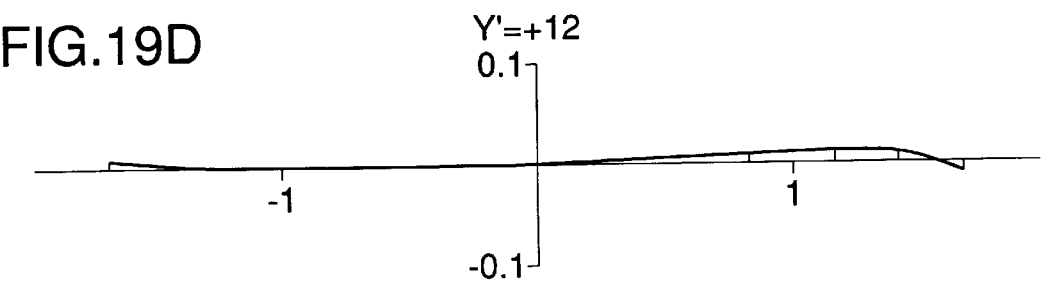
Figure 19E:
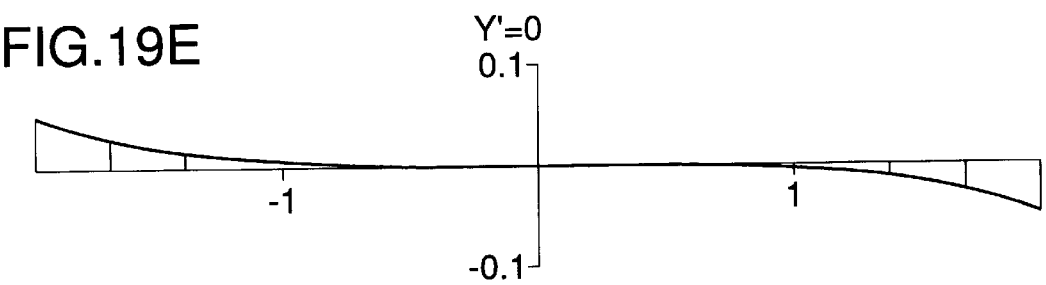
Figure 20A:
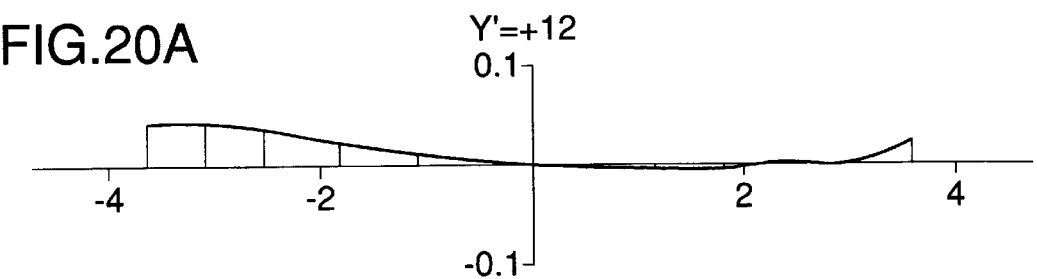
FIGS. 20A to 20E are graphic representations of meridional lateral aberrations of the fourth embodiment in a pre-and post-decentering states, at a middle focal length condition, and in an infinity shooting state.
Figure 20B:
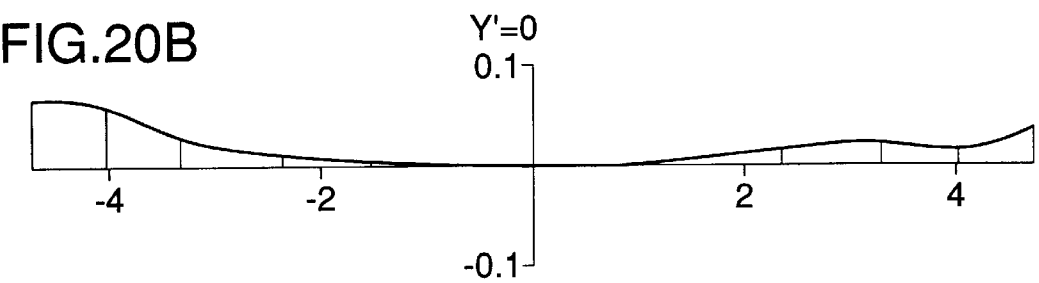
Figure 20C:
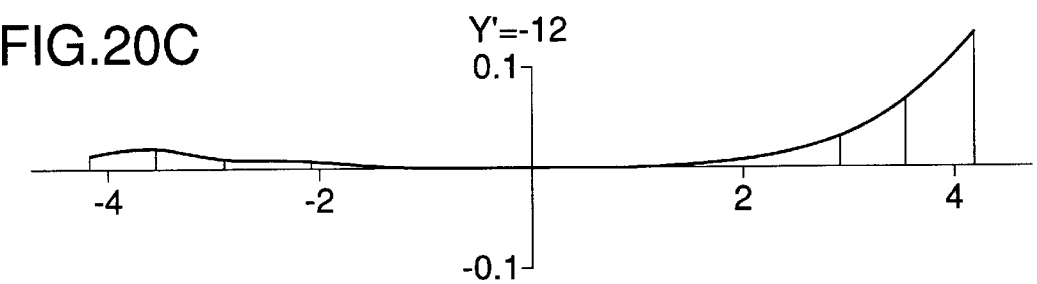
Figure 20D:
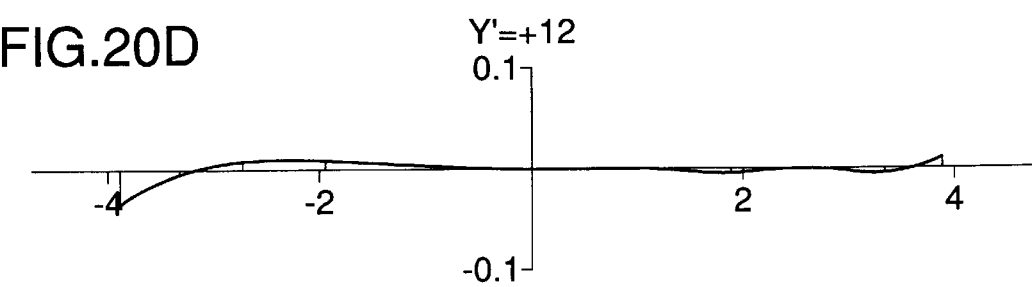
Figure 20E:
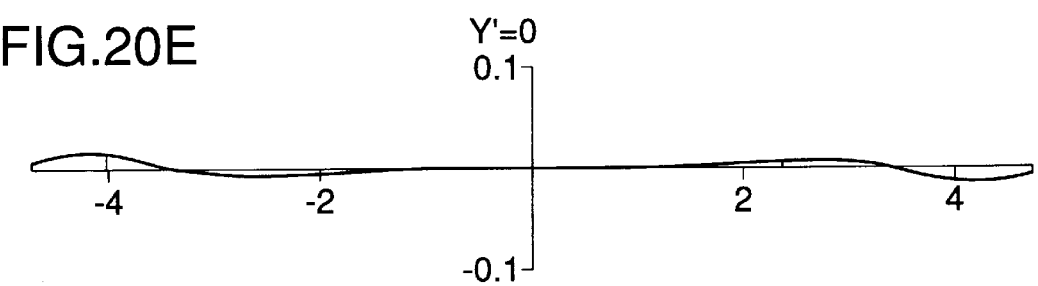
Figure 21A:
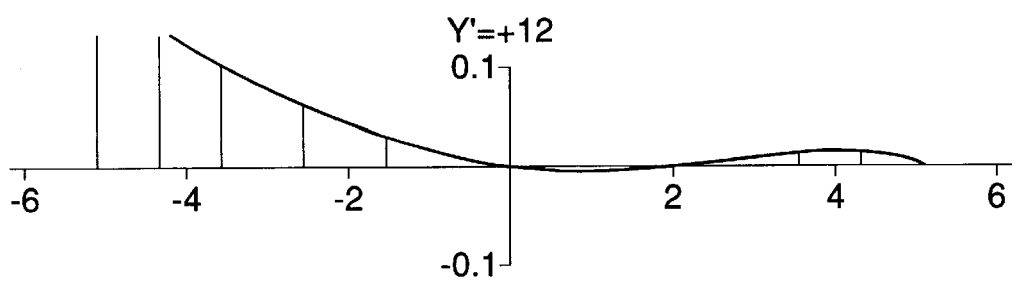
FIGS. 21A to 21E are graphic representations of meridional lateral aberrations of the fourth embodiment in a pre-and post-decentering states, at a longest focal length condition, and in an infinity shooting state.
Figure 21B:
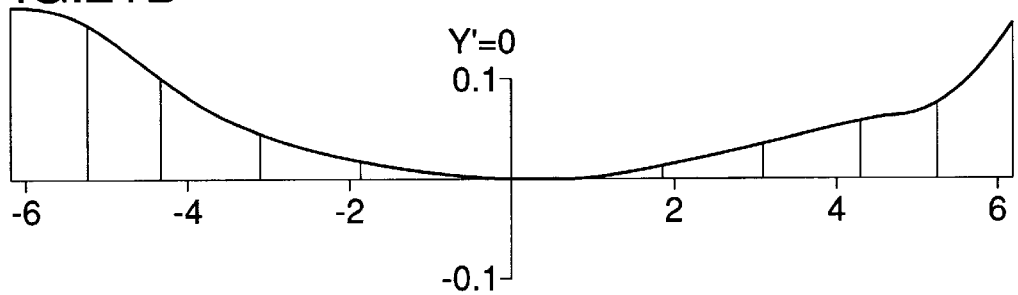
Figure 21C:
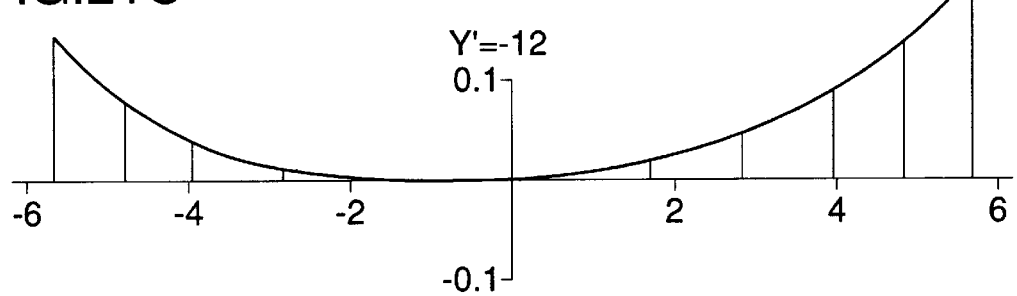
Figure 21D:
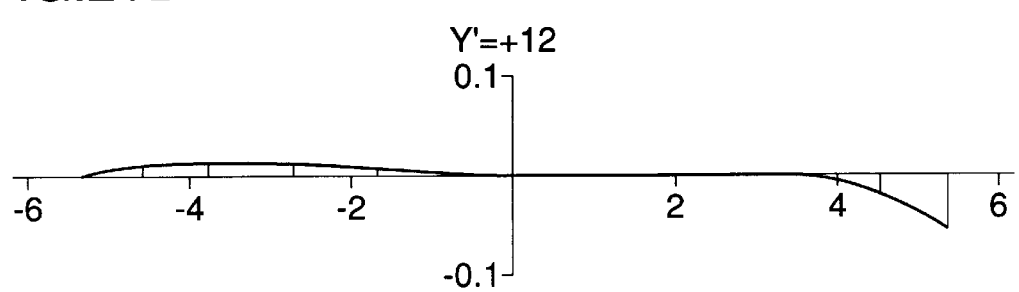
Figure 21E:
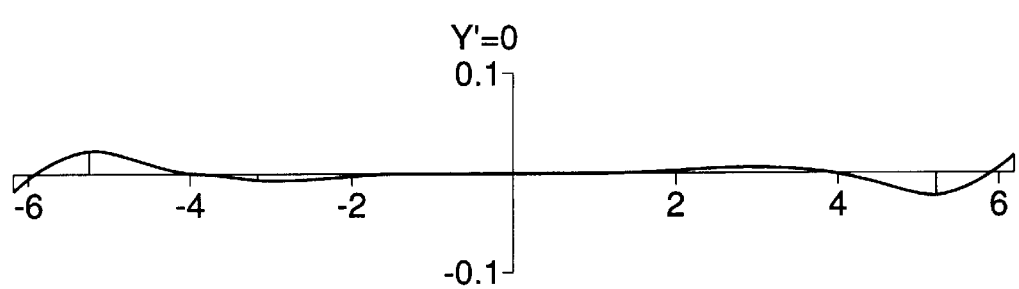
Figure 22:
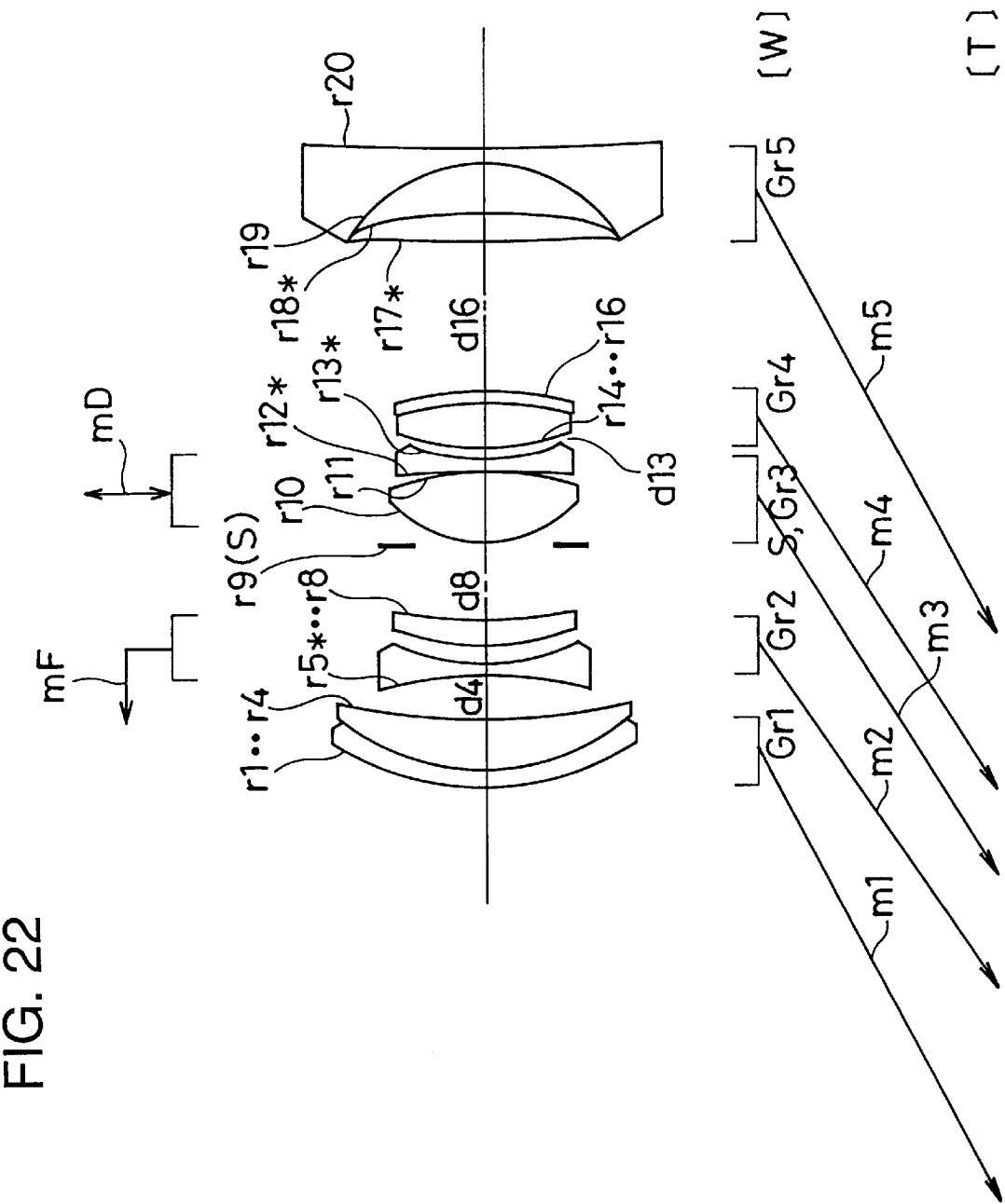
FIG. 22 shows the lens arrangement of a fifth embodiment.
Figure 23:
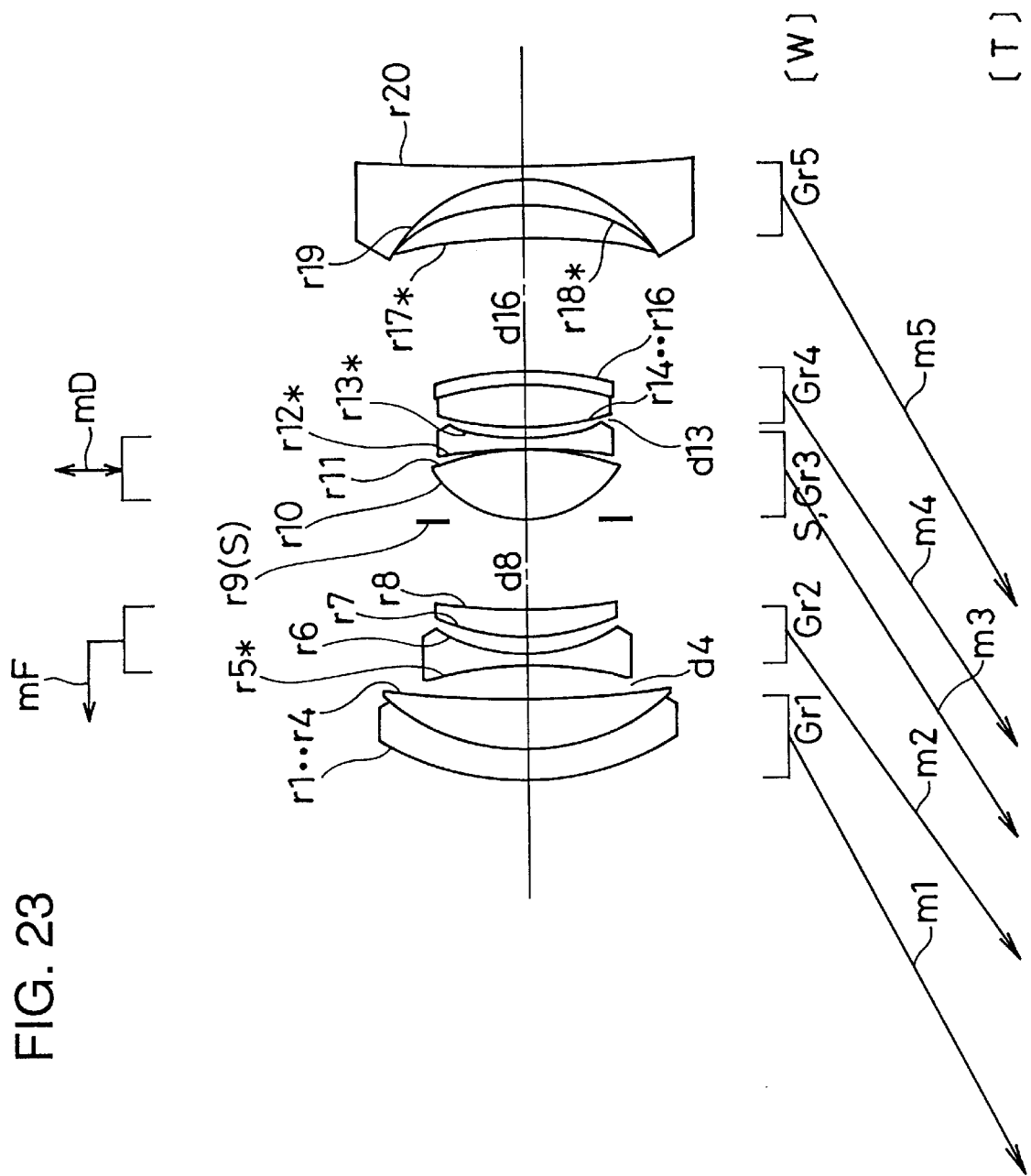
FIG. 23 shows the lens arrangement of a sixth embodiment.
Figure 24:
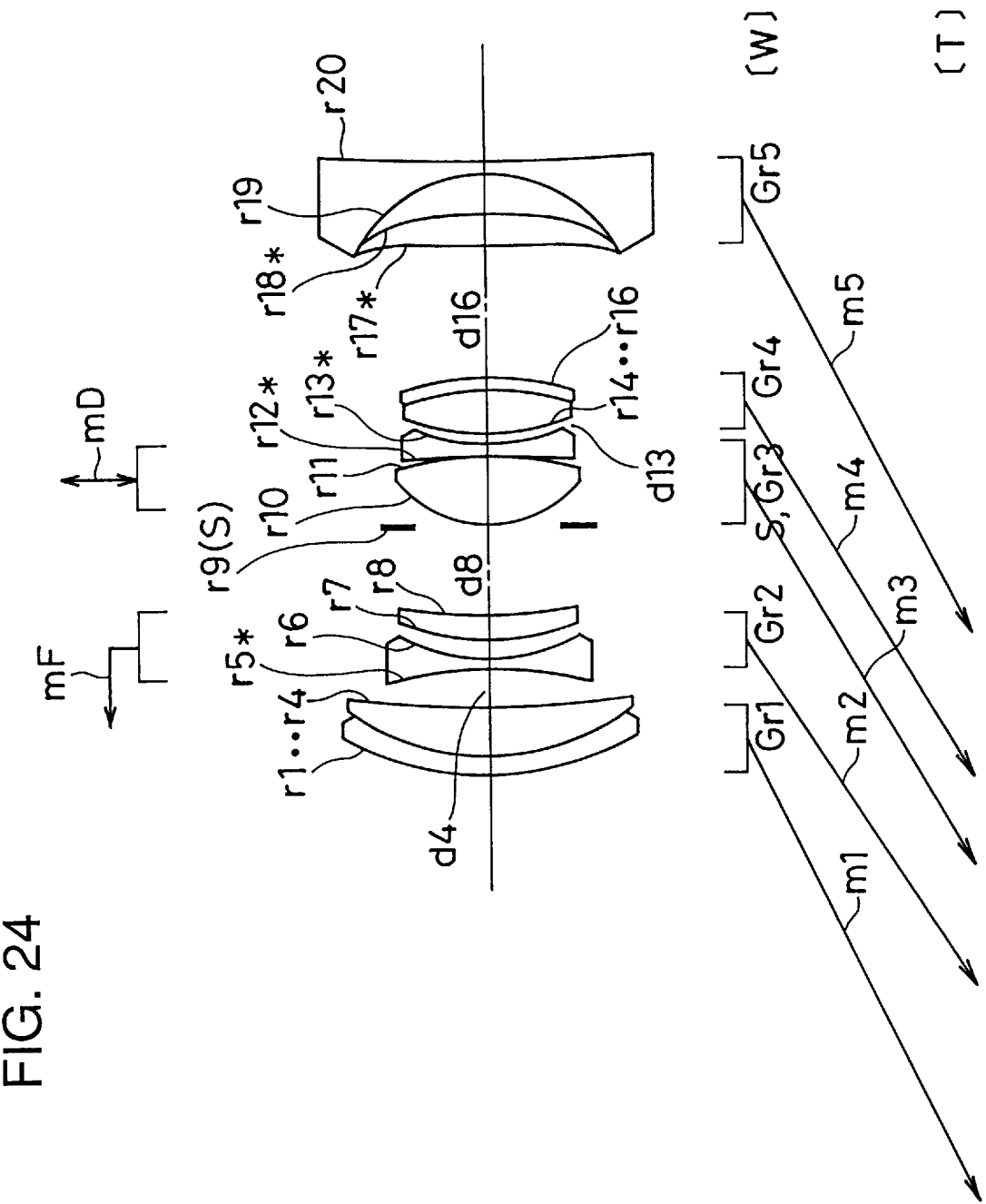
FIG. 24 shows the lens arrangement of a seventh embodiment.
Figure 25:
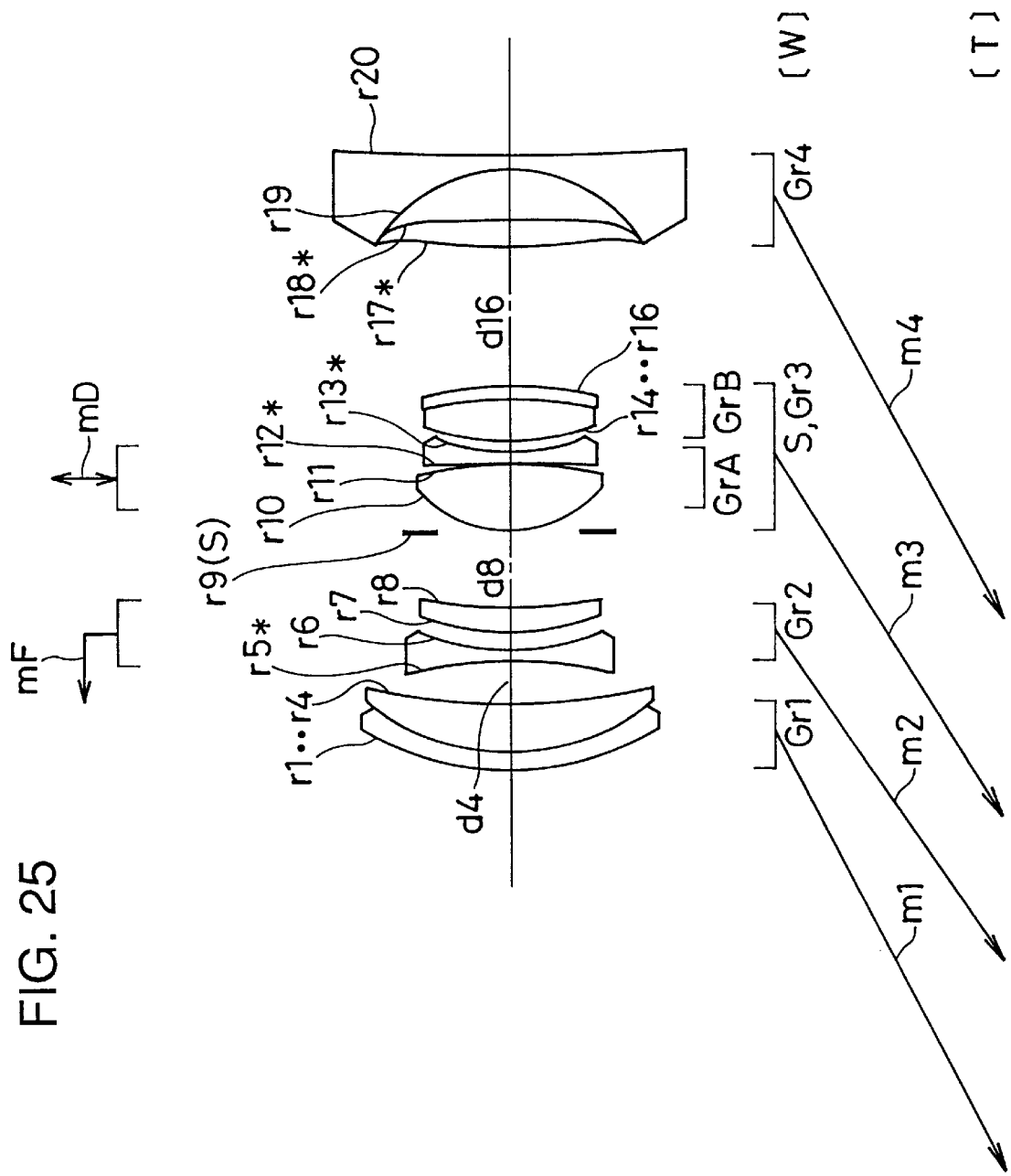
FIG. 25 shows the lens arrangement of an eighth embodiment.
Figure 26A:
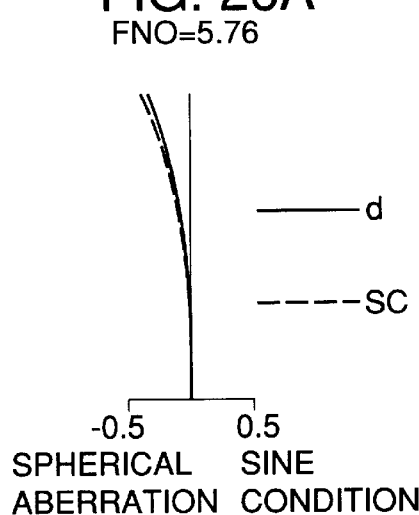
FIGS. 26A to 26I are graphic representations of longitudinal aberrations of the fifth embodiment in a pre-decentering state and in an infinity shooting state.
Figure 26B:
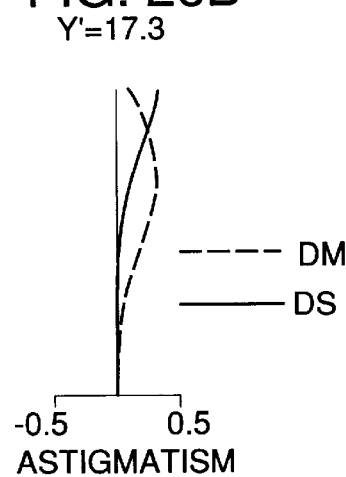
Figure 26C:
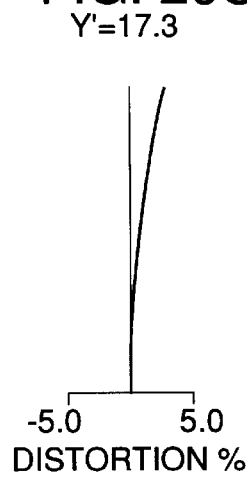
Figure 26D:
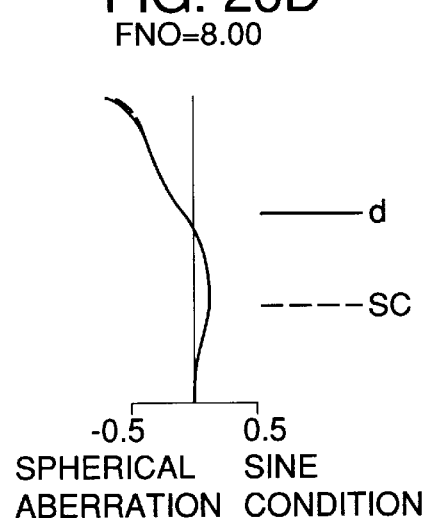
Figure 26E:
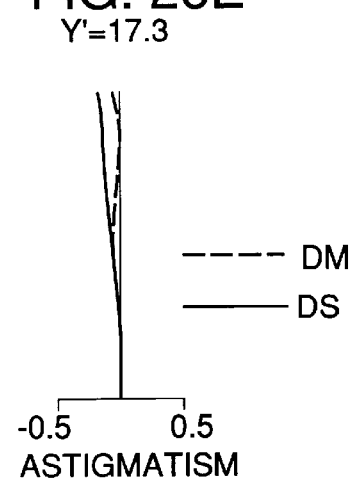
Figure 26F:
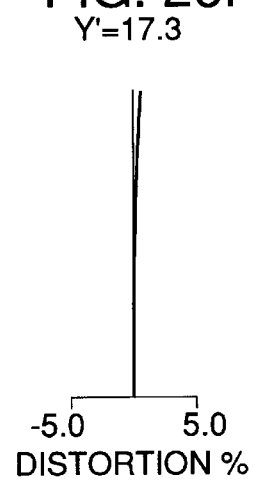
Figure 26G:
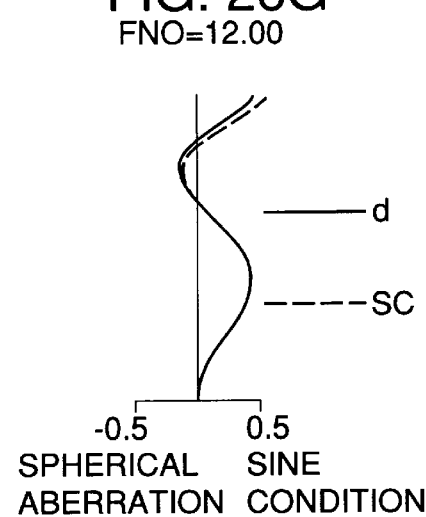
Figure 26H:
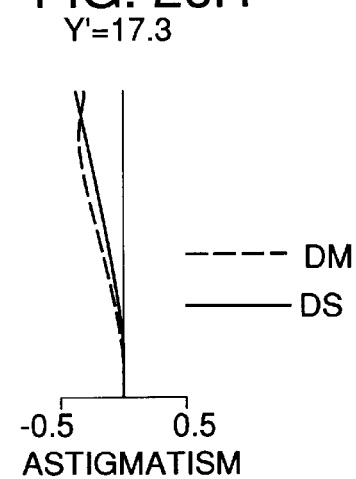
Figure 26I:
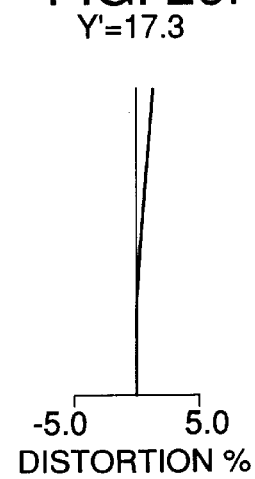
Figure 27A:
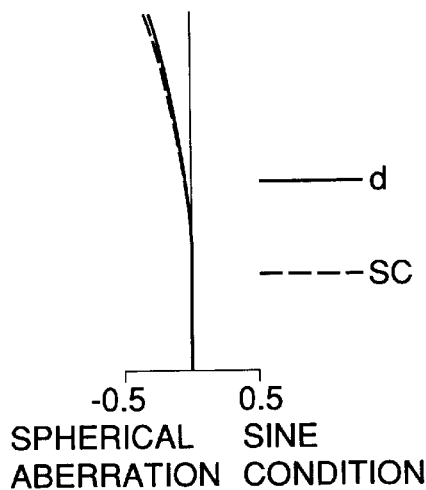
FIGS. 27A to 27F are graphic representations of longitudinal aberrations of the fifth embodiment in a pre-decentering state and in close shooting state (shooting distance 50 cm)
Figure 27B:
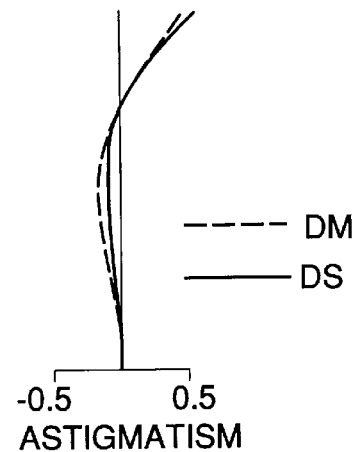
Figure 27C:
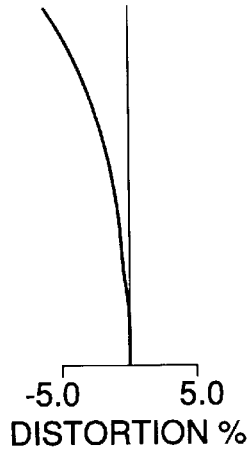
Figure 27D:
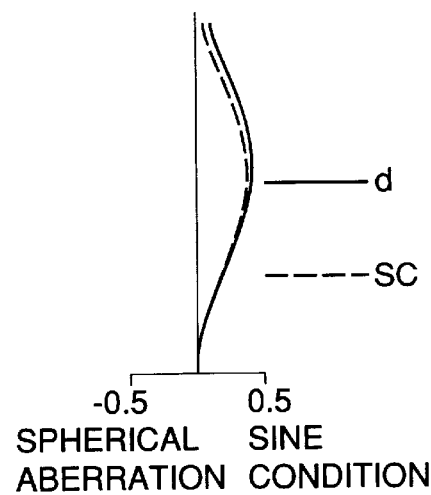
Figure 27E:
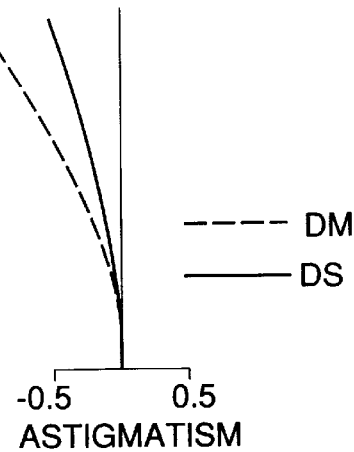
Figure 27F:
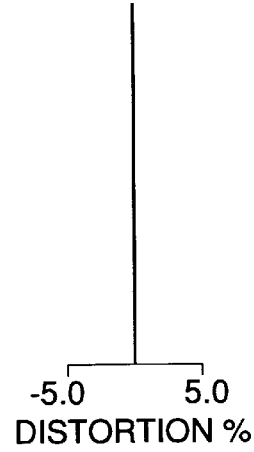
Figure 28A:
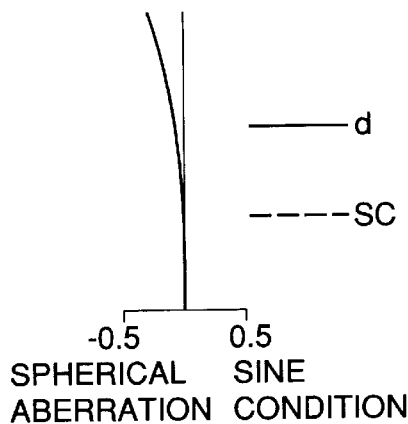
FIGS. 28A to 28I are graphic representations of longitudinal aberrations of the sixth embodiment in a pre-decentering state and in an infinity shooting state.
Figure 28B:
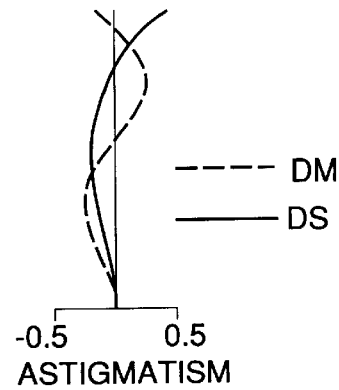
Figure 28C:
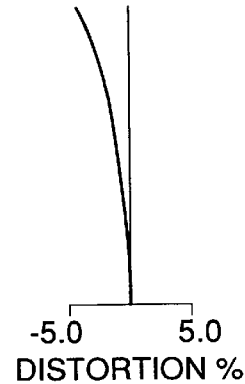
Figure 28D:
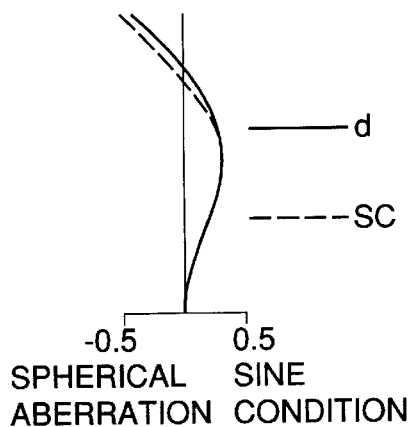
Figure 28E:
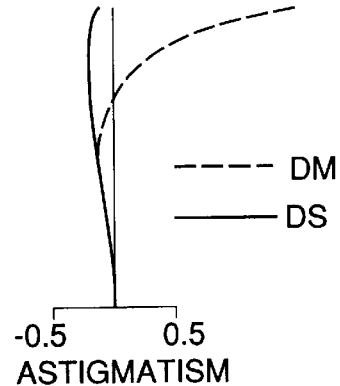
Figure 28F:
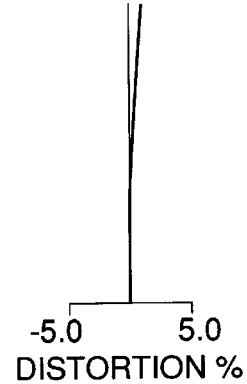
Figure 28G:
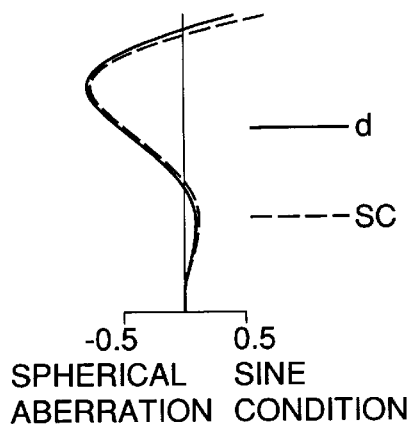
Figure 28H:
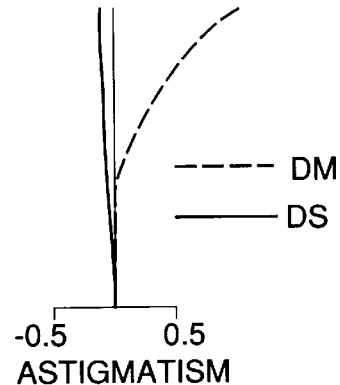
Figure 28I:
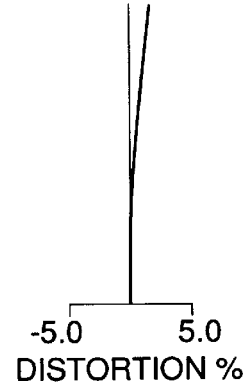
Figure 29A:
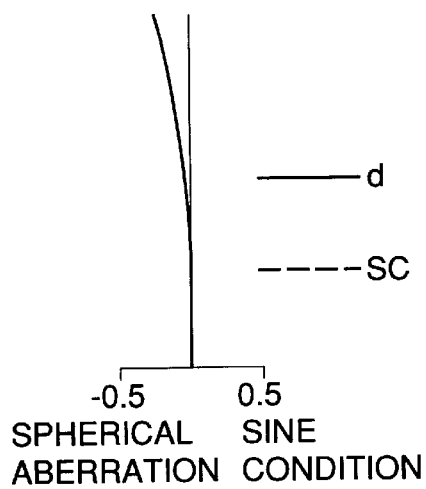
FIGS. 29A to 29F are graphic representations of longitudinal aberrations of the sixth embodiment in an pre-decentering state and in a close shooting state (shooting distance 50 cm)
Figure 29B:
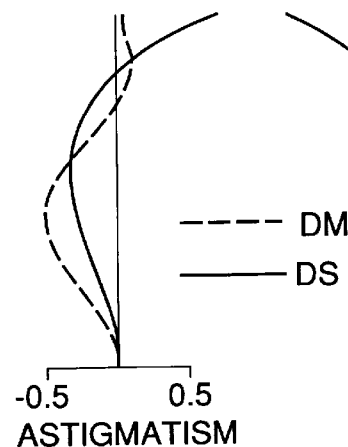
Figure 29C:
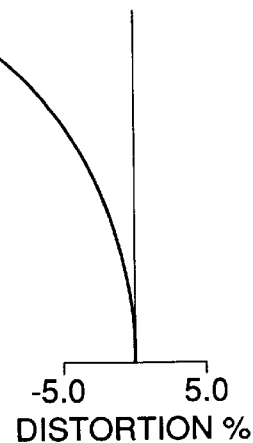
Figure 29D:
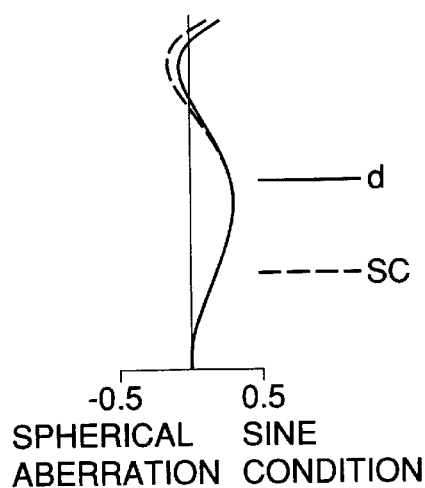
Figure 29E:
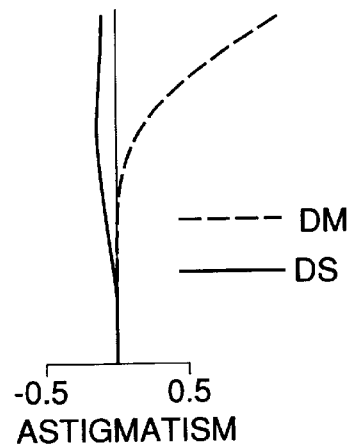
Figure 29F:
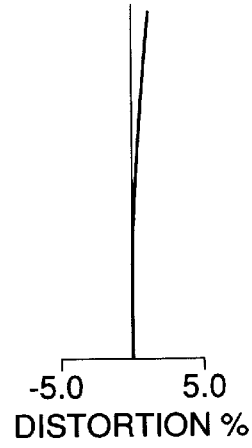
Figure 30A:
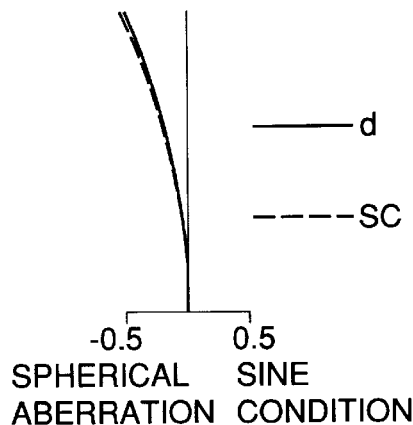
FIGS. 30A to 30I are graphic representations of longitudinal aberrations of the seventh embodiment in a pre-decentering state and in an infinity shooting state.
Figure 30B:
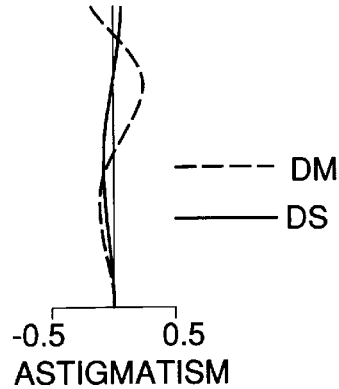
Figure 30C:
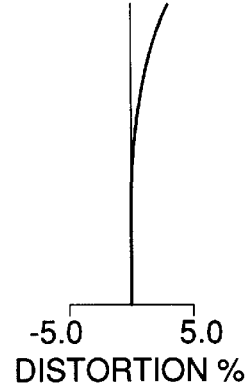
Figure 30D:
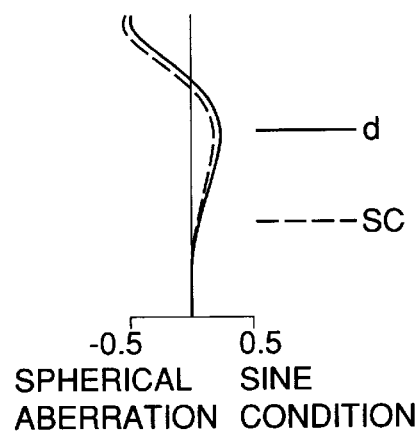
Figure 30E:
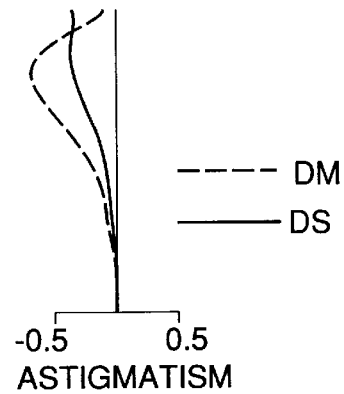
Figure 30F:
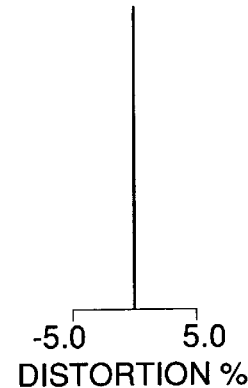
Figure 30G:
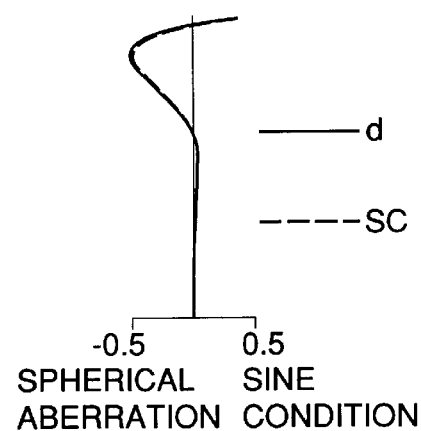
Figure 30H:
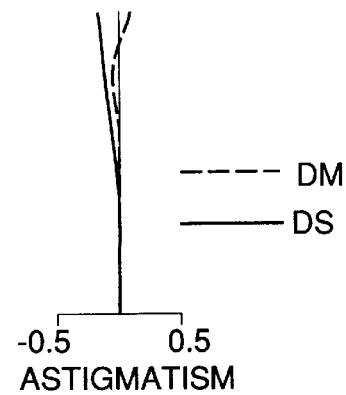
Figure 30I:
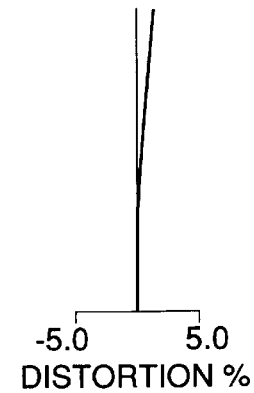
Figure 31A:
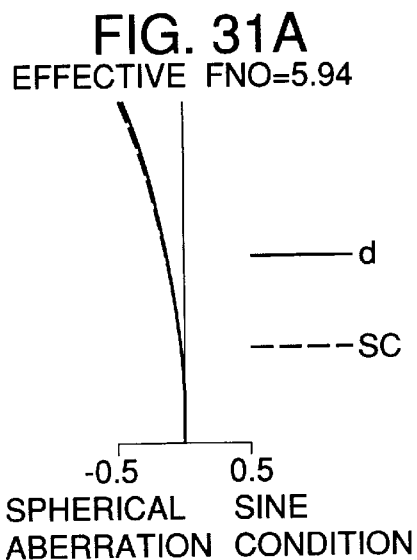
FIGS. 31A to 31F are graphic representations of longitudinal aberrations of the seventh embodiment in a pre-decentering state and in a close shooting state (shooting distance 50 cm)
Figure 31B:
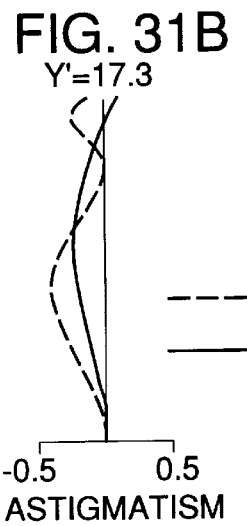
Figure 31C:
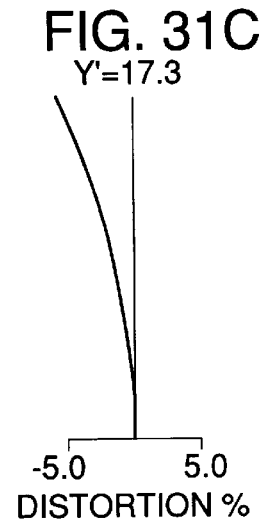
Figure 31D:
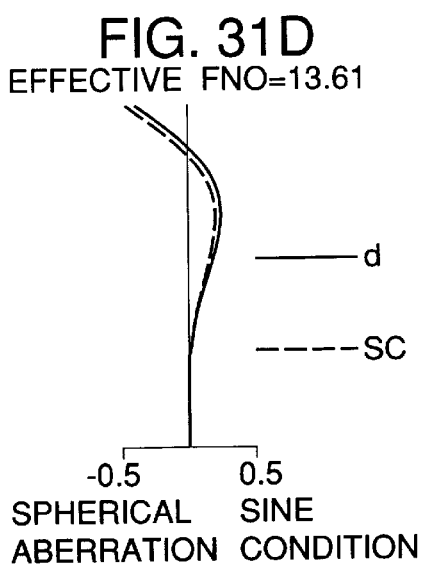
Figure 31E:
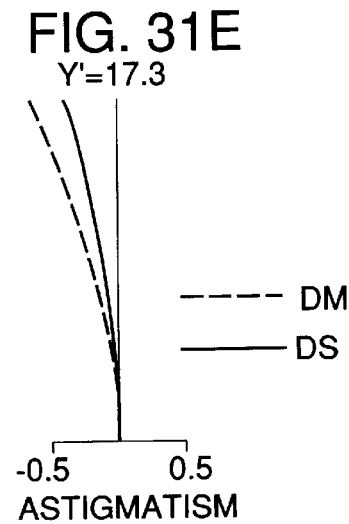
Figure 31F:
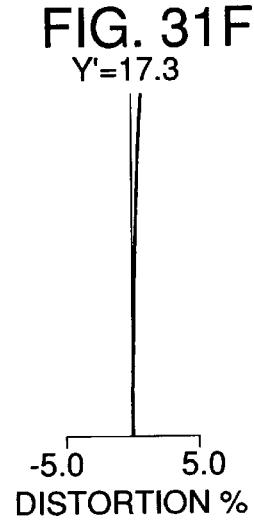
Figure 32A:
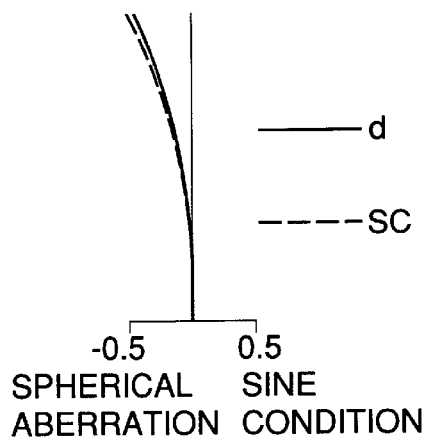
FIGS. 32A to 32I are graphic representations of longitudinal aberrations of the eighth embodiment in a pre-decentering state and in an infinity shooting state.
Figure 32B:
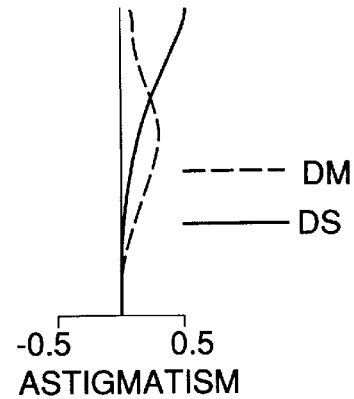
Figure 32C:
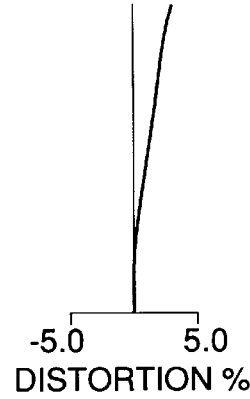
Figure 32D:
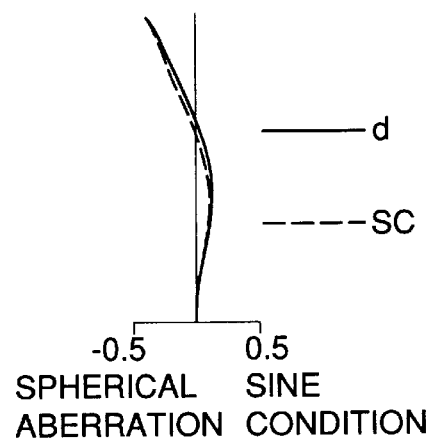
Figure 32E:
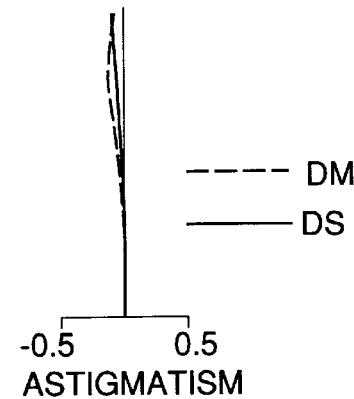
Figure 32F:
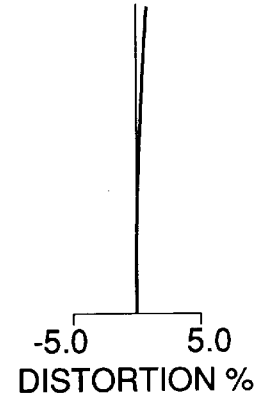
Figure 32G:
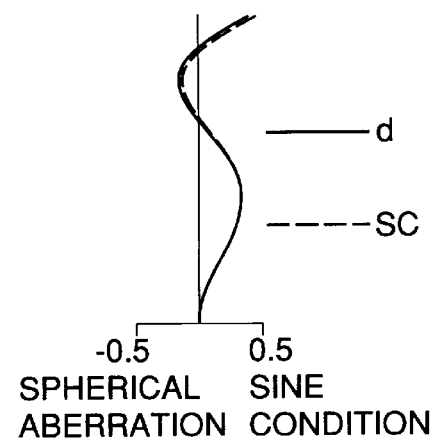
Figure 32H:
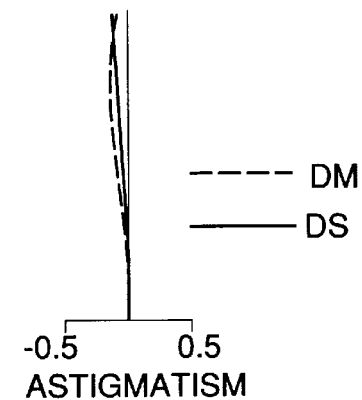
Figure 32I:
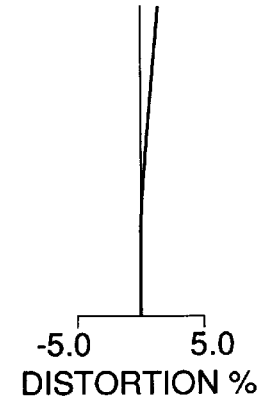
Figure 33A:
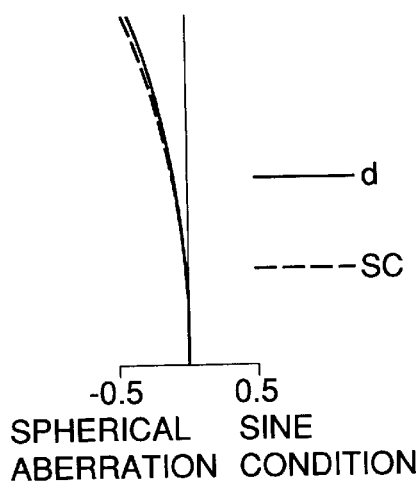
FIGS. 33A to 33F are graphic representations of longitudinal aberrations of the eighth embodiment in a pre-decentering state and in a close shooting state (shooting distance 50 cm)
Figure 33B:
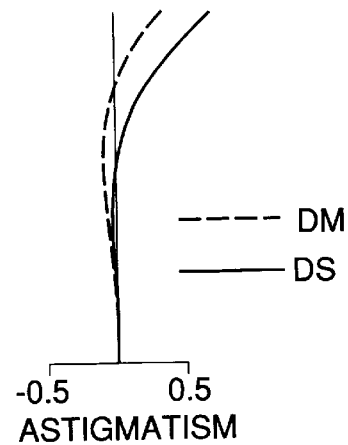
Figure 33C:
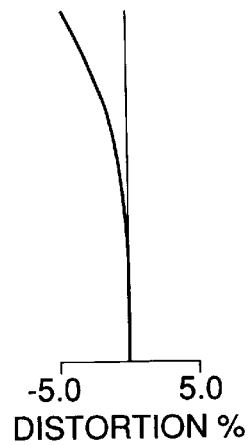
Figure 33D:
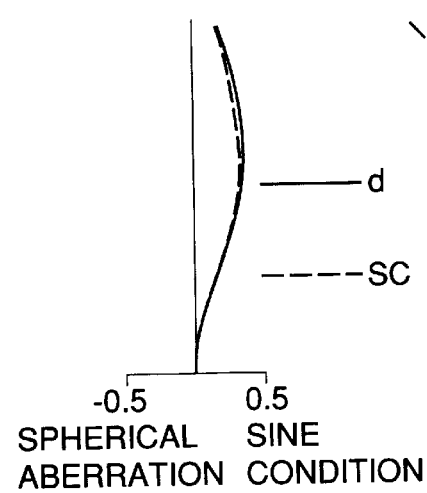
Figure 33E:
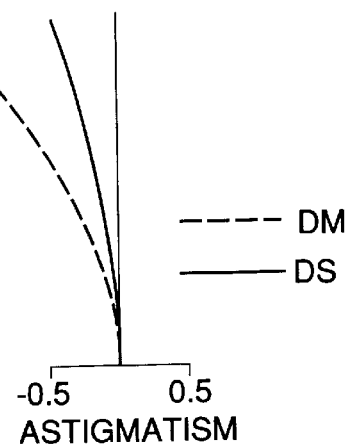
Figure 33F:
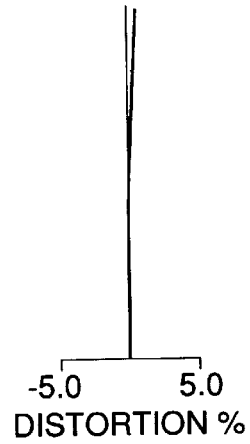
Figure 35A:
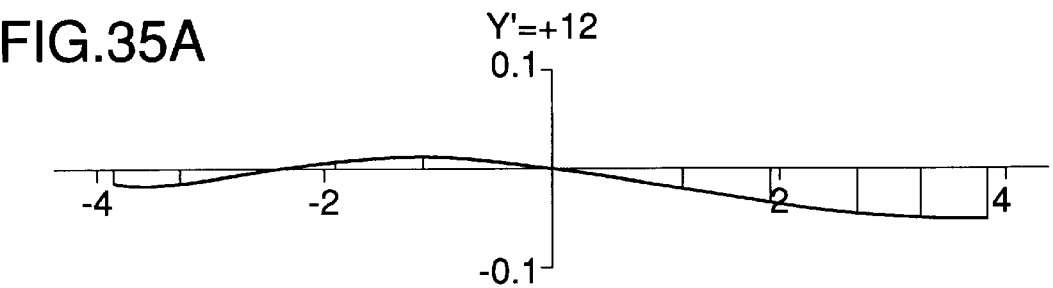
FIGS. 35A to 35E are graphic representations of meridional lateral aberrations of the fifth embodiment in a pre-and post-decentering states, at a middle focal length condition and in an infinity shooting state.
Figure 35B:
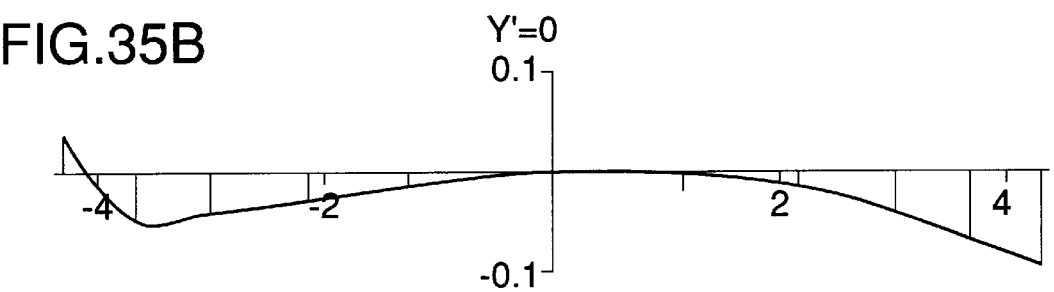
Figure 35C:
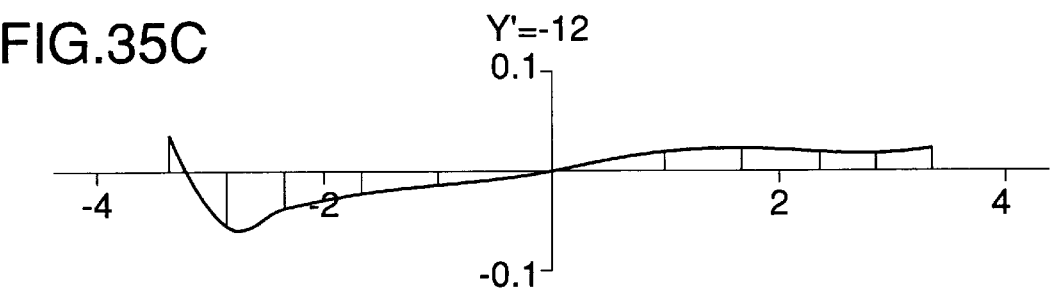
Figure 35D:
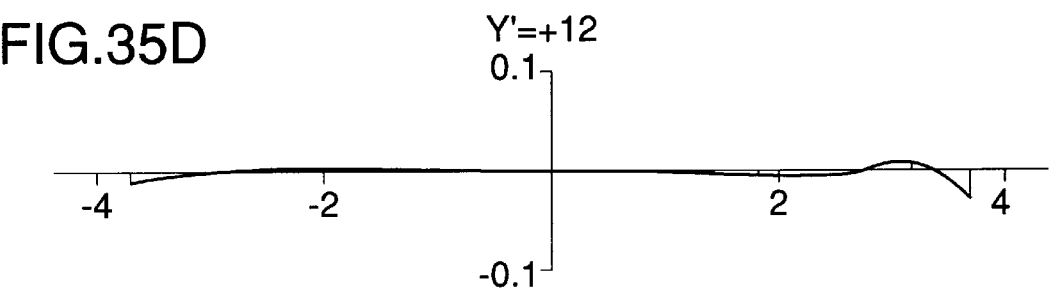
Figure 35E:
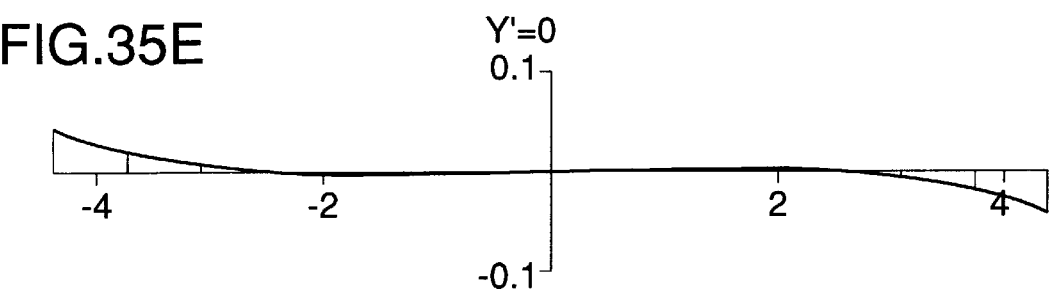
Figure 36A:
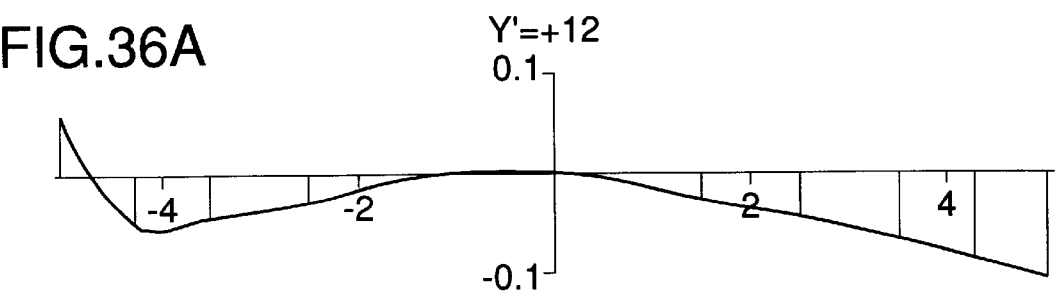
FIGS. 36A to 36E are graphic representations of meridional lateral aberrations of the fifth embodiment in a pre-and post-decentering states, at a longest focal length condition, and in an infinity shooting state.
Figure 36B:
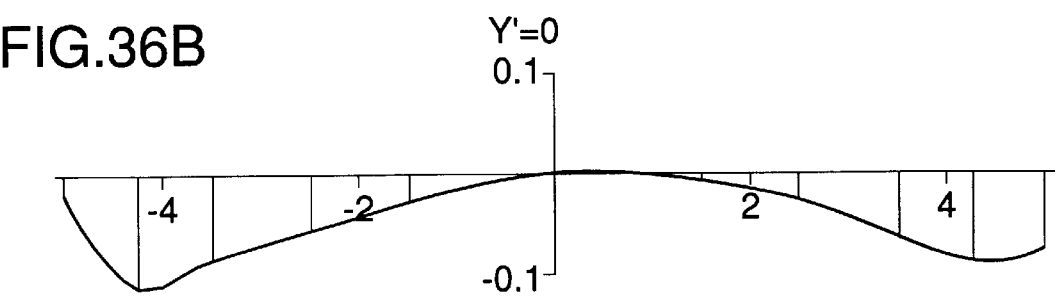
Figure 36C:
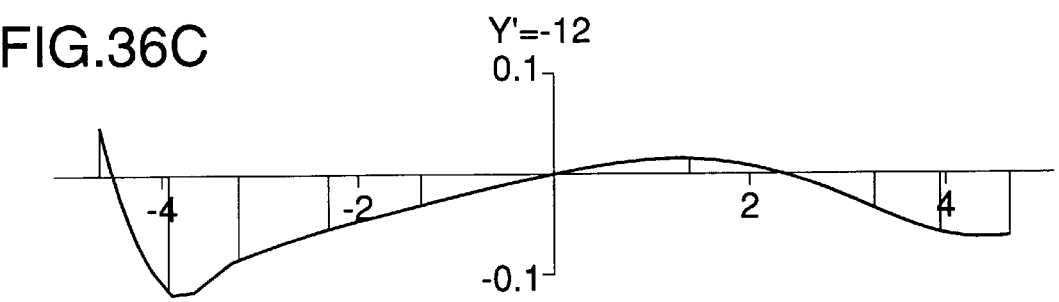
Figure 36D:
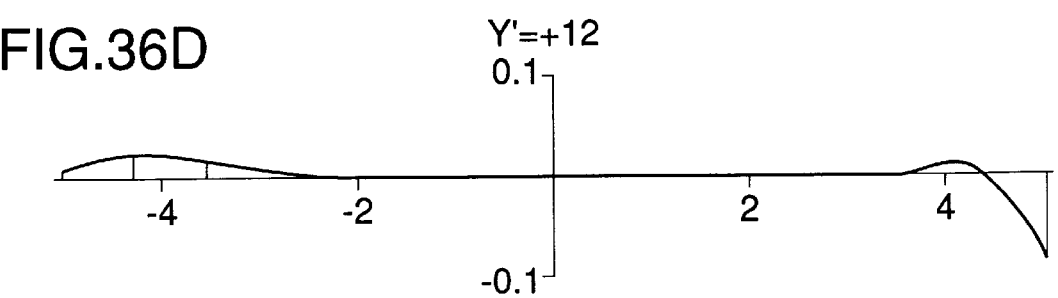
Figure 36E:
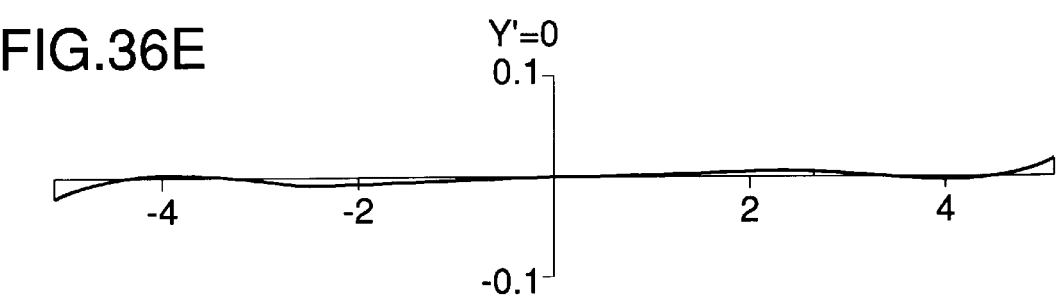
Figure 37A:
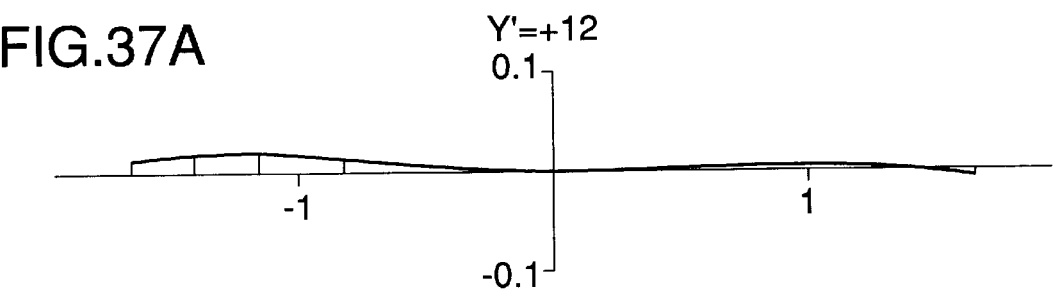
FIGS. 37A to 37E are graphic representations of meridional lateral aberrations of the sixth embodiment in a pre-and post-decentering states, at a shortest focal length condition and in an infinity shooting state.
Figure 37B:
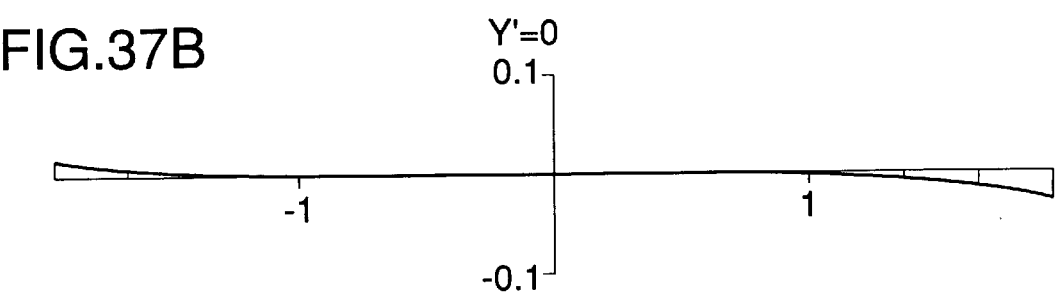
Figure 37C:
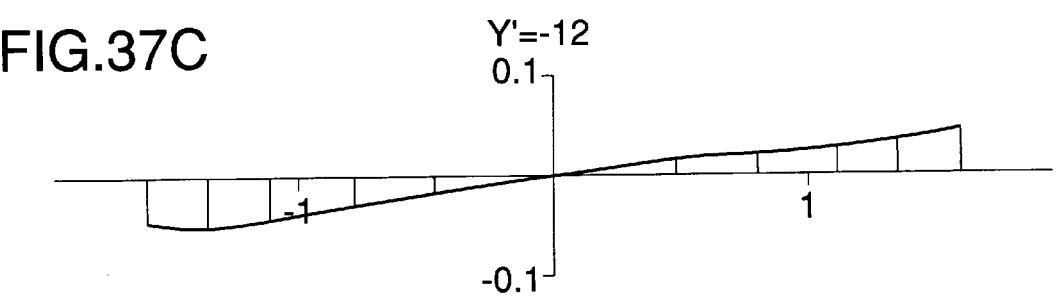
Figure 37D:
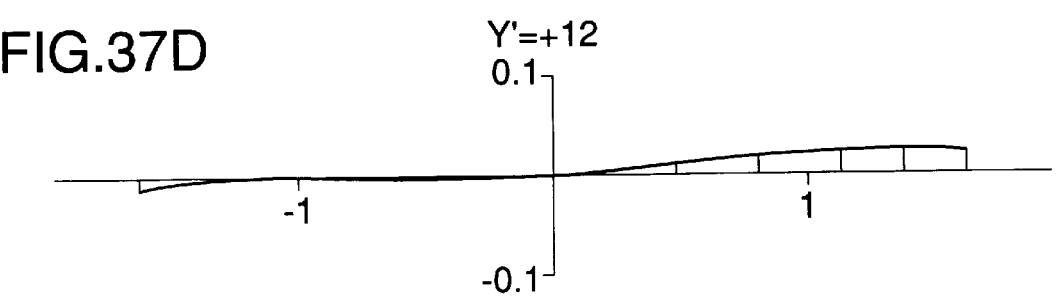
Figure 37E:
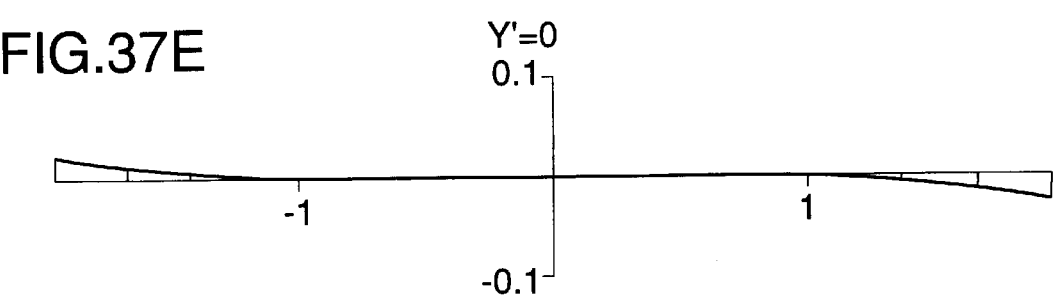
Figure 38A:
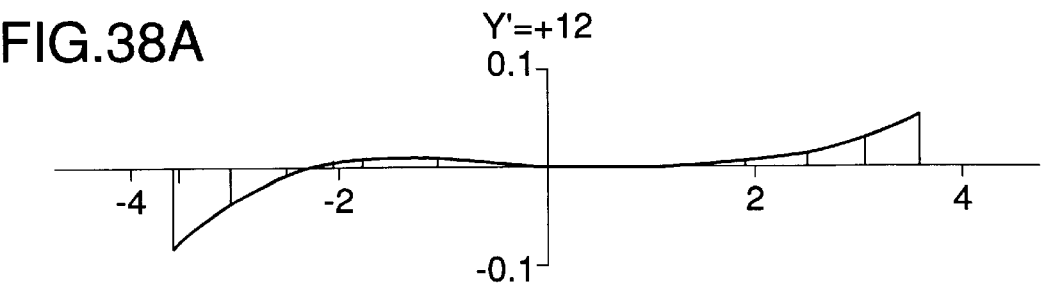
FIGS. 38A to 38E are graphic representations of meridional lateral aberrations of the sixth embodiment in a pre-and post-decentering states, at a middle focal length condition and in an infinity shooting state.
Figure 38B:
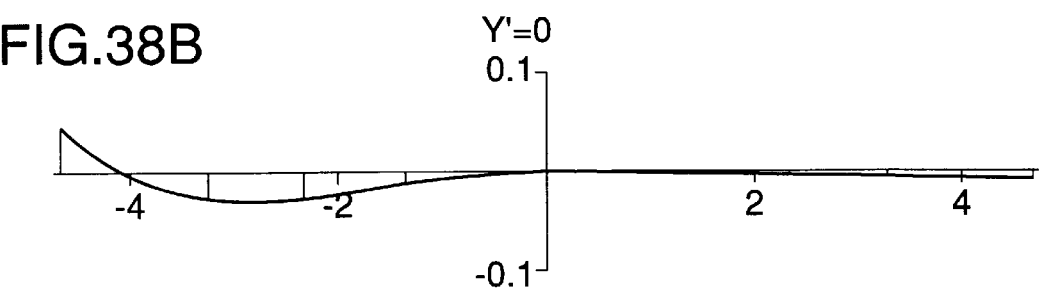
Figure 38C:
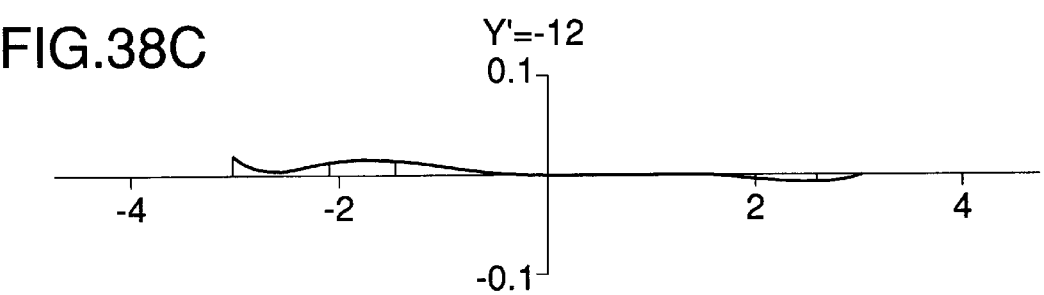
Figure 38D:
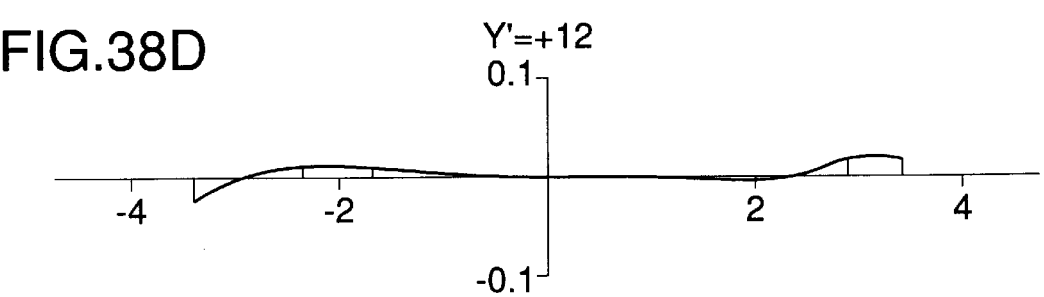
Figure 38E:
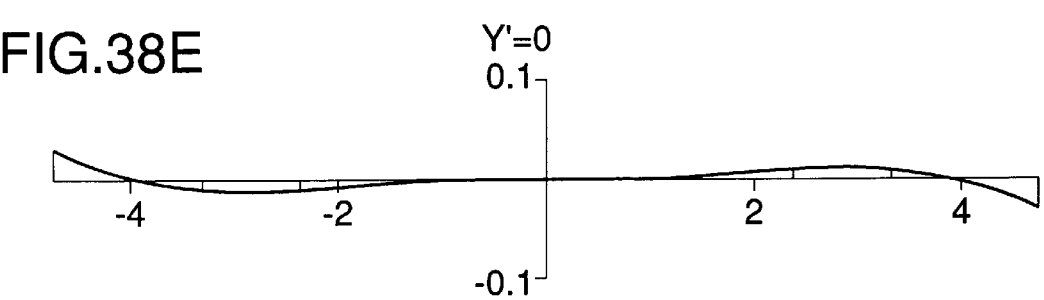
Figure 39A:
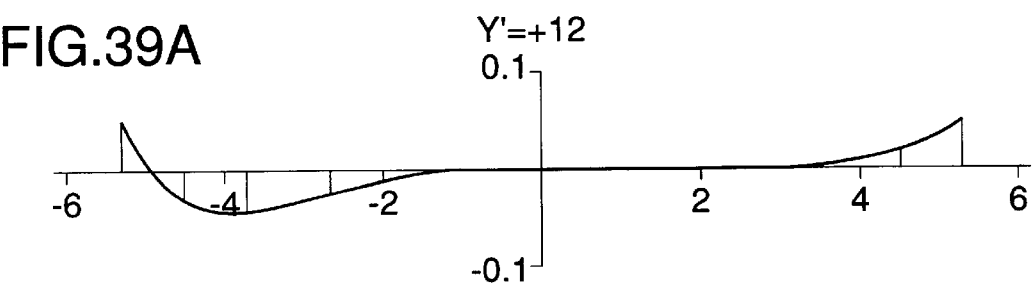
FIGS. 39A to 39E are graphic representations of meridional lateral aberrations of the sixth embodiment in a pre-and post-decentering states, at a longest focal length condition, and in an infinity shooting state.
Figure 39B:
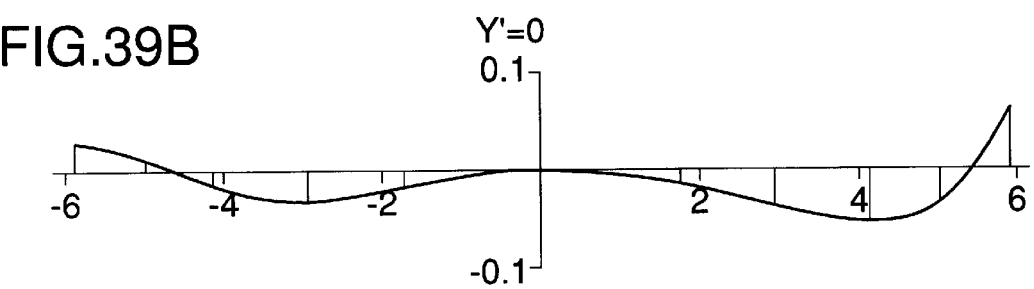
Figure 39C:
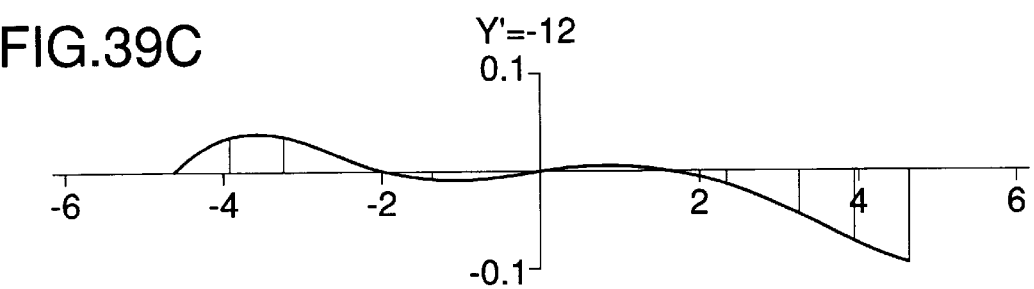
Figure 39D:
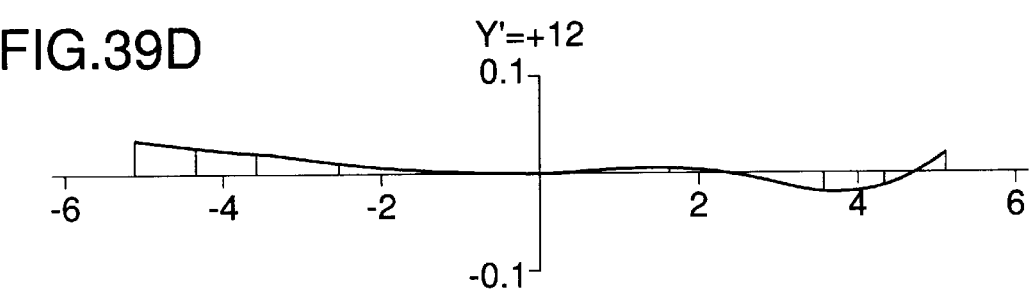
Figure 39E:
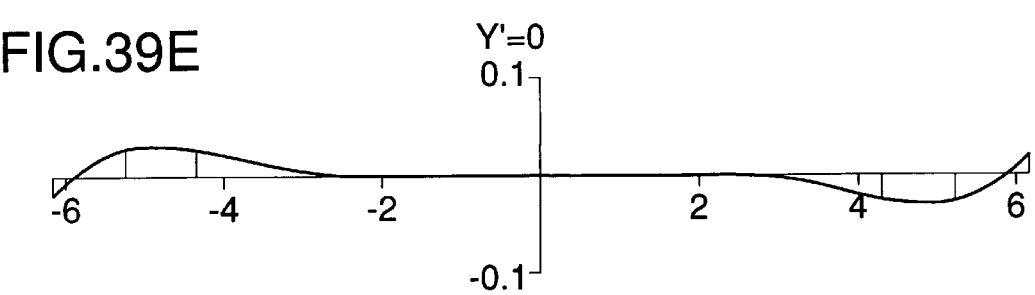
Figure 40A:
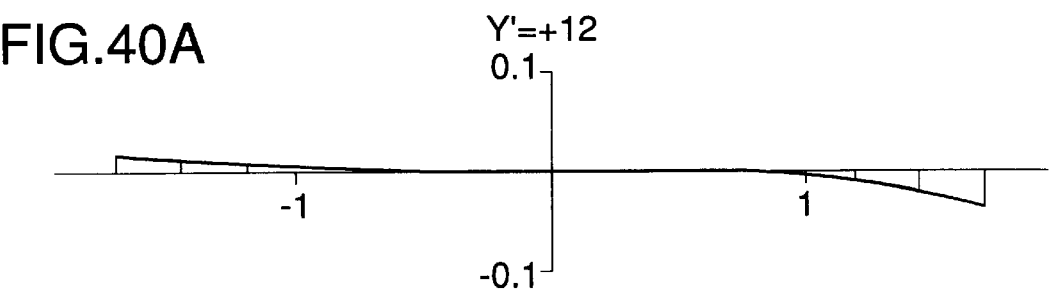
FIGS. 40A to 40E are graphic representations of meridional lateral aberrations of the seventh embodiment in a pre-and post-decentering states, at a shortest focal length condition, and in an infinity shooting state.
Figure 40B:
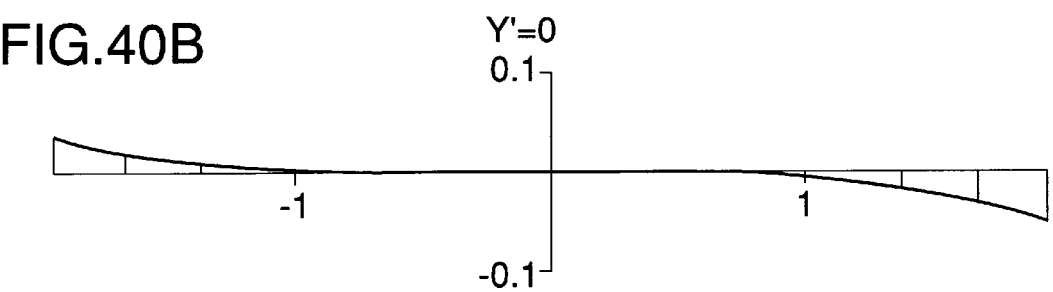
Figure 40C:
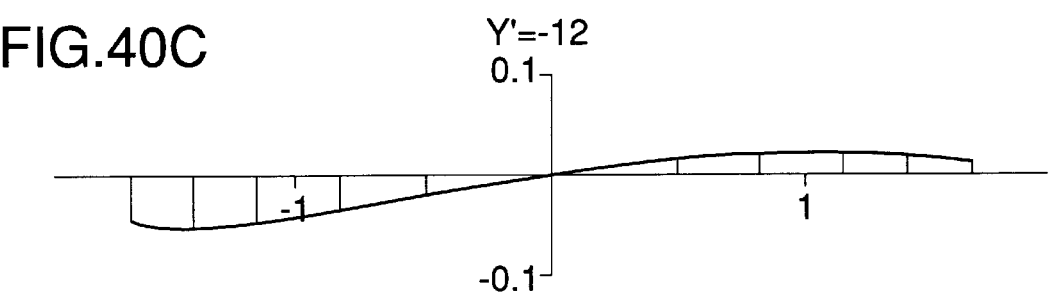
Figure 40D:
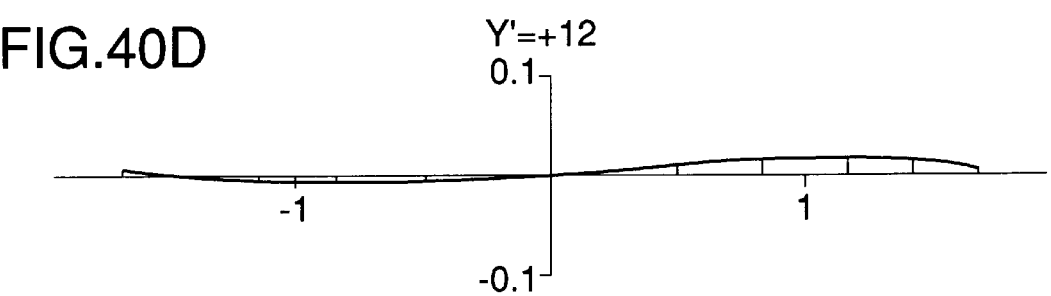
Figure 40E:
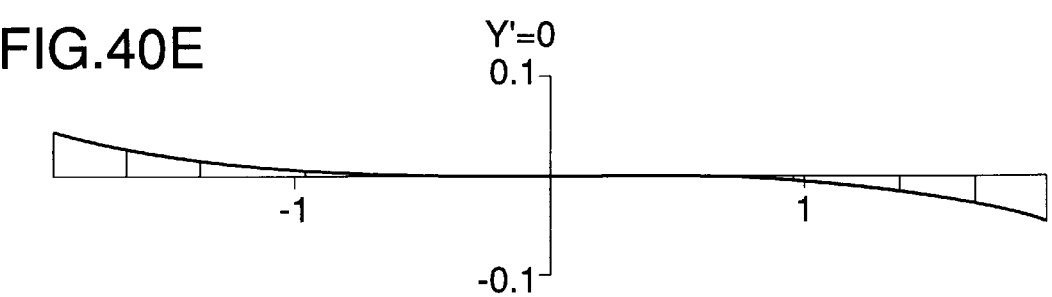
Figure 41A:
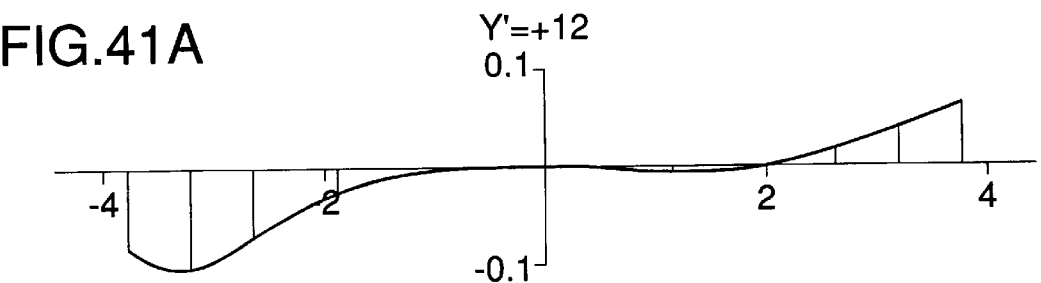
FIGS. 41A to 41E are graphic representations of meridional lateral aberrations of the seventh embodiment in a pre-and post-decentering states, at a middle focal length condition, and in an infinity shooting state.
Figure 41B:
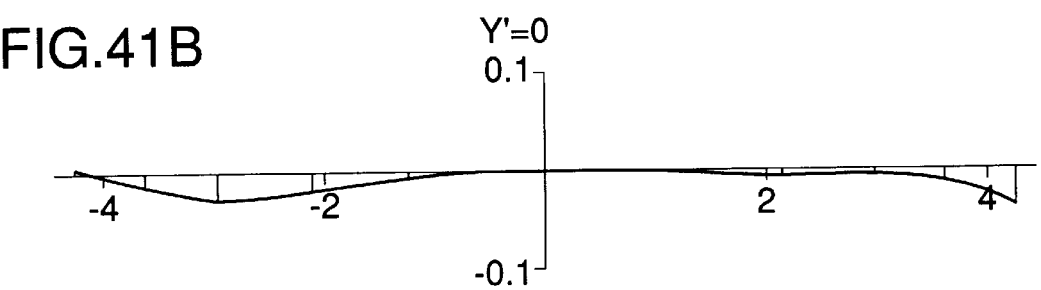
Figure 41C:
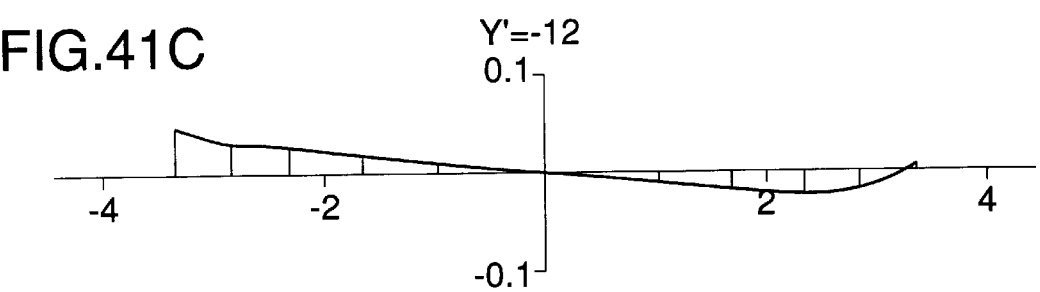
Figure 41D:
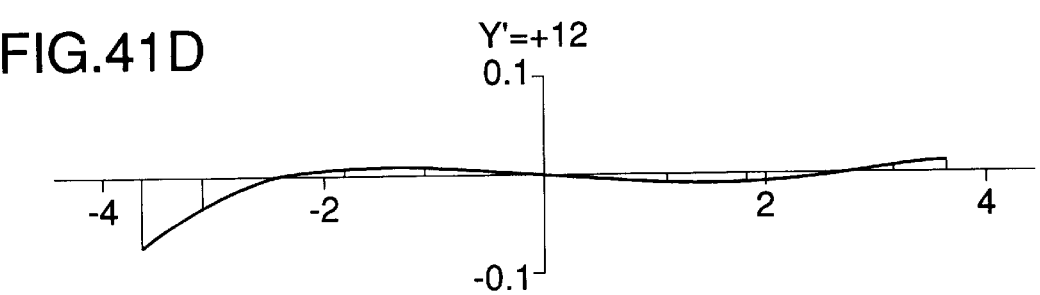
Figure 41E:
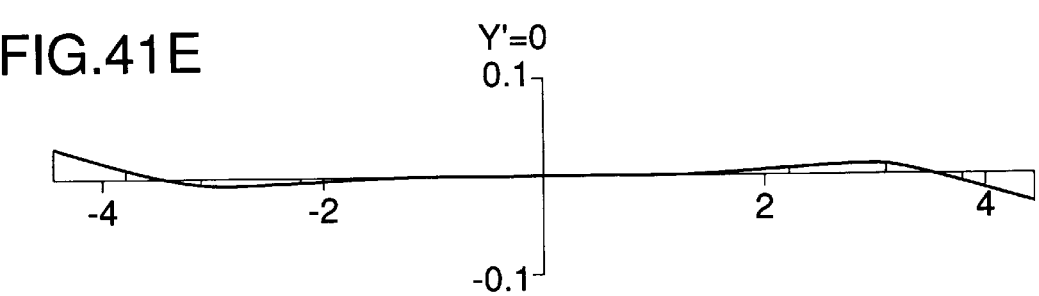
Figure 42A:
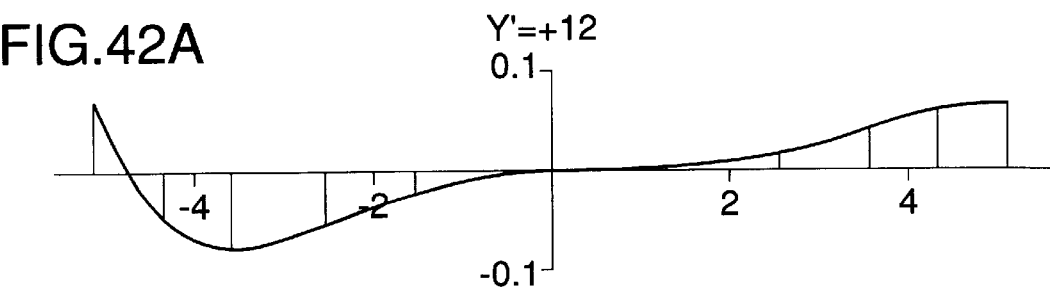
FIGS. 42A to 42E are graphic representations of meridional lateral aberrations of the seventh embodiment in a pre-and post-decentering states, at a longest focal length condition, and in an infinity shooting state.
Figure 42B:
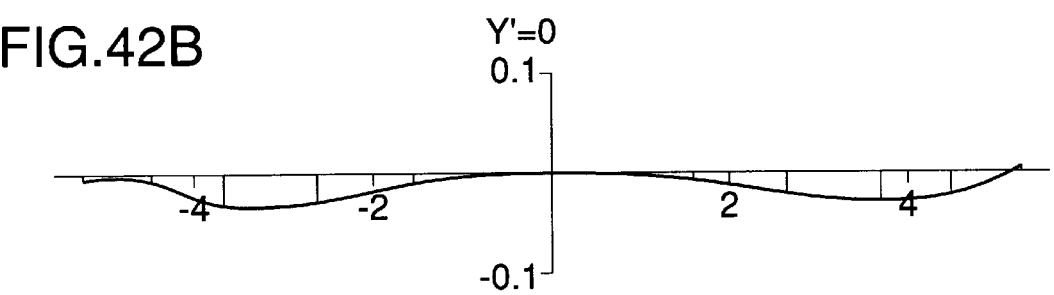
Figure 42C:
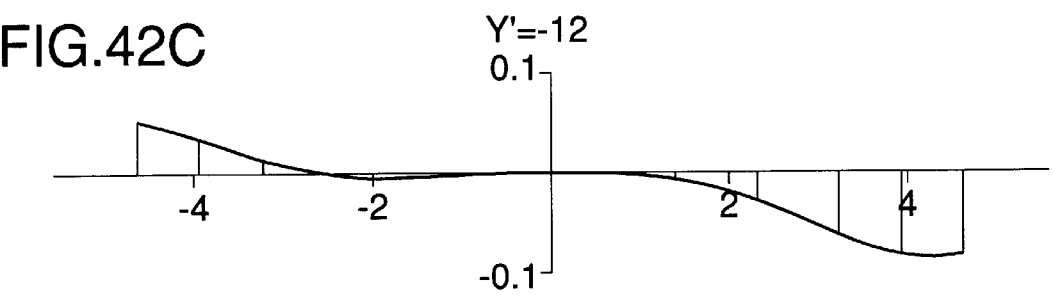
Figure 42D:
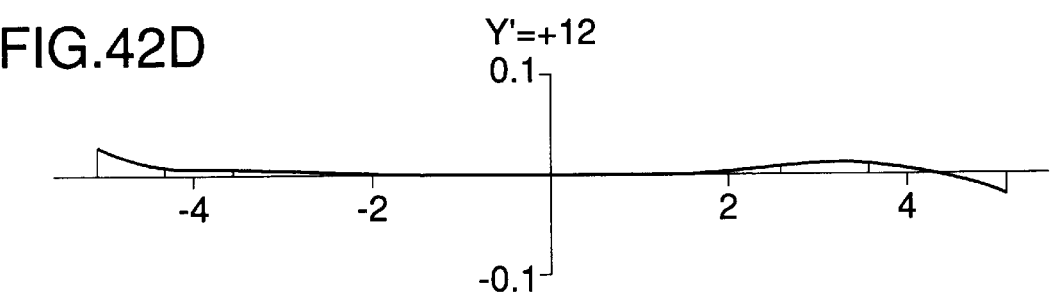
Figure 42E:
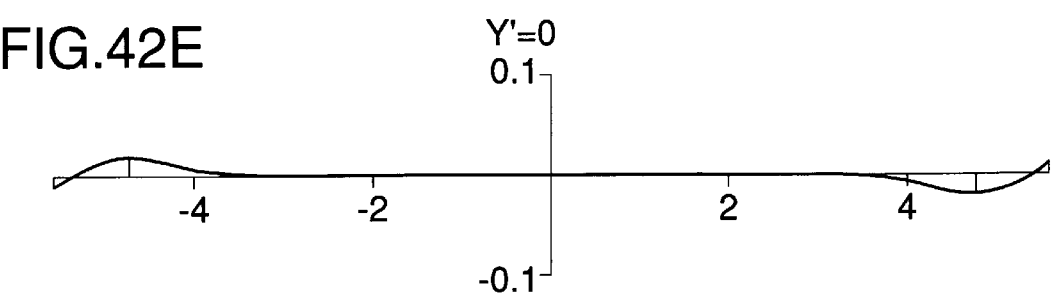
Figure 43A:
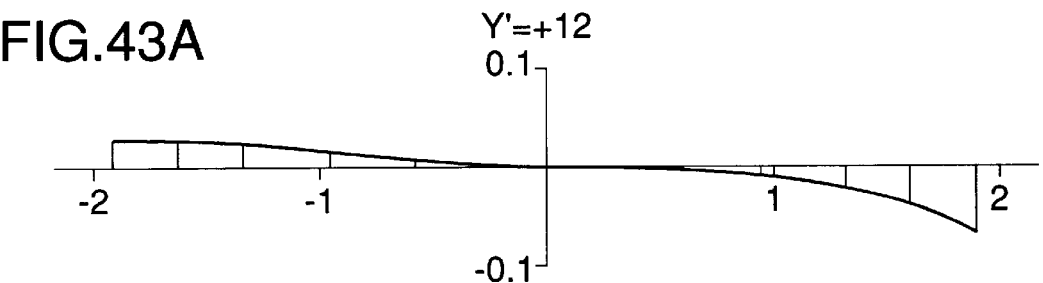
FIGS. 43A to 43E are graphic representations of meridional lateral aberrations of the eighth embodiment in a pre-and post-decentering states, at a shortest focal length condition, and in an infinity shooting state.
Figure 43B:
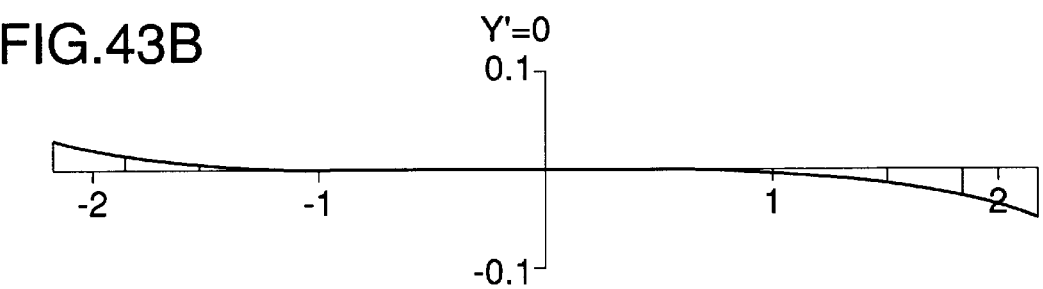
Figure 43C:
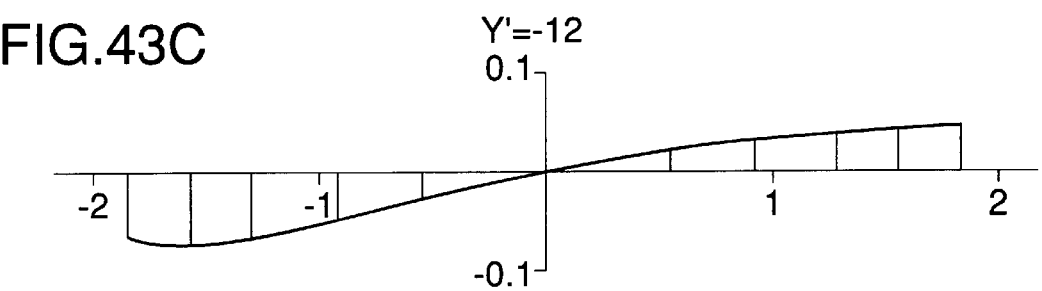
Figure 43D:
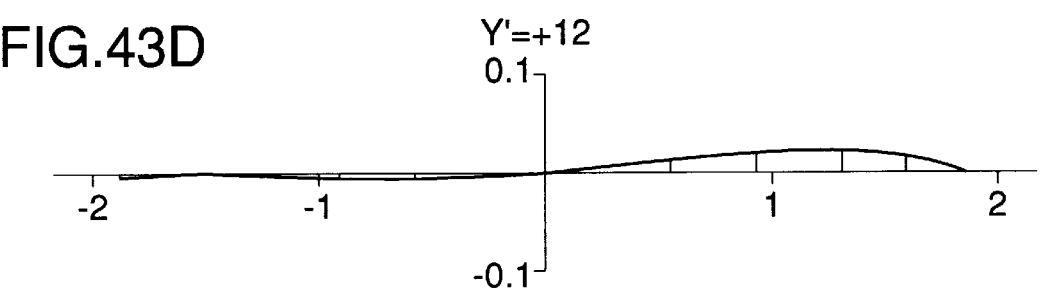
Figure 43E:
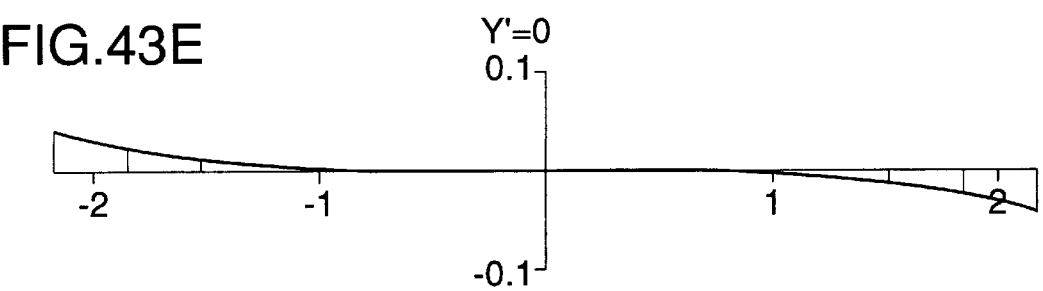
Figure 44A:
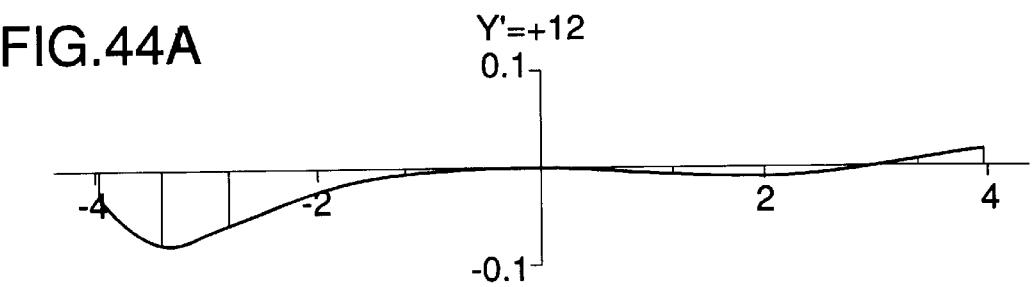
FIGS. 44A to 44E are graphic representations of meridional lateral aberrations of the eighth embodiment in a pre-and post-decentering states, at a middle focal length condition, and in an infinity shooting state.
Figure 44B:
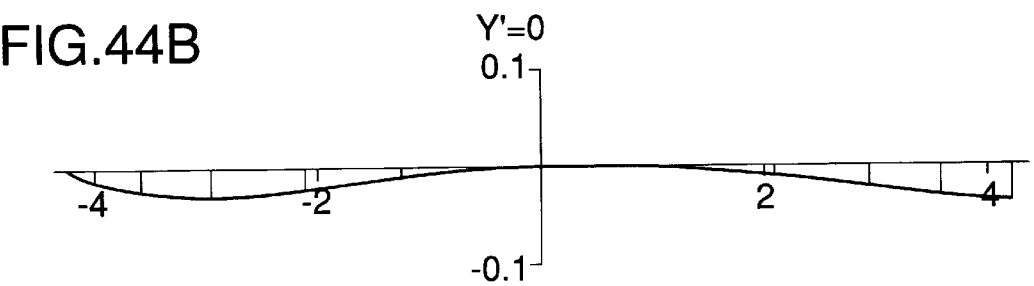
Figure 44C:
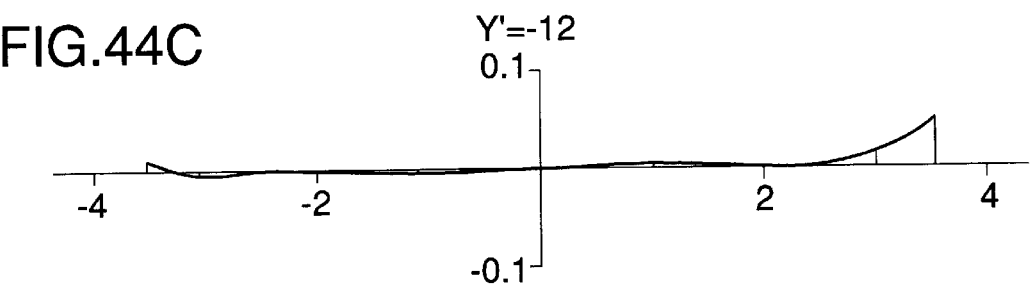
Figure 44D:
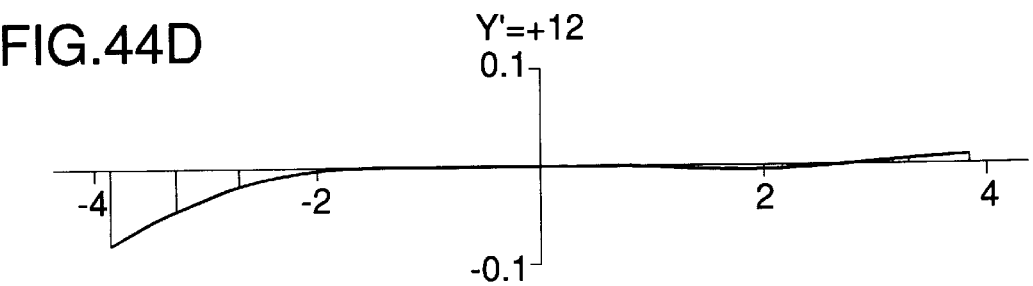
Figure 44E:
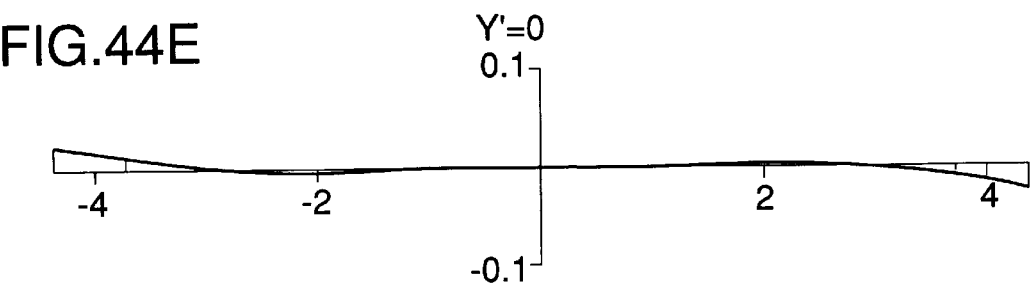
Figure 45A:
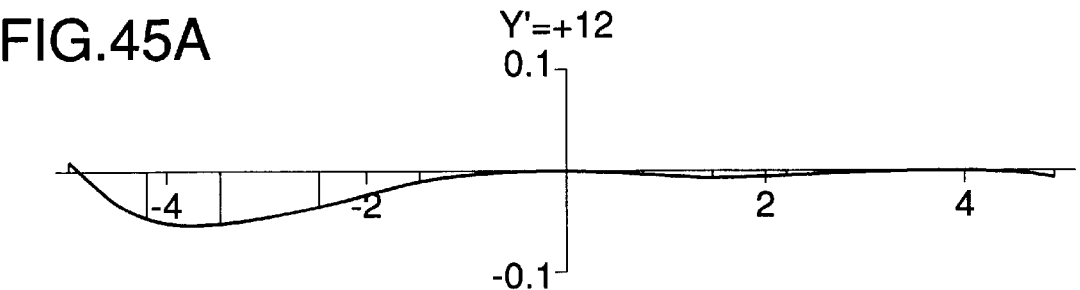
FIGS. 45A to 45E are graphic representations of meridional lateral aberrations of the eighth embodiment in a pre-and post-decentering states, at a longest focal length condition, and in an infinity shooting state.
Figure 45B:
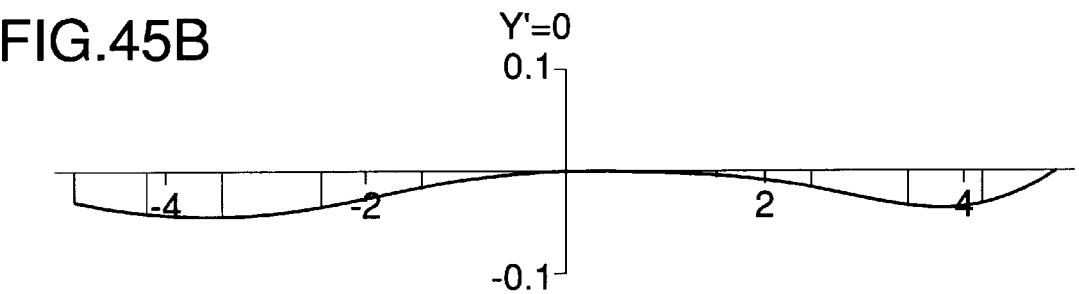
Figure 45C:
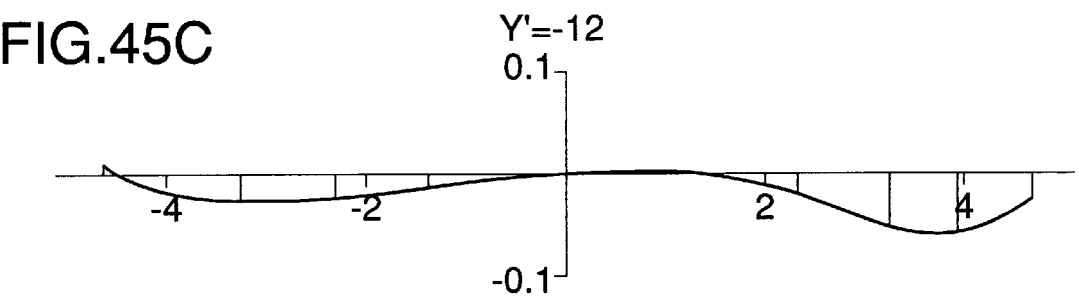
Figure 45D:
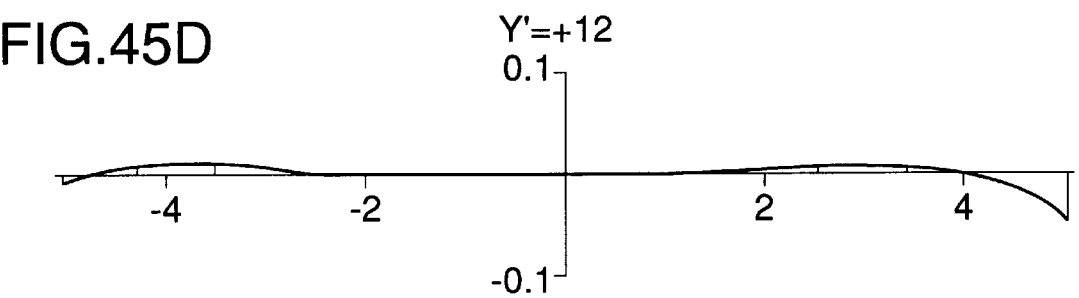
Figure 45E:
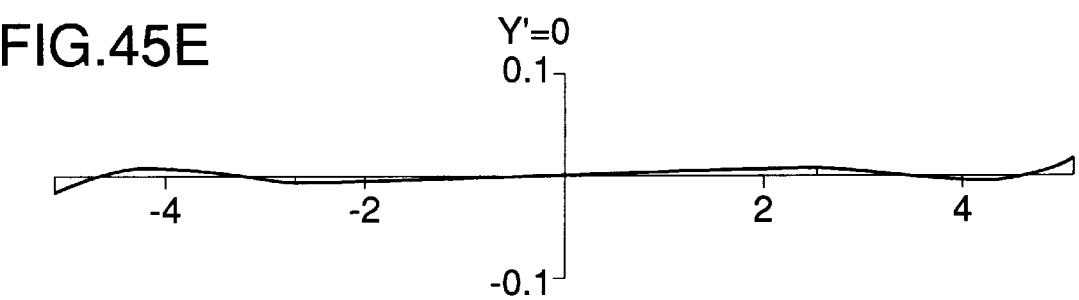

In the second embodiment, focusing from an object at infinity to a close object is performed by moving the second lens unit Gr2 toward the object side as shown by the arrow mF (FIG. 2). The focusing method which moves the second lens unit Gr2 is applicable to the other embodiments.

The first to fourth embodiments employ a zoom lens system configuration comprising at least three lens units in which the first lens unit Gr1 situated at the most object side has a positive optical power and the distances among the lens units are varied to perform zooming. Since zooming is performed by varying the distances among at least three lens units, this zoom lens system configuration has at least two magnification varying lens units. In this case, since the aberration variation caused by variation in magnification can be shared between two or more lens units, the zoom ratio can be extremely high, so that high-magnification zooming can be realized. In a case where a zoom lens system has two zooming lens units, the zoom lens system has one magnification varying lens unit and since the aberration variation that can be corrected by one magnification varying lens unit is limited, high-magnification zooming cannot be realized.

A characteristic of the first to fourth embodiments is that the first lens unit Gr1 is parallelly decentered to perform camera shake compensation. When the first lens unit Gr1 is used as the camera shake compensating lens unit, variation in composite lateral magnification of the lens units situated on the image side of the first lens unit Gr1 (for example, in the fourth embodiment, the second to fifth lens units Gr2 to Gr5) is equal to variation in focal length of the entire zoom lens system. Consequently, variation in camera shake compensation sensitivity and variation in image point movement amount on the image plane when camera shake occurs are equal to each other. That is, when camera shakes of the same angle occur, by the camera shake compensating lens unit moving in a direction perpendicular to the optical axis, the movement amount (i.e., parallel decentering amount) for performing camera shake compensation is fixed irrespective of the focal length during zooming. Consequently, the movement amount of the camera shake compensating lens unit can be decided not according to the focal length but only according to the camera shake angle. If the movement amount of the camera shake compensating lens unit varies according to the focal length, a mechanism for detecting the focal length and means for calculating the movement amount of the camera shake compensating lens unit from the focal length and the camera shake angle will be necessary in driving the camera shake compensating lens unit. This will complicate the mechanism and increase camera/lens cost.

In the zoom lens system configuration comprising at least three lens units in which the first lens unit Gr1 situated at the most object side has a positive optical power, the distances among the lens units are varied to perform zooming and the camera shake compensating lens unit comprising the first lens unit Gr1 is parallelly decentered to perform camera shake compensation like in the first to fourth embodiments (hereinafter, this configuration will be referred to as "characteristic zoom lens system configuration"), it is desired to fulfill the following condition (1) at a given position during zooming:

$$30 < f/\beta r < 120 \qquad (1)$$

where, f is the focal length of the entire zoom lens system, and

βr is the composite lateral magnification of the lens units situated on the image side of the camera shake compensating lens unit.

The condition (1) defines the movement sensitivity of the camera shake compensating lens unit at each focal length. When the upper limit of the condition (1) is exceeded, the movement amount of the camera shake compensating lens unit is too large, so that it is necessary to increase the lens diameter of the camera shake compensating lens unit. Consequently, the optical system increases in size. When less than the lower limit of condition (1), the movement amount of the camera shake compensating lens unit is too small, so that it is necessary to control the position accuracy of the camera shake compensating lens unit with extremely high accuracy in driving the camera shake compensating lens unit. Consequently, high-performance driving means and position detecting means are necessary, which increases camera/lens cost.

The condition (1') shown below shows a more desired range of the condition (1). By fulfilling the condition (1') at a given position during zooming, a zoom lens system having a camera shake compensating function being more compact and having a low manufacturing accuracy is obtained.

$$40 < f/\beta r < 80 \qquad (1')$$

In the above-described characteristic zoom lens system configuration, it is desired to fulfill the following condition (2):

$$0.1 < Bfw/Yim < 0.25 \qquad (2)$$

where,

Bfw is the back focus at the shortest focal length condition [W], and

Yim is the image diagonal length.

The condition (2) defines the ratio of the lens back focal length at the shortest focal length condition [W] to the image diagonal length. When the upper limit of the condition (2) is exceeded, the back focus at the shortest focal length condition [W] is too large. Typically, a lens shutter camera is in the shortest focal length condition [W] when carried. When the back focus increases, the size of the optical system increases in the direction of the optical axis to increase the total length, so that the lens shutter camera is cumbersome to carry about. When less than the lower limit of condition (2) is exceeded, the back focus at the shortest focal length condition [W] is too small, so that it is necessary to increase the diameter of the rearmost lens element. Consequently, the size of the optical system increases in a direction perpendicular to the optical axis.

The condition (2') shown below shows a more desired range of the condition (2). By fulfilling the condition (2'), a more compact zoom lens system having a camera shake compensating function is obtained as an optical system for use in lens-shutter cameras.

$$0.13 < Bfw/Yim < 0.21 \quad (2')$$

In the above-described characteristic zoom lens system configuration, it is desired to fulfill the following condition (3):

$$0.6 < Lt/f_t < 1.0 \quad (3)$$

where,

Lt is the total length at the longest focal length condition [T], and $f_t$ is the focal length of the entire zoom lens system at the longest focal length condition [T].

The condition (3) defines the telephoto ratio at the longest focal length condition [T]. When the upper limit of the condition (3) is exceeded, the telephoto ratio at the longest focal length condition [T] is too high, which runs counter to size reduction. When less than the lower limit of condition (3), although the total length at the longest focal length condition [T] decreases, it is necessary to increase the optical power of each lens unit, so that it is difficult to restrain the generation of aberrations due to high optical power. As a result, excellent optical performance cannot be obtained.

The condition (3') shown below shows a more desired range of the condition (3). By fulfilling the condition (3'), a more compact high-performance zoom lens system having a camera shake compensating function is obtained as an optical system for lens-shutter cameras.

$$0.7 < Lt/ft < 0.8 \quad (3')$$

In the above-described characteristic zoom lens system configuration, it is desired to fulfill the following condition (4):

$$4.0 < f_t/f_w^2 \times Yim < 9.0 \quad (4)$$

where, $f_w$ is the focal length of the entire zoom lens system at the shortest focal length condition [W].

The condition (4) defines the ratio of the zoom ratio to the focal length at the shortest focal length condition [W]. Generally, the more the focal length at the shortest focal length condition [W] is increased, the higher the zoom ratio is and the higher the achieved magnification is. When the upper limit of the condition (4) is exceeded, the zoom ratio is too high, so that the camera increases in size. When less than the lower limit of condition (4), high magnification cannot be achieved or the focal length is longer than the middle focal length even if high magnification is achieved, so that this optical system is unsuitable for use in high-magnification lens-shutter cameras.

When a lens unit is decentered at the time of camera shake, axial lateral chromatic aberration is generated. To restrain this, it is desired for the camera shake compensating lens unit to be color-corrected. To do so, it is necessary for the camera shake compensating lens unit to include at least one positive lens element and at least one negative lens element. In the first to fourth embodiments, since the first lens unit Gr1 used as the camera shake compensating lens unit includes one positive lens element and one negative lens element, the axial lateral chromatic aberration generated at the time of camera shake compensation can be corrected. In addition, since the camera shake compensating lens unit includes the minimum number of lens elements necessary for color correction, the lens weight can be minimized, so that the load on the camera shake compensating lens unit decreases.

From the above-mentioned viewpoint, in the above-described characteristic zoom lens system configuration, it is desired to provide in the first lens unit Gr1 a camera shake compensating lens unit including at least one positive lens element and at least one negative lens element, and it is desired to fulfill the condition (5) shown below. By fulfilling the condition (5), the axial lateral chromatic aberration generated at the time of camera shake compensation can be restrained.

$$\nu p > \nu n \quad (5)$$

where,

νp is the Abbe number of the positive lens element in the camera shake compensating lens unit, and νn is the Abbe number of the negative lens element in the camera shake compensating lens unit.

When a lens unit is moved in a direction perpendicular to the optical axis for camera shake compensation, in a camera shake compensated state (post-decentering state), light passes through a portion where no light passes in normal state (pre-decentering state). There is a possibility that this light becomes harmful light to degrade imaging performance. For this reason, it is desired to intercept the harmful light at the time of camera shake compensation by providing a stationary diaphragm on the object side of the camera shake compensating lens unit, in the camera shake compensating lens unit or on the image side of the camera shake compensating lens unit. Thereby, excellent imaging performance is obtained also in camera shake compensated state.

Zoom lens systems according to the fifth to seventh embodiments each comprise, from the object side, a first lens unit Gr1 having a positive optical power, a second lens unit Gr2 having a negative optical power, a third lens unit Gr3 having a positive optical power, a fourth lens unit Gr4 having a positive optical power and a fifth lens unit Gr5 having a negative optical power. As shown by the arrows m1 to m5 in FIGS. 22 to 24, during zooming from the shortest focal length condition [W] to the longest focal length condition [T], the lens units move so that the distance between the first lens unit Gr1 and the second lens unit Gr2 increases, the distance between the second lens unit Gr2 and the third lens unit Gr3 decreases and the distance between the fourth lens unit Gr4 and the fifth lens unit Gr5 decreases. Between the most image side surface of the second lens unit Gr2 and the most object side surface of the third lens unit Gr3, a diaphragm S which moves together with the third lens unit Gr3 during zooming is disposed.

A zoom lens system according to the eighth embodiment comprises, from the object side, a first lens unit Gr1 having a positive optical power, a second lens unit Gr2 having a negative optical power, a third lens unit Gr3 having a positive optical power and a fourth lens unit Gr4 having a negative optical power. As shown by the arrows m1 to m4 in FIG. 25, during zooming from the shortest focal length condition [W] to the longest focal length condition [T], the lens units move so that the distance between the first lens unit Gr1 and the second lens unit Gr2 increases, the distance between the second lens unit Gr2 and the third lens unit Gr3 decreases and the distance between the third lens unit Gr3 and the fourth lens unit Gr4 decreases. Between the most image side surface of the second lens unit Gr2 and the most object side surface of the third lens unit Gr3, a diaphragm S which moves together with the third lens unit Gr3 during zooming is disposed.

In the fifth to seventh embodiment, the lens units include the following lens elements from the object side: The first lens unit Gr1 includes a negative meniscus lens element convex to the object side and a positive lens element convex to the object side. The second lens unit Gr2 includes a bi-concave negative lens element and a positive lens element convex to the object side. The third lens unit Gr3 includes a bi-convex positive lens element and a negative lens element concave to the image side. The fourth lens unit Gr4 includes a bi-convex positive doublet lens element. The fifth lens unit Gr5 includes a positive lens element convex to the image side and a negative lens element concave to the object side.

In the eighth embodiment, the lens units include the following lens elements from the object side: The first lens unit Gr1 includes a negative meniscus lens element convex to the object side and a positive lens element convex to the object side. The second lens unit Gr2 includes a biconcave negative lens element and a positive lens element convex to the object side. The third lens unit Gr3 includes a bi-convex positive lens element, a negative lens element concave to the image side and a bi-convex positive doublet lens element. The fourth lens unit Gr4 includes a positive lens element convex to the image side and a negative lens element concave to the object side.

The fifth to eighth embodiments has a zoom lens system configuration comprising from the object side the first lens unit Gr1 having a positive optical power, the second lens unit Gr2 having a negative optical power, the third lens unit Gr3 having a positive optical power, and a negative rearmost lens unit at the most image side. Since the distances among at least four zooming lens units are varied to perform zooming, this zoom lens system configuration has at least three magnification varying lens units. In this case, since magnification variation can be shared among at least three lens units, aberration correction of the lens units can be shared to realize high-magnification zooming. Since the lens system has a telephoto-type configuration as a whole, an optical system being compact and having a small lens back focal length can be realized.

In the zoom lens system like the fifth to eighth embodiments comprising, from the object side, the first lens unit Gr1 having a positive optical power, the second lens unit Gr2 having a negative optical the third lens unit Gr3 having a positive optical power, and a rearmost lens unit having a negative optical power at the most image side, a zoom lens system configuration uses the third lens unit Gr3 as the camera shake compensating lens unit. The third lens unit Gr3 is decentered in direction perpendicular to the optical axis like in the fifth to seventh embodiments (hereinafter, this configuration will be referred to as "first zoom configuration"). In a zoom lens system configuration using a front lens unit GrA as the camera shake compensating lens unit in which the third lens unit Gr3 includes from the object side the front lens unit GrA and a rear lens unit GrB and the front lens unit GrA is decentered in a direction perpendicular to the optical axis to perform camera shake compensation like in the eighth embodiment (hereinafter, this configuration will be referred to as "second zoom configuration"), it is desired to fulfill the following condition (6) at a given position during zooming:

$$8 < f/\{\beta r \times (1-\beta d)\} < 100 \tag{6}$$

where, f is the focal length of the entire zoom lens system, $\beta r$ is the composite lateral magnification of the lens units situated on the image side of the camera shake compensating lens unit (for example, in the fifth embodiment, the composite lateral magnification of the fourth and fifth lens units Gr4 and Gr5), and $\beta d$ is the lateral magnification of the camera shake compensating lens unit (for example, in the fifth embodiment, the lateral magnification of the third lens unit Gr3).

The condition (6) defines the movement sensitivity of the camera shake compensating lens unit at each focal length. When the upper limit of the condition (6) is exceeded, the movement amount of the camera shake compensating lens unit is too large, so that it is necessary to increase the lens diameter of the camera shake compensating lens unit. Consequently, the optical system increases in size. When less than the lower limit of condition (6), the movement amount of the camera shake compensating lens unit is too small, so that it is necessary to control the position accuracy of the camera shake compensating lens unit with extremely high accuracy in driving the camera shake compensating lens unit. Consequently, high-performance driving means and position detecting means are necessary, which increases camera/lens cost.

In the above-described first and second zoom configurations, it is desired to fulfill the following condition (7):

$$-0.8 < f_{last}/f_w < -0.5 \tag{7}$$

where, $f_{last}$ is the focal length of the rearmost lens unit, and $f_w$ is the focal length of the entire zoom lens system at the shortest focal length condition [W].

The condition (7) defines the ratio of the focal length of the rearmost lens unit to the focal length at the shortest focal length condition [W]. When the upper limit of the condition (7) is exceeded, the optical power of the rearmost lens unit is too strong, so that aberrations (particularly, curvature of field) generated in the rearmost lens unit is too great. As a result, excellent optical performance cannot be obtained. When less than the lower limit of condition (7), although this state is advantageous in aberration correction because the optical power of the rearmost lens unit is weak, the degree of telephoto decreases to increase the optical system in size, so that a compact optical system cannot be obtained.

In the fifth to eighth embodiments, the second lens unit Gr2 is moved toward the object side as shown by the arrow mF (FIGS. 22 to 25) to perform focusing from an object at infinity to a close object. Since camera shake compensation is performed by the third lens unit Gr3, focusing and camera shake compensation can be performed by different lens units. Since the camera shake compensating lens unit Gr3 or GrA is situated on the image side of the focusing lens unit Gr2, the magnification of the camera shake compensating lens unit does not vary according to the shooting distance, so that the movement amount of the camera shake compensating lens unit can be fixed.

In the above-described first and second zoom configurations, it is desired to fulfill the above-described condition (2) shown below.

$$0.1 < Bfw/Yim < 0.25 \quad (2)$$

where,

Bfw is the back focus at the shortest focal length condition [W], and

Yim is the image diagonal length.

The condition (2) defines the ratio of the lens back focal length at the shortest focal length condition [W] to the image diagonal length. When the upper limit of the condition (2) is exceeded, the back focus at the shortest focal length condition [W] is too large. Typically, a lens shutter camera is in the shortest focal length condition [W] when carried. When the back focus increases, the size of the optical system increases in the direction of the optical axis to increase the total length, so that the lens shutter camera is cumbersome to carry about. When less than the lower limit of condition (2), the back focus at the shortest focal length condition [W] is too small. When the back focus decreases, the distance from the rearmost lens unit to the image plane decreases, so that it is necessary to increase the diameter of the rearmost lens unit. As a result, the size of a optical system increases in the direction perpendicular to the optical axis.

The condition (2') shown below shows a more desired range of the condition (2). By fulfilling the condition (2'), a more compact zoom lens system having a camera shake compensating function is obtained as an optical system for use in lens-shutter cameras.

$$0.13 < Bfw/Yim < 0.21 \quad (2')$$

In the above-described first and second zoom configurations, it is desired to fulfill the following condition (3):

$$0.6 < Lt/f_t < 1.0 \quad (3)$$

where,

Lt is the total length at the longest focal length condition [T], and $f_t$ is the focal length of the entire zoom lens system at the longest focal length condition [T].

The condition (3) defines the telephoto ratio at the longest focal length condition [T]. When the upper limit of the condition (3) is exceeded, the telephoto ratio at the longest focal length condition [T] is too high, which runs counter to size reduction. When less than the lower limit of condition (3), although the total length at the longest focal length condition [T] decreases, it is necessary to increase the optical power of each lens unit, so that it is difficult to restrain the generation of aberrations due to high optical power. As a result, excellent optical performance cannot be obtained.

The condition (3') shown below shows a more desired range of the condition (3). By fulfilling the condition (3'), a more compact high-performance zoom lens system having a camera shake compensating function is obtained as an optical system for lens-shutter cameras.

$$0.7 < L_t/f_t < 0.8 \quad (3')$$

In the above-described first and second zoom configurations, it is desired to fulfill the following condition (4):

$$4.0 < f_t/f_w^2 \times Yim < 9.0 \quad (4)$$

where, $f_w$ is the focal length of the entire zoom lens system at the shortest focal length condition [W].

The condition (4) defines the ratio of the zoom ratio to the focal length at the shortest focal length condition [W]. Generally, the more the focal length at the shortest focal length condition [W] is increased, the higher the zoom ratio is and the higher the achieved magnification is. When the upper limit of the condition (4) is exceeded, the zoom ratio is too high, so that the camera increases in size. When less than the lower limit of condition (4), high magnification cannot be achieved or the focal length is longer than the middle focal length even if high magnification is achieved, so that this optical system is unsuitable for use in high-magnification lens-shutter cameras.

When a lens unit is decentered at the time of camera shake, axial lateral chromatic aberration is generated. To restrain this, it is desired for the camera shake compensating lens unit to be color-corrected. To do so, it is necessary for the camera shake compensating lens unit to include at least one positive lens element and at least one negative lens element. In the fifth to seventh embodiments, the third lens unit Gr3 used as the camera shake compensating lens unit includes one positive lens element and one negative lens element, and in the eighth embodiment, the front lens unit GrA of the third lens unit Gr3 used as the camera shake compensating lens unit includes one positive lens element and one negative lens element. For this reason, the axial lateral chromatic aberration generated at the time of camera shake compensation can be corrected. In addition, since the camera shake compensating lens unit includes the minimum number of lens elements necessary for color correction, the lens weight can be minimized, so that the load on the camera shake compensating lens unit decreases.

From the above-mentioned viewpoint, in the above-described first zoom configuration, it is desired for the third lens unit Gr3 to include at least one positive lens element and at least one negative lens element and to fulfill the condition (5) shown below. In the above-described second zoom configuration, it is desired for the front lens unit GrA to include at least one positive lens element and one negative lens element and to fulfill the condition (5). By fulfilling the condition (5), the generation of the axial lateral chromatic aberration at the time of camera shake compensation can be restrained.

$$\nu p > \nu n \quad (5)$$

where,

νp is the Abbe number of the positive lens element in the camera shake compensating lens unit, and νn is the Abbe number of the negative lens element in the camera shake compensating lens unit.

When the camera shake compensating lens unit includes the minimum number of lens elements like in the fifth to eighth embodiments, it is desired to provide an aspherical surface in the camera shake compensating lens unit in order to eliminate aberrations generated at the time of camera shake compensation. By forming the camera shake compensating lens unit of two lens elements, the number of lens elements of the camera shake compensating lens unit can be minimized. However, since the degree of design freedom is insufficient in the lens unit configuration having two lens elements, it is difficult to obtain excellent performance at the time of camera shake compensation. Since a further degree of design freedom can be added by adding an aspherical surface in the camera shake compensating lens unit, excellent optical performance can be obtained at the time of camera shake compensation. It is desired for the aspherical surface added in the camera shake compensating lens unit to fulfill the condition (8) shown below. Moreover, it is desired for the aspherical surface to fulfill the condition (8) for all a heights y in the direction perpendicular to the optical axis fulfilling 0.5 ymax≦y≦1.0 ymax, where ymax is the maximum effective radius of the aspherical surface added in the camera shake compensating lens unit.

$$-10 < (|x| - |x0|)/\{C0 \cdot (N'-N)\} < -0.05 \tag{8}$$

where, $|x|-|x0|$ is the difference in the direction of the optical axis between the aspherical surface and a reference spherical surface having a reference curvature thereof, C0 is the curvature of the reference spherical surface (i.e., the reference curvature of the aspherical surface), N' is the refractive index of the image side medium of the aspherical surface, and N is the refractive index of the object side medium of the aspherical surface.

In the condition (8), x represents the surface configuration of the aspherical surface, and x0 represents the surface configuration of the reference spherical surface. Specifically, x and x0 are represented by the following expressions (AS) and (RE):

$$x = \{C0 \cdot y^2\}/\{1+\sqrt{(1-\epsilon \cdot C0^2 \cdot y^2)}\} + \Sigma(Ai + y^i) \tag{AS}$$

$$x0 = \{C0 \cdot y^2\}/\{1+\sqrt{(1-C0^2 \cdot y^2)}\} \tag{RE}$$

In the expressions (AS) and (RE), y is the height in a direction perpendicular to the optical axis, $\epsilon$ is the conic constant, and Ai is the ith aspherical coefficient.

The condition (8) expresses the degree of effect of the aspherical surface provided in the camera shake compensating lens unit. When the upper limit of the condition (8) is exceeded, the effect of the aspherical surface of the camera shake compensating lens unit hardly shows up. That is, it is difficult to restrain the generation of aberrations at the time of camera shake compensation through the use of the aspherical surface of the camera shake compensating lens unit. When less than the lower limit of condition (8), the effect of the aspherical surface of the camera shake compensating lens unit is too strong, so that it is difficult to restrain the extremely large aberrations generated there by use of another elements. As a result, satisfactory optical performance cannot be obtained.

When a lens unit is moved in a direction perpendicular to the optical axis for camera shake compensation, in a camera shake compensated state (post-decentering state), light passes through a portion where no light passes in normal state (pre-decentering state). There is a possibility that this light becomes harmful light to degrade imaging performance. For this reason, it is desired to intercept the harmful light at the time of camera shake compensation by providing a stationary diaphragm on the object side of the camera shake compensating lens unit, in the camera shake compensating lens unit or on the image side of the camera shake compensating lens unit. Thereby, excellent imaging performance is obtained also in camera shake compensated state.

While the lens units constituting the first to eighth embodiments comprise only refractive lens elements that deflect incident light through refraction, the present invention is not limited thereto. For example, the lens units may comprise diffractive lens elements that deflect incident light through diffraction or diffraction-refraction hybrid lens elements that deflect incident light through a combination of diffraction and refraction.

The zoom lens systems having a camera shake compensating function according to the present invention will be more concretely shown with reference to construction data and aberration representations. Tables 1 to 8 show the construction data of the first to eighth embodiments. In the tables, ri (i=1,2,3, . . . ) represents the radius of curvature of an ith surface counted from the object side, di (i=1,2,3, . . . ) represents an ith axial distance counted from the object side (here, the axial distances in the pre-decentering state are shown). The axial distances (variable distances) which vary during zooming are actual distances among the lens units at the shortest focal length condition [W], at the middle focal length condition [M] and at the longest focal length condition [T]. Ni (i=1,2,3, . . . ) and vi (i=1,2,3, . . . ) represent the refractive index (Nd) and the Abbe number (υd) to the d-line of an ith lens counted from the object side. The focal lengths f and the F-numbers FNO of the entire lens system at the focal length conditions [W], [M] and [T] and F numbers FNO are shown together with the construction data.

The surfaces marked with asterisks at the radii of curvature ri are aspherical and defined by the following expression (AS') representing the surface configuration of an aspherical surface:

$$X = (C \cdot Y^2)/\{1+\sqrt{(1-\epsilon \cdot Y^2 \cdot C^2)}\} + \Sigma(Ai \cdot Y^i) \tag{AS'}$$

In the expression (AS'),

X is the amount of displacement from a reference surface in the direction of the optical axis;

Y is the height in a direction perpendicular to the optical axis;

C is the paraxial curvature;

$\epsilon$ is the conic constant; and

Ai is the ith aspherical coefficient.

Aspherical surface data are shown in Tables 1 to 8 together with the construction data of the first to eighth embodiments. Tables 9 to 12 show corresponding data of the conditions and associated data with respect to the first to fourth embodiments. With respect to the fifth to eighth embodiments, corresponding values of the condition (8) associated with the aspherical surface {here, ymax is the maximum height (maximum effective aperture) of the aspherical surface in a direction perpendicular to the optical axis} are shown in Tables 5 to 8 together with the construction data of the fifth to eighth embodiments. Tables 13 to 16 show corresponding data of the conditions and associated data with respect to the fifth to eighth embodiments.

FIGS. 5A to 5I, 6A to 6I, 7A to 7F, 8A to 8I and 9A to 9I show aberration performance of the first to fourth embodiments in pre-decentering state (normal state). FIGS. 5A to 5I are graphic representations of longitudinal aberrations of the first embodiment in a pre-decentering state and in an infinity shooting state. FIGS. 6A to 6I are graphic representations of longitudinal aberrations of the second embodiment in a pre-decentering state and in an infinity shooting state. FIGS. 7A to 7F are graphic representations of longitudinal aberrations of the second embodiment in a pre-decentering state and in close shooting state (shooting distance 50 cm). FIGS. 8A to 8I are graphic representations of longitudinal aberrations of the third embodiment in pre-decentering state and in an infinity shooting state. FIGS. 9A to 9I are graphic representations of longitudinal aberrations of the fourth embodiment in a pre-decentering and in an infinity shooting state.

FIGS. 5A to 5C, 6A to 6C, 7A to 7C, 8A to 8C and 9A to 9C show aberrations in the normal state at the shortest focal length condition [W]. FIGS. 5D to 5F, 6D to 6F, 8D to 8F and 9D to 9F show aberrations in the normal state at the middle focal length condition [M]. FIGS. 5G to 5I, 6G to 6I, 7D to 7F, 8G to 8I and 9G to 9I show aberrations in the normal state at the longest focal length condition [T].

FIGS. 5A, 5D, 5G, 6A, 6D, 6G, 7A, 7D, 8A, 8D, 8G, 9A, 9D and 9G show spherical aberration and sine condition. The solid line d represents aberration to the d-line. The broken line SC represents sine condition. FIGS. 5B, 5E, 5H, 6B, 6E, 6H, 7B, 7E, 8B, 8E, 8H, 9B, 9E and 9H show astigmatism (Y' represents the image height). The broken line DM and the solid line DS represent astigmatisms to the d-line on the meridional image plane and on the sagittal image plane, respectively. FIGS. 5C, 5F, 5I, 6C, 6F, 6I, 7C, 7F, 8C, 8F, 8I, 9C, 9F and 9I show distortion (Y' represents the image height).

FIGS. 10A to 10E, 11A to 11E, 12A to 12E, 13A to 13E, 14A to 14E, 15A to 15E, 16A to 16E, 17A to 17E, 18A to 18E, 19A to 19E, 20A to 20E and 21A to 21E show aberration performance of the embodiments in a pre-decentering state (normal state) and post-decentering state (camera shake compensated state). These are graphic representations of lateral aberrations of the embodiments in a pre- and post-decentering states, in an infinity shooting state and on the meridional image plane. FIGS. 10A to 10E, 11A to 11E and 12A to 12E correspond to the first embodiment. FIGS. 13A to 13E, 14A to 14E and 15A to 15E correspond to the second embodiment. FIGS. 16A to 16E, 17A to 17E and 18A to 18E correspond to the third embodiment. FIGS. 19A to 19E, 20A to 20E and 21A to 21E correspond to the fourth embodiment.

FIGS. 10A to 10E, 13A to 13E, 16A to 16E and 19A to 19E correspond to the shortest focal length condition [W]. FIGS. 11A to 11E, 14A to 14E, 17A to 17E and 20A to 20E correspond to the middle focal length condition [M]. FIGS. 12A to 12E, 15A to 15E, 18A to 18E and 21A to 21E correspond to the longest focal length condition [T]. FIGS. 10A to 10C, 11A to 11C, 12A to 12C, 13A to 13C, 14A to 14C, 15A to 15C, 16A to 16C, 17A to 17C, 18A to 18C, 19A to 19C, 20A to 20C and 21A to 21C are graphic representations of lateral aberrations at image heights Y' of +12, 0 and −12 in a camera shake compensated state of 0.7 degrees (compensated state with a camera shake compensation angle θ of the camera shake compensating lens unit of 0.7 degrees (=0.0122173 rad)). FIGS. 10D, 10E, 10D, 11E, 12D, 12E, 13D, 13E, 14D, 14E, 15D, 15E, 16D, 16E, 17D, 17E, 18D, 18E, 19D, 19E, 20D, 20E, 21D and 21E are graphic representations of lateral aberrations in the normal state at the image heights Y' of +12 and 0.

FIGS. 26A to 26I, 27A to 27F, 28A to 28I, 29A to 29F, 30A to 30I, 31A to 31F, 32A to 32I and 33A to 33F show aberration performance of the fifth to eighth embodiments in a pre-decentering state (normal state). FIGS. 26A to 26I, 28A to 28I, 30A to 30I and 32A to 32I are graphic representations of longitudinal aberrations of the embodiments in a pre-decentering state and in infinity shooting state. FIGS. 27A to 27F, 29A to 29F, 31A to 31F and 33A to 33F are graphic representations of longitudinal aberrations of the embodiments in a pre-decentering state and in close shooting state (shooting distance 50 cm).

FIGS. 26A to 26C, 27A to 27C, 28A to 28C, 29A to 29C, 30A to 30C, 31A to 31C, 32A to 32C and 33A to 33C show aberrations in the normal state at the shortest focal length condition [W]. FIGS. 26D to 26F, 28D to 28F, 30D to 30F and 32D to 32F show aberrations in the normal state at the middle focal length condition [M]. FIGS. 26G to 26I, 27D to 27F, 28G to 28I, 29D to 29F, 30G to 30I, 31D to 31F, 32G to 32I and 33D to 33F show aberrations in the normal state at the longest focal length condition [T].

FIGS. 26A, 26D, 26G, 27A, 27D, 28A, 28D, 28G, 29A, 29D, 30A, 30D, 30G, 31A, 31D, 32A, 32D, 32G, 33A and 33D show spherical aberration and sine condition. The solid line d represents aberration to the d-line. The broken line SC represents sine condition. FIGS. 26B, 26E, 26H, 27B, 27E, 28B, 28E, 28H, 29B, 29E, 30B, 30E, 30H, 31B, 31E, 32B, 32E, 32H, 33B and 33E show astigmatism (Y' represents the image height). The broken line DM and the solid line DS represent astigmatisms to the d-line on the meridional image plane and on the sagittal image plane. FIGS. 26C, 26F, 26I, 27C, 27F, 28C, 28F, 28I, 29C, 29F, 30C, 30F, 30I, 31C, 31F, 32C, 32F, 32I, 33C and 33F show distortion (Y' represents the image height).

FIGS. 34A to 34E, 35A to 35E, 36A to 36E, 37A to 37E, 38A to 38E, 39A to 39E, 40A to 40E, 41A to 41E, 42A to 42E, 43A to 43E, 44A to 44E and 45A to 45E show aberration performance of the embodiments in a pre-decentering state (normal state) and post-decentering state (camera shake compensated state). These are graphic representations of lateral aberrations of the embodiments in a pre- and post-decentering state, in an infinity shooting state and on the meridional image plane. FIGS. 34A to 34E, 35A to 35E and 36A to 36E correspond to the first embodiment. FIGS. 37A to 37E, 38A to 38E and 39A to 39E correspond to the second embodiment. FIGS. 40A to 40E, 41A to 41E, 42A to 42E correspond to the third embodiment. FIGS. 43A to 43E, 44A to 44E, 45A to 45E correspond to the fourth embodiment.

FIGS. 34A to 34E, 37A to 37E, 40A to 40E and 43A to 43E correspond to the shortest focal length condition [W]. FIGS. 35A to 35E, 38A to 38E, 41A to 41E and 44A to 44E correspond to the middle focal length condition [M]. FIGS. 36A to 36E, 39A to 39E, 42A to 42E and 45A to 45E correspond to the longest focal length condition [T]. FIGS. 34A to 34C, 35A to 35C, 36A to 36C, 37A to 37C, 38A to 38C, 39A to 39C, 40A to 40C, 41A to 41C, 42A to 42C, 43A to 43C, 44A to 44C and 45A to 45C are graphic representations of lateral aberrations at the image heights Y' of +12, 0 and −12 in a camera shake compensated state of 0.7 degrees {compensated state with a camera shake compensation angle θ of the camera shake compensating lens unit of 0.7 degrees (=0.0122173 rad)}. FIGS. 34D, 34E, 35D, 35E, 36D, 36E, 37D, 37E, 38D, 38E, 39D, 39E, 40D, 40E, 41D, 41E, 42D, 42E, 43D, 43E, 44D, 44E, 45D and 45E are graphic representations of lateral aberrations in the normal state at the image heights Y' of +12 and 0.

Figure 46:
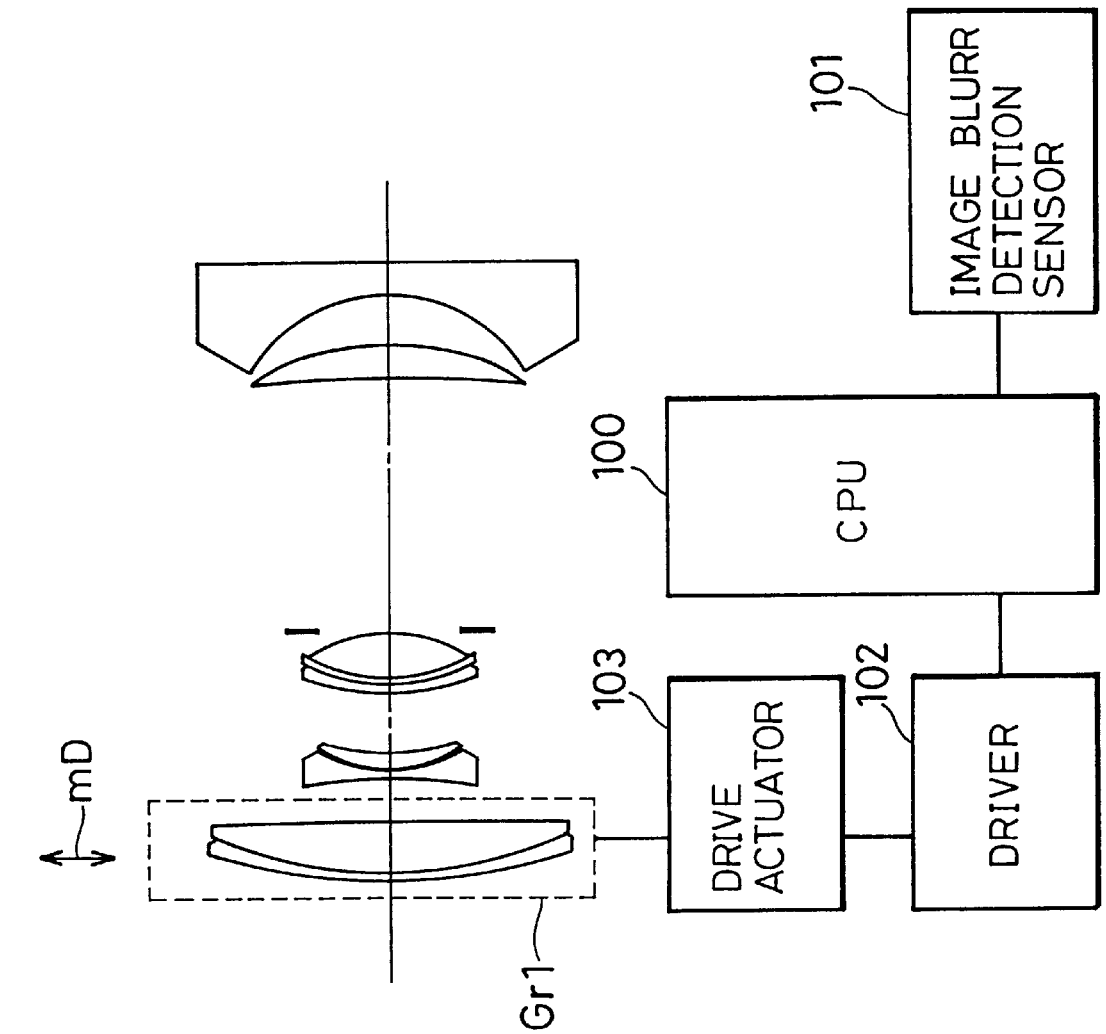
FIG. 46 is a block diagram showing a control arrangement for moving a camera shake compensating lens unit of the first embodiment.

FIG. 46 is a block diagram showing a control arrangement for moving the camera shake compensating lens unit of the first embodiment. An image blur detection sensor 101 provided in the lens device or separately therefrom detects the amount of the camera shake that occurs and the direction of the camera shake. The detected camera shake information is inputted to a CPU 100 and outputted to a driver 102 as a control signal representative of the drive amount and direction of a drive actuator 103. The driver 102 causes the drive actuator 103 to generate drive pulses based on the control signal outputted from the CPU. The drive actuator 103 moves the camera shake compensating lens unit by a predetermined amount in a predetermined direction perpendicular to the optical axis based on the drive pulses to perform camera shake compensation.

As the drive actuator 103, a general stepping motor or a piezoelectric actuator using a PZT element may be used.

TABLE 1

<1st Embodiment(positive. positive. negative)>
f = 30.60~100.01~147.02
FNO = 3.60~7.84~10.46

| Radius of Curvature | Axial Distance | Refractive Index | Abbe Number |
|---|---|---|---|
| r1 = 36.702 | | | |
| | d1 = 0.500 | N1 = 1.83350 | ν1 = 21.00 |
| r2 = 28.755 | | | |
| | d2 = 0.100 | | |
| r3 = 28.584 | | | |
| | d3 = 3.316 | N2 = 1.51728 | ν2 = 69.43 |
| r4 = 1356.061 | | | |
| | d4 = 3.000~28.553~33.300 | | |
| r5* = −48.624 | | | |
| | d5 = 0.500 | N3 = 1.76683 | ν3 = 49.47 |
| r6 = 9.940 | | | |
| | d6 = 0.100 | | |
| r7 = 8.656 | | | |
| | d7 = 1.132 | N4 = 1.83350 | ν4 = 21.00 |
| r8* = 15.223 | | | |
| | d8 = 4.114 | | |
| r9 = 16.925 | | | |
| | d9 = 0.500 | N5 = 1.83350 | ν5 = 21.00 |
| r10 = 10.728 | | | |
| | d10 = 0.533 | N6 = 1.51400 | ν6 = 42.83 |
| r11 = 10.728 | | | |
| | d11 = 3.025 | N7 = 1.51178 | ν7 = 69.07 |
| r12* = −10.238 | | | |
| | d12 = 0.100 | | |
| r13 = ∞(Diaphragm S) | | | |
| | d13 = 17.070~4.792~2.200 | | |
| r14* = −74.419 | | | |
| | d14 = 2.107 | N8 = 1.62017 | ν8 = 24.01 |
| r15* = −24.171 | | | |
| | d15 = 3.551 | | |
| r16 = −10.685 | | | |
| | d16 = 2.307 | N9 = 1.77250 | ν9 = 49.77 |
| r17 = −474.422 | | | |

[Aspherical Surface Data]

r5:   ε = 1.0000
      A4 = −0.15537700 × 10$^{-3}$
      A6 = 0.44995300 × 10$^{-5}$
      A8 = −0.34199600 × 10$^{-6}$
      A10 = 0.11214000 × 10$^{-7}$
      A12 = −0.14477500 × 10$^{-9}$
r8:   ε = 1.0000
      A4 = 0.62017400 × 10$^{-4}$
      A6 = 0.82356000 × 10$^{-5}$
      A8 = −0.48991100 × 10$^{-6}$
      A10 = 0.20389700 × 10$^{-7}$
      A12 = −0.31625200 × 10$^{-9}$
r12:  ε = 1.0000
      A4 = 0.71434100 × 10$^{-4}$
      A6 = −0.16501200 × 10$^{-5}$
      A8 = 0.15644200 × 10$^{-6}$
      A10 = −0.58324700 × 10$^{-8}$
      A12 = 0.93172100 × 10$^{-10}$
r14:  ε = 1.0000
      A4 = 0.10155200 × 10$^{-3}$
      A6 = −0.31807400 × 10$^{-5}$
      A8 = 0.38859300 × 10$^{-7}$
      A10 = 0.44125900 × 10$^{-10}$
      A12 = −0.23096100 × 10$^{-11}$
r15:  ε = 1.0000
      A4 = 0.24704400 × 10$^{-4}$
      A6 = −0.28118100 × 10$^{-5}$
      A8 = 0.12278600 × 10$^{-7}$
      A10 = 0.40472500 × 10$^{-9}$
      A12 = −0.41997900 × 10$^{-11}$

TABLE 2

<2nd Embodiment(positive. positive. negative)>
f = 25.53~66.98~125.31
FNO = 5.60~8.00~12.00

| Radius of Curvature | Axial Distance | Refractive Index | Abbe Number |
|---|---|---|---|
| r1 = 33.770 | | | |
| | d1 = 0.800 | N1 = 1.83350 | ν1 = 21.00 |
| r2 = 25.578 | | | |
| | d2 = 0.010 | | |
| r3 = 25.578 | | | |
| | d3 = 2.727 | N2 = 1.51728 | ν2 = 69.43 |
| r4 = −139.639 | | | |
| | d4 = 2.500~10.310~16.365 | | |
| r5* = −33.359 | | | |
| | d5 = 0.800 | N3 = 1.76683 | ν3 = 49.47 |
| r6* = 12.806 | | | |
| | d6 = 2.558 | | |
| r7 = 15.516 | | | |
| | d7 = 0.859 | N4 = 1.83350 | ν4 = 21.00 |
| r8 = 38.187 | | | |
| | d8 = 0.609 | | |
| r9 = ∞(Diaphragm S) | | | |
| | d9 = 5.240 | | |
| r10 = 15.311 | | | |
| | d10 = 1.551 | N5 = 1.83350 | ν5 = 21.00 |
| r11 = 9.769 | | | |
| | d11 = 0.010 | N6 = 1.51400 | ν6 = 42.83 |
| r12 = 9.769 | | | |
| | d12 = 3.876 | N7 = 1.51178 | ν7 = 69.07 |
| r13* = −12.546 | | | |
| | d13 = 15.368~5.843~2.300 | | |
| r14* = −27.048 | | | |
| | d14 = 2.452 | N8 = 1.62017 | ν8 = 24.01 |
| r15 = −14.785 | | | |
| | d15 = 2.340 | | |
| r16 = −10.637 | | | |
| | d16 = 0.800 | N9 = 1.77250 | ν9 = 49.77 |
| r17 = −2369.893 | | | |

[Aspherical Surface Data]

r5:   ε = 1.0000
      A4 = −0.10868285 × 10$^{-4}$
      A6 = 0.28910529 × 10$^{-6}$
      A8 = 0.26449104 × 10$^{-7}$
      A10 = −0.42262135 × 10$^{-8}$
      A12 = 0.98849141 × 10$^{-10}$
r6:   ε = 1.0000
      A4 = 0.47587406 × 10$^{-4}$
      A6 = 0.21473903 × 10$^{-5}$
      A8 = −0.68938651 × 10$^{-7}$
      A10 = 0.69010349 × 10$^{-9}$
      A12 = −0.25157101 × 10$^{-10}$
r13:  ε = 2.8526
      A4 = 0.24384073 × 10$^{-3}$
      A6 = 0.26251544 × 10$^{-6}$
      A8 = 0.87235643 × 10$^{-7}$
      A10 = −0.16829451 × 10$^{-8}$
      A12 = 0.29027360 × 10$^{-10}$
r14:  ε = 1.0000
      A4 = 0.73257789 × 10$^{-4}$
      A6 = −0.11587798 × 10$^{-5}$
      A8 = 0.34424973 × 10$^{-7}$
      A10 = −0.40963738 × 10$^{-9}$
      A12 = 0.21782551 × 10$^{-11}$

TABLE 3

<3rd Embodiment(positive. negative. positive. negative)>
f = 30.60~80.00~175.01
FNO = 4.50~7.00~10.00

| Radius of Curvature | Axial Distance | Refractive Index | Abbe Number |
|---|---|---|---|

TABLE 3-continued

| Radius of Curvature | Axial Distance | Refractive Index | Abbe Number |
|---|---|---|---|
| r1 = 34.273 | | | |
| | d1 = 0.700 | N1 = 1.83350 | ν1 = 21.00 |
| r2 = 28.442 | | | |
| | d2 = 0.100 | | |
| r3 = 29.894 | | | |
| | d3 = 2.061 | N2 = 1.51728 | ν2 = 69.43 |
| r4 = 171.771 | | | |
| | d4 = 3.000~23.849~36.498 | | |
| r5* = −31.311 | | | |
| | d5 = 0.600 | N3 = 1.76683 | ν3 = 49.47 |
| r6 = 27.105 | | | |
| | d6 = 0.167 | | |
| r7 = 22.254 | | | |
| | d7 = 1.176 | N4 = 1.83350 | ν4 = 21.00 |
| r8 = 51.280 | | | |
| | d8 = 11.705~5.864~0.995 | | |
| r9 = ∞(Diaphragm S) | | | |
| | d9 = 0.000 | | |
| r10 = 13.944 | | | |
| | d10 = 1.511 | N5 = 1.83350 | ν5 = 21.00 |
| r11 = 9.997 | | | |
| | d11 = 0.010 | N6 = 1.51400 | ν6 = 42.83 |
| r12 = 9.997 | | | |
| | d12 = 4.575 | N7 = 1.51178 | ν7 = 69.07 |
| r13* = −21.549 | | | |
| | d13 = 16.555~7.481~2.391 | | |
| r14* = −66.305 | | | |
| | d14 = 3.208 | N8 = 1.62017 | ν8 = 24.01 |
| r15* = −18.896 | | | |
| | d15 = 2.854 | | |
| r16 = −11.684 | | | |
| | d16 = 1.382 | N9 = 1.77250 | ν9 = 49.77 |
| r17 = 274.478 | | | |

[Aspherical Surface Data]

r5:  $\epsilon = 1.0000$
  $A4 = -0.59078219 \times 10^{-5}$
  $A6 = -0.51450836 \times 10^{-6}$
  $A8 = 0.19981466 \times 10^{-7}$
  $A10 = -0.42076893 \times 10^{-9}$
  $A12 = 0.31528363 \times 10^{-11}$
r13:  $\epsilon = 1.0000$
  $A4 = 0.78349313 \times 10^{-4}$
  $A6 = -0.56257891 \times 10^{-6}$
  $A8 = 0.35836035 \times 10^{-7}$
  $A10 = -0.87032562 \times 10^{-9}$
  $A12 = 0.72044529 \times 10^{-11}$
r14:  $\epsilon = 1.0000$
  $A4 = 0.38518931 \times 10^{-4}$
  $A6 = 0.11771604 \times 10^{-5}$
  $A8 = -0.94765437 \times 10^{-8}$
  $A10 = 0.19997586 \times 10^{-10}$
  $A12 = 0.20006918 \times 10^{-12}$
r15:  $\epsilon = 1.0000$
  $A4 = -0.29989415 \times 10^{-5}$
  $A6 = 0.86176806 \times 10^{-6}$
  $A8 = -0.93933529 \times 10^{-9}$
  $A10 = -0.58262325 \times 10^{-10}$
  $A12 = 0.18420759 \times 10^{-12}$

TABLE 4

<4th Embodiment(positive.negative.positive.positive.negative)>
f = 22.50~70.00~125.99
FNO = 5.76~7.40~10.20

| Radius of Curvature | Axial Distance | Refractive Index | Abbe Number |
|---|---|---|---|
| r1 = 16.882 | | | |
| | d1 = 1.035 | N1 = 1.84666 | ν1 = 23.82 |
| r2 = 13.522 | | | |
| | d2 = 0.100 | | |
| r3 = 13.546 | | | |

TABLE 4-continued

| Radius of Curvature | Axial Distance | Refractive Index | Abbe Number |
|---|---|---|---|
| | d3 = 2.800 | N2 = 1.48749 | ν2 = 70.44 |
| r4 = 425.035 | | | |
| | d4 = 1.200~11.693~15.396 | | |
| r5* = −19.719 | | | |
| | d5 = 0.700 | N3 = 1.77250 | ν3 = 49.77 |
| r6 = 9.816 | | | |
| | d6 = 1.000 | | |
| r7 = 10.753 | | | |
| | d7 = 1.500 | N4 = 1.84666 | ν4 = 23.82 |
| r8 = 21.081 | | | |
| | d8 = 5.933~3.778~0.650 | | |
| r9 = ∞(Diaphragm S) | | | |
| | d9 = 0.100 | | |
| r10 = 6.606 | | | |
| | d10 = 4.000 | N5 = 1.48749 | ν5 = 70.44 |
| r11 = −27.810 | | | |
| | d11 = 0.100 | | |
| r12* = −50.851 | | | |
| | d12 = 0.700 | N6 = 1.83400 | ν6 = 37.05 |
| r13* = 18.403 | | | |
| | d13 = 0.600~1.000~3.343 | | |
| r14 = 14.339 | | | |
| | d14 = 2.500 | N7 = 1.48749 | ν7 = 70.44 |
| r15 = −16.142 | | | |
| | d15 = 0.800 | N8 = 1.84666 | ν8 = 23.82 |
| r16 = −17.041 | | | |
| | d16 = 8.852~2.161~0.500 | | |
| r17* = −29.788 | | | |
| | d17 = 1.869 | N9 = 1.62017 | ν9 = 24.01 |
| r18* = −13.620 | | | |
| | d18 = 0.913 | | |
| r19 = −8.487 | | | |
| | d19 = 0.800 | N10 = 1.75450 | ν10 = 51.57 |
| r20 = ∞ | | | |

[Aspherical Surface Data]

r5:  $\epsilon = 1.0000$
  $A4 = 0.90376801 \times 10^{-4}$
  $A6 = 0.12111685 \times 10^{-5}$
  $A8 = -0.85278455 \times 10^{-7}$
  $A10 = 0.10017306 \times 10^{-8}$
  $A12 = 0.88277917 \times 10^{-11}$
r12:  $\epsilon = 1.0000$
  $A4 = -0.18935486 \times 10^{-3}$
  $A6 = 0.10197060 \times 10^{-4}$
  $A8 = 0.28822309 \times 10^{-6}$
  $A10 = -0.81242791 \times 10^{-8}$
  $A12 = -0.46098802 \times 10^{-9}$
r13:  $\epsilon = 1.0000$
  $A4 = 0.33053025 \times 10^{-3}$
  $A6 = 0.15173234 \times 10^{-4}$
  $A8 = 0.45613634 \times 10^{-6}$
  $A10 = 0.17979169 \times 10^{-7}$
  $A12 = -0.98890535 \times 10^{-9}$
r17:  $\epsilon = 1.0000$
  $A4 = 0.13997589 \times 10^{-4}$
  $A6 = -0.48813118 \times 10^{-5}$
  $A8 = -0.85488854 \times 10^{-8}$
  $A10 = -0.23122921 \times 10^{-9}$
  $A12 = 0.90778378 \times 10^{-11}$
r18:  $\epsilon = 1.0000$
  $A4 = -0.47085192 \times 10^{-4}$
  $A6 = -0.48331952 \times 10^{-5}$
  $A8 = 0.13625932 \times 10^{-7}$
  $A10 = -0.76087395 \times 10^{-9}$
  $A12 = -0.10514686 \times 10^{-11}$

TABLE 5

<5th Embodiment(positive.negative.positive.positive.negative)>
f = 25.00~70.00~122.76
FNO = 5.76~8.00~12.00

| Radius of Curvature | Axial Distance | Refractive Index | Abbe Number |
|---|---|---|---|

TABLE 5-continued

| r1 = 15.569 | | | |
| --- | --- | --- | --- |
| | d1 = 1.000 | N1 = 1.84666 | ν1 = 23.82 |
| r2 = 12.753 | | | |
| | d2 = 0.100 | | |
| r3 = 12.789 | | | |
| | d3 = 2.800 | N2 = 1.48749 | ν2 = 70.44 |
| r4 = 36.531 | | | |
| | d4 = 2.500~12.000~14.900 | | |
| r5* = −25.458 | | | |
| | d5 = 0.700 | N3 = 1.77250 | ν3 = 49.77 |
| r6 = 12.583 | | | |
| | d6 = 1.000 | | |
| r7 = 14.219 | | | |
| | d7 = 1.500 | N4 = 1.84666 | ν4 = 23.82 |
| r8 = 29.112 | | | |
| | d8 = 4.230~3.827~0.650 | | |
| r9 = ∞(Diaphragm S) | | | |
| | d9 = 0.100 | | |
| r10 = 7.417 | | | |
| | d10 = 4.014 | N5 = 1.48749 | ν5 = 70.44 |
| r11 = −19.366 | | | |
| | d11 = 0.100 | | |
| r12* = −63.911 | | | |
| | d12 = 0.700 | N6 = 1.83400 | ν6 = 37.05 |
| r13* = 15.528 | | | |
| | d13 = 0.600~0.400~0.800 | | |
| r14 = 14.101 | | | |
| | d14 = 2.500 | N7 = 1.48749 | ν7 = 70.44 |
| r15 = −21.250 | | | |
| | d15 = 0.800 | N8 = 1.84666 | ν8 = 23.82 |
| r16 = −20.165 | | | |
| | d16 = 8.543~0.924~0.582 | | |
| r17* = 91.162 | | | |
| | d17 = 1.630 | N9 = 1.62017 | ν9 = 24.01 |
| r18* = −51.884 | | | |
| | d18 = 2.885 | | |
| r19 = −9.289 | | | |
| | d19 = 0.800 | N10 = 1.75450 | ν10 = 51.57 |
| r20 = 171.339 | | | |

[Aspherical Surface Data]

```
r5:   ε = 1.0000
      A4 = −0.23226926 × 10⁻⁵
      A6 = 0.24289203 × 10⁻⁵
      A8 = −0.19328866 × 10⁻⁶
      A10 = 0.55259730 × 10⁻⁸
      A12 = −0.59688894 × 10⁻¹⁰
r12:  ε = 1.0000
      A4 = −0.14966353 × 10⁻³
      A6 = 0.28637080 × 10⁻⁵
      A8 = 0.15408591 × 10⁻⁶
      A10 = −0.14391373 × 10⁻⁷
      A12 = 0.36520585 × 10⁻⁹
r13:  ε = 1.0000
      A4 = 0.23828815 × 10⁻³
      A6 = 0.40913268 × 10⁻⁵
      A8 = 0.54738265 × 10⁻⁶
      A10 = −0.25318420 × 10⁻⁷
      A12 = 0.68885480 × 10⁻⁹
r17:  ε = 1.0000
      A4 = 0.88752120 × 10⁻⁴
      A6 = −0.21184436 × 10⁻⁵
      A8 = −0.17095904 × 10⁻⁷
      A10 = 0.22562399 × 10⁻⁹
      A12 = −0.15753558 × 10⁻¹¹
r18:  ε = 1.0000
      A4 = −0.16495778 × 10⁻⁴
      A6 = −0.27860747 × 10⁻⁶
      A8 = −0.97662853 × 10⁻⁷
      A10 = 0.14249911 × 10⁻⁸
      A12 = −0.11663813 × 10⁻¹⁰
```

[Corresponding Values of Condition (8)]

r12:  y = 2.150 = 0.50ymax ... $(|x| − |x0|)/\{CO \cdot (N' − N)\}$ = −0.22005
      y = 2.580 = 0.60ymax ... $(|x| − |x0|)/\{CO \cdot (N' − N)\}$ = −0.43224
      y = 3.010 = 0.70ymax ... $(|x| − |x0|)/\{CO \cdot (N' − N)\}$ = −0.75052
      y = 3.440 = 0.80ymax ... $(|x| − |x0|)/\{CO \cdot (N' − N)\}$ = −1.18992
      y = 3.870 = 0.90ymax ... $(|x| − |x0|)/\{CO \cdot (N' − N)\}$ = −1.75645
      y = 4.300 = 1.00ymax ... $(|x| − |x0|)/\{CO \cdot (N' − N)\}$ = −2.41874
r13:  y = 2.100 = 0.50ymax ... $(|x| − |x0|)/\{CO \cdot (N' − N)\}$ = −0.09598
      y = 2.520 = 0.60ymax ... $(|x| − |x0|)/\{CO \cdot (N' − N)\}$ = −0.21098
      y = 2.940 = 0.70ymax ... $(|x| − |x0|)/\{CO \cdot (N' − N)\}$ = −0.42016
      y = 3.360 = 0.80ymax ... $(|x| − |x0|)/\{CO \cdot (N' − N)\}$ = −0.78075
      y = 3.780 = 0.90ymax ... $(|x| − |x0|)/\{CO \cdot (N' − N)\}$ = −1.38119
      y = 4.200 = 1.00ymax ... $(|x| − |x0|)/\{CO \cdot (N' − N)\}$ = −2.36679

TABLE 6

<6th Embodiment(positive.negative.positive.positive.negative)>
f = 22.50~70.01~125.93
FNO = 5.76~7.40~10.20

| Radius of Curvature | Axial Distance | Refractive Index | Abbe Number |
| --- | --- | --- | --- |
| r1 = 16.526 | | | |
| | d1 = 1.800 | N1 = 1.84666 | ν1 = 23.82 |
| r2 = 12.912 | | | |
| | d2 = 0.100 | | |
| r3 = 12.717 | | | |
| | d3 = 2.800 | N2 = 1.48749 | ν2 = 70.44 |
| r4 = 67.596 | | | |
| | d4 = 1.944~12.000~15.100 | | |
| r5* = −20.414 | | | |
| | d5 = 0.700 | N3 = 1.77250 | ν3 = 49.77 |
| r6 = 10.161 | | | |
| | d6 = 1.000 | | |
| r7 = 12.799 | | | |
| | d7 = 1.500 | N4 = 1.84666 | ν4 = 23.82 |
| r8 = 29.630 | | | |
| | d8 = 5.231~3.906~0.650 | | |
| r9 = ∞(Diaphragm S) | | | |
| | d9 = 0.100 | | |
| r10 = 6.503 | | | |
| | d10 = 4.000 | N5 = 1.48749 | ν5 = 70.44 |
| r11 = −16.627 | | | |
| | d11 = 0.100 | | |
| r12* = −32.767 | | | |
| | d12 = 0.700 | N6 = 1.83400 | ν6 = 37.05 |
| r13* = 21.004 | | | |
| | d13 = 0.600~1.000~1.912 | | |
| r14 = 17.317 | | | |
| | d14 = 2.500 | N7 = 1.48749 | ν7 = 70.44 |
| r15 = −17.899 | | | |
| | d15 = 0.800 | N8 = 1.84666 | ν8 = 23.82 |
| r16 = −18.498 | | | |
| | d16 = 7.907~0.911~0.500 | | |
| r17* = −46.181 | | | |
| | d17 = 1.912 | N9 = 1.62017 | ν9 = 24.01 |
| r18* = −17.056 | | | |
| | d18 = 1.580 | | |
| r19 = −9.031 | | | |
| | d19 = 0.800 | N10 = 1.75450 | ν10 = 51.57 |
| r20 = 167.253 | | | |

[Aspherical Surface Data]

```
r5:   ε = 1.0000
      A4 = 0.10111289 × 10⁻³
      A6 = 0.21505482 × 10⁻⁷
      A8 = −0.87414283 × 10⁻⁷
      A10 = 0.21612691 × 10⁻⁸
      A12 = −0.13584310 × 10⁻¹⁰
r12:  ε = 1.0000
      A4 = −0.14403947 × 10⁻³
      A6 = 0.69288421 × 10⁻⁵
      A8 = 0.20236022 × 10⁻⁶
      A10 = −0.53419421 × 10⁻⁸
      A12 = −0.29533142 × 10⁻⁹
r13:  ε = 1.0000
      A4 = 0.44525941 × 10⁻³
      A6 = 0.13592128 × 10⁻⁴
      A8 = 0.40128381 × 10⁻⁶
```

TABLE 6-continued

```
        A10 = 0.16002588 × 10⁻⁷
        A12 = 0.65528297 × 10⁻¹⁰
r17:    ε = 1.0000
        A4 = 0.84835506 × 10⁻⁴
        A6 = -0.57112122 × 10⁻⁵
        A8 = 0.76284527 × 10⁻⁸
        A10 = 0.10258861 × 10⁻⁸
        A12 = -0.54191954 × 10⁻¹¹
r18:    ε = 1.0000
        A4 = -0.22838633 × 10⁻⁴
        A6 = -0.51555924 × 10⁻⁵
        A8 = 0.41095423 × 10⁻⁷
        A10 = -0.88630934 × 10⁻⁹
        A12 = 0.80173768 × 10⁻¹¹
```

[Corresponding Values of Condition (8)]

r12:  y = 2.150 = 0.50ymax ... (|x| − |x0|)/{C0 · (N' − N)} = −0.09096
      y = 2.580 = 0.60ymax ... (|x| − |x0|)/{C0 · (N' − N)} = −0.15860
      y = 3.010 = 0.70ymax ... (|x| − |x0|)/{C0 · (N' − N)} = −0.22774
      y = 3.440 = 0.80ymax ... (|x| − |x0|)/{C0 · (N' − N)} = −0.26603
      y = 3.870 = 0.90ymax ... (|x| − |x0|)/{C0 · (N' − N)} = −0.24395
      y = 4.300 = 1.00ymax ... (|x| − |x0|)/{C0 · (N' − N)} = −0.20188
r13:  y = 2.100 = 0.50ymax ... (|x| − |x0|)/{C0 · (N' − N)} = −0.25192
      y = 2.520 = 0.60ymax ... (|x| − |x0|)/{C0 · (N' − N)} = −0.56037
      y = 2.940 = 0.70ymax ... (|x| − |x0|)/{C0 · (N' − N)} = −1.13400
      y = 3.360 = 0.80ymax ... (|x| − |x0|)/{C0 · (N' − N)} = −2.15643
      y = 3.780 = 0.90ymax ... (|x| − |x0|)/{C0 · (N' − N)} = −3.93506
      y = 4.200 = 1.00ymax ... (|x| − |x0|)/{C0 · (N' − N)} = −6.98538

TABLE 7

<7th Embodiment(positive.negative.positive.positive.negative)>
f = 22.50~69.90~126.03
FNO = 5.76~7.87~11.30

| Radius of Curvature | Axial Distance | Refractive Index | Abbe Number |
|---|---|---|---|
| r1 = 17.533 | | | |
| | d1 = 1.096 | N1 = 1.84666 | 1 = 23.82 |
| r2 = 14.219 | | | |
| | d2 = 0.100 | | |
| r3 = 14.029 | | | |
| | d3 = 2.800 | N2 = 1.48749 | 2 = 70.44 |
| r4 = 55.170 | | | |
| | d4 = 2.160~11.058~15.100 | | |
| r5* = −25.605 | | | |
| | d5 = 0.700 | N3 = 1.77250 | 3 = 49.77 |
| r6 = 11.135 | | | |
| | d6 = 1.108 | | |
| r7 = 13.804 | | | |
| | d7 = 1.500 | N4 = 1.84666 | 4 = 23.82 |
| r8 = 30.521 | | | |
| | d8 = 5.331~4.522~0.650 | | |
| r9 = ∞(Diaphragm S) | | | |
| | d9 = 0.100 | | |
| r10 = 6.821 | | | |
| | d10 = 4.000 | N5 = 1.48749 | 5 = 70.44 |
| r11 = −22.089 | | | |
| | d11 = 0.143 | | |
| r12* = −46.120 | | | |
| | d12 = 0.700 | N6 = 1.83400 | 6 = 37.05 |
| r13* = 16.617 | | | |
| | d13 = 0.600~1.000~1.466 | | |
| r14 = 15.093 | | | |
| | d14 = 2.500 | N7 = 1.48749 | 7 = 70.44 |
| r15 = −16.432 | | | |
| | d15 = 0.800 | N8 = 1.84666 | 8 = 23.82 |
| r16 = −16.676 | | | |
| | d16 = 7.807~0.460~0.500 | | |
| r17* = 102.531 | | | |
| | d17 = 1.848 | N9 = 1.62017 | 9 = 24.01 |
| r18* = −41.705 | | | |
| | d18 = 2.408 | | |
| r19 = −8.920 | | | |
| | d19 = 0.800 | N10 = 1.75450 | 10 = 51.57 |
| r20 = 131.414 | | | |

[Aspherical Surface Data]

```
r5:     ε = 1.0000
        A4 = 0.44102260 × 10⁻⁴
        A6 = 0.13060845 × 10⁻⁵
        A8 = -0.12149621 × 10⁻⁶
        A10 = 0.31977675 × 10⁻⁸
        A12 = -0.30665015 × 10⁻¹⁰
r12:    ε = 1.0000
        A4 = -0.11014643 × 10⁻³
        A6 = 0.36957163 × 10⁻⁵
        A8 = 0.34919248 × 10⁻⁶
        A10 = -0.15077736 × 10⁻⁷
        A12 = 0.99586085 × 10⁻¹⁰
r13:    ε = 1.0000
        A4 = 0.33602127 × 10⁻³
        A6 = 0.11652681 × 10⁻⁴
        A8 = 0.28498565 × 10⁻⁶
        A10 = 0.23550255 × 10⁻⁸
        A12 = 0.15881534 × 10⁻⁹
r17:    ε = 1.0000
        A4 = -0.12540073 × 10⁻⁴
        A6 = -0.38323764 × 10⁻⁵
        A8 = 0.48272704 × 10⁻⁸
        A10 = 0.18319485 × 10⁻¹⁰
        A12 = 0.27778381 × 10⁻¹¹
r18:    ε = 1.0000
        A4 = -0.11335230 × 10⁻³
        A6 = -0.36221525 × 10⁻⁵
        A8 = 0.16449921 × 10⁻⁸
        A10 = -0.33786813 × 10⁻⁹
        A12 = 0.98664015 × 10⁻¹²
```

[Corresponding Values of Condition(8)]

r12:  y = 2.150 = 0.50ymax ... (|x| − |x0|)/{C0 · (N' − N)} = −0.10285
      y = 2.580 = 0.60ymax ... (|x| − |x0|)/{C0 · (N' − N)} = −0.18211
      y = 3.010 = 0.70ymax ... (|x| − |x0|)/{C0 · (N' − N)} = −0.26574
      y = 3.440 = 0.80ymax ... (|x| − |x0|)/{C0 · (N' − N)} = −0.31398
      y = 3.870 = 0.90ymax ... (|x| − |x0|)/{C0 · (N' − N)} = −0.27427
      y = 4.300 = 1.00ymax ... (|x| − |x0|)/{C0 · (N' − N)} = −0.11538
r13:  y = 2.100 = 0.50ymax ... (|x| − |x0|)/{C0 · (N' − N)} = −0.15236
      y = 2.520 = 0.60ymax ... (|x| − |x0|)/{C0 · (N' − N)} = −0.33937
      y = 2.940 = 0.70ymax ... (|x| − |x0|)/{C0 · (N' − N)} = −0.68539
      y = 3.360 = 0.80ymax ... (|x| − |x0|)/{C0 · (N' − N)} = −1.29477
      y = 3.780 = 0.90ymax ... (|x| − |x0|)/{C0 · (N' − N)} = −2.33561
      y = 4.200 = 1.00ymax ... (|x| − |x0|)/{C0 · (N' − N)} = −4.08289

TABLE 8

<8th Embodiment(positive. negative. positive. negative)>
f = 25.00~70.00~123.00
FNO = 5.76~8.00~12.00

| Radius of Curvature | Axial Distance | Refractive Index | Abbe Number |
|---|---|---|---|
| r1 = 16.453 | | | |
| | d1 = 1.000 | N1 = 1.84666 | ν1 = 23.82 |
| r2 = 13.426 | | | |
| | d2 = 0.100 | | |
| r3 = 13.288 | | | |
| | d3 = 2.800 | N2 = 1.48749 | ν2 = 70.44 |
| r4 = 35.077 | | | |
| | d4 = 2.500~11.167~14.900 | | |
| r5* = −26.294 | | | |
| | d5 = 0.700 | N3 = 1.77250 | ν3 = 49.77 |
| r6 = 13.494 | | | |
| | d6 = 1.000 | | |
| r7 = 14.761 | | | |
| | d7 = 1.500 | N4 = 1.84666 | ν4 = 23.82 |

TABLE 8-continued r8 = 29.026
    d8 = 4.416~3.769~0.650
r9 = ∞(Diaphragm S)
    d9 = 0.100
r10 = 7.073
    d10 = 4.000    N5 = 1.48749    ν5 = 70.44
r11 = −24.075
    d11 = 0.100
r12* = −80.795
    d12 = 0.700    N6 = 1.83400    ν6 = 37.05
r13* = 14.859
    d13 = 0.600
r14 = 14.084
    d14 = 2.500    N7 = 1.48749    ν7 = 70.44
r15 = −24.097
    d15 = 0.800    N8 = 1.84666    ν8 = 23.82
r16 = −21.029
    d16 = 8.339~1.182~1.041
r17* = 39.712
    d17 = 1.558    N9 = 1.62017    ν9 = 24.01
r18* = −608.058
    d18 = 2.988
r19 = −9.377
    d19 = 0.800    N10 = 1.75450    ν10 = 51.57
r20 = 158.061

[Aspherical Surface Data]

r5:  ε = 1.0000
     A4 = −0.56466397 × $10^{-5}$
     A6 = 0.23541041 × $10^{-5}$
     A8 = −0.18607380 × $10^{-6}$
     A10 = 0.51965024 × $10^{-8}$
     A12 = −0.54259401 × $10^{-10}$
r12: ε = 1.0000
     A4 = −0.13681632 × $10^{-3}$
     A6 = 0.46347946 × $10^{-5}$
     A8 = 0.21406378 × $10^{-6}$
     A10 = −0.13217151 × $10^{-7}$
     A12 = 0.21490713 × $10^{-9}$
r13: ε = 1.0000
     A4 = 0.26667577 × $10^{-3}$
     A6 = 0.71599621 × $10^{-5}$
     A8 = 0.61486343 × $10^{-6}$
     A10 = −0.26183906 × $10^{-7}$
     A12 = 0.78268536 × $10^{-9}$
r17: ε = 1.0000
     A4 = 0.78470218 × $10^{-4}$
     A6 = −0.35112216 × $10^{-5}$
     A8 = −0.20703399 × $10^{-7}$
     A10 = 0.12008926 × $10^{-9}$
     A12 = 0.12261269 × $10^{-11}$
r18: ε = 1.0000
     A4 = 0.36409028 × $10^{-5}$
     A6 = −0.19544500 × $10^{-5}$
     A8 = −0.11133922 × $10^{-6}$
     A10 = 0.15788545 × $10^{-8}$
     A12 = −0.11258060 × $10^{-10}$

[Corresponding Values of Condition (8)]

r12: y = 2.150 = 0.50ymax . . . (|x| − |x0|)/{C0 · (N' − N)} = −0.23764
     y = 2.580 = 0.60ymax . . . (|x| − |x0|)/{C0 · (N' − N)} = −0.44620
     y = 3.010 = 0.70ymax . . . (|x| − |x0|)/{C0 · (N' − N)} = −0.72421
     y = 3.440 = 0.80ymax . . . (|x| − |x0|)/{C0 · (N' − N)} = −1.04163
     y = 3.870 = 0.90ymax . . . (|x| − |x0|)/{C0 · (N' − N)} = −1.34642
     y = 4.300 = 1.00ymax . . . (|x| − |x0|)/{C0 · (N' − N)} = −1.57190
r13: y = 2.100 = 0.50ymax . . . (|x| − |x0|)/{C0 · (N' − N)} = −0.10681
     y = 2.520 = 0.60ymax . . . (|x| − |x0|)/{C0 · (N' − N)} = −0.23819
     y = 2.940 = 0.70ymax . . . (|x| − |x0|)/{C0 · (N' − N)} = −0.48182
     y = 3.360 = 0.80ymax . . . (|x| − |x0|)/{C0 · (N' − N)} = −0.91042
     y = 3.780 = 0.90ymax . . . (|x| − |x0|)/{C0 · (N' − N)} = −1.63959
     y = 4.200 = 1.00ymax . . . (|x| − |x0|)/{C0 · (N' − N)} = −2.86276

TABLE 9

<<1st Embodiment>>

| Data on Entire Lens System | [W] | [M] | [T] |
|---|---|---|---|
| Focal Length: f | 30.6 | 100.01 | 147.01 |
| Total Length: L | 46.656 | 95.324 | 120.006 |
| Telephoto Ratio L/f | 1.5247059 | 0.9531447 | 0.8163118 |
| Conds. (3), (3') → [T] | | | |
| Back Focus | 4.7 | 40.0942 | 62.6213 |
| βr | 0.3527595 | 1.1530012 | 1.6947841 |
| Conditions | | | |
| (1), (1'): f/βr | 86.744652 | 86.738853 | 86.742614 |
| (2), (2'): Bfw/Yim | | 0.1362319 | |
| (4): ft/fw² × Yim | | 5.4165545 | |

| Data on Lens Units | 1st Lens Unit | 2nd Lens Unit | 3rd Lens Unit |
|---|---|---|---|
| Focal Length | 86.735 | 27.235 | −20.28 |
| Movement Amount | | | |
| [W] → [M] | 48.6676 | 23.115 | 35.3937 |
| [W] → [T] | 73.3504 | 43.0509 | 57.9208 |

TABLE 10

<<2nd Embodiment>>

| Data on Entire Lens System | [W] | [M] | [T] |
|---|---|---|---|
| Focal Length: f | 25.53 | 66.98 | 125.31 |
| Total Length: L | 47.992 | 79.299 | 120.835 |
| Telephoto Ratio L/f | 1.8798277 | 1.1839206 | 0.9642886 |
| Conds. (3), (3') → [T] | | | |
| Back Focus | 5.49093 | 38.51346 | 77.53497 |
| βr | 0.409321 | 1.0741118 | 2.0091396 |
| Conditions | | | |
| (1), (1'): f/βr | 62.371586 | 62.358497 | 62.369982 |
| (2), (2'): Bfw/Yim | | 0.1591574 | |
| (4): ft/fw² × Yim | | 6.6328961 | |

| Data on Lens Units | 1st Lens Unit | 2nd Lens Unit | 3rd Lens Unit |
|---|---|---|---|
| Focal Length | 62.362 | 20.258 | −19.661 |
| Movement Amount | | | |
| [W] → [M] | 31.3072 | 23.4976 | 33.0229 |
| [W] → [T] | 72.8429 | 58.9778 | 72.0453 |

TABLE 11

<<3rd Embodiment>>

| Data on Entire Lens System | [W] | [M] | [T] |
|---|---|---|---|
| Focal Length: f | 30.6 | 80 | 175.01 |
| Total Length: L | 55.881 | 87.004 | 129.104 |
| Telephoto Ratio L/f | 1.8261765 | 1.08755 | 0.737695 |
| Conds. (3), (3') → [T] | | | |
| Back Focus | 6.27947 | 31.46983 | 70.88354 |
| βr | 0.2908616 | 0.7601986 | 1.6630471 |
| Conditions | | | |
| (1), (1'): f/βr | 105.20466 | 105.23565 | 105.23454 |
| (2), (2'): Bfw/Yim | | 0.1820136 | |
| (4): ft/fw² × Yim | | 6.448209 | |

1st Lens    2nd Lens    3rd Lens    4th Lens

TABLE 11-continued

| <<3rd Embodiment>> | | | | |
|---|---|---|---|---|
| Data on Lens Units | Unit | Unit | Unit | Unit |
| Focal Length | 105.226 | −31.637 | 20.138 | −24.107 |
| Movement Amount | | | | |
| [W] → [M] | 31.1237 | 10.2749 | 16.1158 | 25.1894 |
| [W] → [T] | 73.2239 | 39.7262 | 50.4363 | 64.5999 |

TABLE 12

| <<4th Embodiment>> | | | |
|---|---|---|---|
| Data on Entire Lens System | [W] [W] | [M] [M] | [T] [T] |
| Focal Length: f | 22.5 | 70 | 125.99 |
| Total Length: L | 42.5 | 69.998 | 89.994 |
| Telephoto Ratio L/f | 1.8888889 | 0.9999714 | 0.7142948 |
| Conds. (3), (3') → [T] | | | |
| Back Focus | 6.9999 | 32.4508 | 51.1905 |
| $\beta r$ | 0.523783 | 1.6280319 | 2.9287706 |
| Conditions | | | |
| (1), (1'): f/$\beta r$ | 42.956723 | 42.9967 | 43.01805 |
| (2), (2'): Bfw/Yim | | 0.2028957 | |
| (4): ft/fw$^2$ × Yim | | 8.5859852 | |

| Data on Lens Units | 1st Lens Unit | 2nd Lens Unit | 3rd Lens Unit | 4th Lens Unit | 5th Lens Unit |
|---|---|---|---|---|---|
| Focal Length | 43.014 | −13.107 | 24.866 | 16.784 | −15.84 |
| Movement Amount | | | | | |
| [W] → [M] | 27.4977 | 17.0048 | 19.16 | 18.76 | 25.4508 |
| [W] → [T] | 47.4944 | 33.2983 | 38.5808 | 35.8384 | 44.1901 |

TABLE 13

| <<5th Embodiment>> | | | |
|---|---|---|---|
| Data on Entire Lens System | [W] | [M] | [T] |
| Focal Length: f | 24.99 | 70 | 122.76 |
| Total Length: L | 42.4969 | 73.0004 | 93.8889 |
| Telephoto Ratio L/f | 1.70055622 | 1.04286286 | 0.76481672 |
| Conds. (3), (3') → [T] | | | |
| Back Focus | 5.99687 | 35.2218 | 56.3294 |
| $\beta r \times (1 - \beta d)$ | 0.81733939 | 1.88462678 | 2.75690743 |
| Conditions | | | |
| (7): f/{$\beta r \times (1 - \beta d)$} | 30.5748143 | 37.1426325 | 44.5281546 |
| (7):f last/fw | | −0.6467432 | |
| (2), (2'): Bfw/Yim | | 0.17382232 | |
| (4): ft/fw$^2$ × Yim | | 6.78177634 | |

| Data on Lens Units | 1st Lens Unit | 2nd Lens Unit | 3rd Lens Unit | 4th Lens Unit | 5th Lens Unit |
|---|---|---|---|---|---|
| Focal Length | 68.0383192 | −16.818142 | 29.7249255 | 17.2834556 | −16.162112 |
| Movement Amount | | | | | |
| [W] → [M] | 30.503 | 21.003 | 21.4059 | 21.6059 | 29.2244 |
| [W] → [T] | 51.3905 | 38.9905 | 42.5705 | 42.3705 | 50.331 |

TABLE 14

<<6th Embodiment>>

| Data on Entire Lens System | [W] | [M] | [T] |
|---|---|---|---|
| Focal Length: f | 22.5 | 70 | 125.92 |
| Total Length: L | 42.5 | 73.738 | 93.586 |
| Telephoto Ratio L/f | 1.88888889 | 1.0534 | 0.74321792 |
| Conds. (3), (3') → [T] | | | |
| Back Focus | 6.42687 | 35.5298 | 55.032 |
| βr × (1 − βd) | 1.18781885 | 2.67786921 | 3.83881099 |
| Conditions | | | |
| (7): f/{βr × (1 − βd)} | 18.9422823 | 26.1401863 | 32.8018234 |
| (7'):f last/fw | | −0.7077648 | |
| (2), (2'): Bfw/Yim | | 0.18628609 | |
| (4): ft/fw² × Yim | | 8.58121481 | |

| Data on Lens Units | 1st Lens Unit | 2nd Lens Unit | 3rd Lens Unit | 4th Lens Unit | 5th Lens Unit |
|---|---|---|---|---|---|
| Focal Length | 52.9562846 | −13.609627 | 20.7576544 | 19.0623243 | −15.924708 |
| Movement Amount | | | | | |
| [W] → [M] | 31.2382 | 21.1821 | 22.5074 | 22.1074 | 29.1034 |
| [W] → [T] | 51.086 | 37.93 | 42.5107 | 41.1994 | 48.6061 |

TABLE 15

<<7th Embodiment>>

| Data on Entire Lens System | [W] | [M] | [T] |
|---|---|---|---|
| Focal Length: f | 22.5 | 69.9 | 126.02 |
| Total Length: L | 42.5 | 76.011 | 96.199 |
| Telephoto Ratio L/f | 1.88888889 | 1.08742489 | 0.76336296 |
| Conds. (3), (3') → [T] | | | |
| Back Focus | 6.00054 | 38.3708 | 57.8819 |
| βr × (1 − βd) | 0.85143157 | 2.13081125 | 3.01208221 |
| Conditions | | | |
| (7): f/{βr × (1 − βd)} | 26.4260813 | 32.8044073 | 41.8381674 |
| (7'):f last/fw | | −0.6889138 | |
| (2), (2'): Bfw/Yim | | 0.1739287 | |
| (4): ft/fw² × Yim | | 8.58802963 | |

| Data on Lens Units | 1st Lens Unit | 2nd Lens Unit | 3rd Lens Unit | 4th Lens Unit | 5th Lens Unit |
|---|---|---|---|---|---|
| Focal Length | 62.3138374 | −15.784323 | 27.4389073 | 16.8387021 | −15.50056 |
| Movement Amount | | | | | |
| [W] → [M] | 33.5103 | 24.6127 | 25.4221 | 25.0221 | 32.3699 |
| [W] → [T] | 53.6987 | 40.7582 | 45.439 | 44.5739 | 51.8809 |

TABLE 16

<<8th Embodiment>>

| Data on Entire Lens System | [W] | [M] | [T] |
|---|---|---|---|
| Focal Length: f | 25 | 70 | 123 |
| Total Length: L | 42.5 | 73 | 94 |
| Telephoto Ratio L/f | 1.7 | 1.04285714 | 0.76422764 |
| Conds. (3), (3') → [T] | | | |
| Back Focus | 6.27947 | 31.46983 | 70.88354 |
| βr × (1 − βd) | 0.376332 | 0.4431 | 0.535083 |
| Conditions | | | |
| (7): f/{βr × (1 − βd)} | 30.8016867 | 36.26645464 | 43.7949973 |
| (7'):f last/fw | | −0.6326311 | |
| (2), (2'): Bfw/Yim | | 0.18201362 | |
| (4): ft/fw² × Yim | | 6.7896 | |

| Data on Lens Units | 1st Lens Unit | 2nd Lens Unit | 3rd Lens Unit | 4th Lens Unit |
|---|---|---|---|---|
| Focal Length Movement | 76.8846346 | −17.577782 | 13.2518609 | −15.815778 |

TABLE 16-continued

<<8th Embodiment>>

Amount

| | | | | |
|---|---|---|---|---|
| [W] → [M] | 30.5001 | 21.8332 | 22.4803 | 29.6374 |
| [W] → [T] | 51.4999 | 39.0999 | 42.8656 | 50.1638 |

What is claimed is:

1. A zoom lens system comprising:

at least three lens units, including a positive lens unit provided at an object side of said zoom lens system, wherein distances between said lens units are adapted to vary during a zooming operation, wherein said positive lens unit includes a lens element combination having a positive lens element and a negative lens element, said lens element comination is movable in a direction perpendicular to an optical axis of said zoom lens system so as to compensate an image blur caused by vibrating said zoom lens system, and wherein the following condition is fulfilled in all focal length ranges of said zoom lens system;

$$30 < f/\beta r < 120$$

where, f represents a focal length of said zoom lens system, and

βr represents a composite lateral magnification of lens units provided at an image side of said positive lens unit.

2. A zoom lens system as claimed in claim 1, wherein one lens unit of said at least three lens unit is provided at an image side of said positive lens unit via a variable air gap, said one lens unit is movable toward the object side of said zoom lens system during a focusing operation from an object at infinity to a close object.

3. A zoom lens system as claimed in claim 1, wherein the following condition is fulfilled:

$$0.1 < Bfw/Yim < 0.25$$

where,

Bfw represents a back focus at a shortest focal length condition, and

Yim represents an image diagonal length.

4. A zoom lens system as claimed in claim 1, wherein the following condition is fulfilled:

$$0.6 < Lt/f_t < 1.0$$

where,

Lt represents a total length of said zoom lens system at a longest focal length condition, and $f_t$ represents a focal length of said zoom lens system at the longest focal length condition.

5. A zoom lens system as claimed in claim 1, wherein the following condition is fulfilled:

$$4.0 < f_t/f_w^2 \times Yim < 9.0$$

where, $f_t$ represents a focal length of said zoom lens system at a longest focal length condition, $f_w$ represents a focal, length of said zoom lens system at a shortest focal length condition, and Yim represents an image diagonal length.

6. A zoom lens system as claimed in claim 1, wherein the following condition is fulfilled:

$$\nu p > \nu n$$

where,

νp represents an Abbe number of said positive lens element, and

νn represents an Abbe number of said negative lens element.

7. A zoom lens system as claimed in claim 1, wherein said positive lens unit consists of said positive lens element and said negative lens element.

8. A zoom lens system as claimed in claim 1, wherein said positive lens unit constitutes a doublet lens element with said positive lens element and said negative lens element cemented together.

9. A zoom lens system comprising, in order from an object side:

a first lens unit having a positive optical power;

a second lens unit having a negative optical power;

a third lens unit having a positive optical power, said third lens unit including a positive lens element and a negative lens element; and an image side lens unit having a negative optical power, wherein zooming is performed by varying distances between said first, second, third and image side lens units, and wherein said third lens unit moves in a direction perpendicular to an optical axis of said zoom lens system so as to compensate for an image blur caused by vibrating said zoom lens system, wherein the following conditions are fulfilled:

$$8 < f/\{\beta r \times (1-\beta d)\} < 100$$

$$-0.8 < f_{last}/f_w < -0.5$$

where, f represents a focal length of said zoom lens system,

βr represents a composite lateral magnification of lens units provided at an image side of said third lens unit, βd represents a lateral magnification of said third lens unit, $f_{last}$ represents a focal length of said image side lens unit, and $f_w$ represents a focal length of said zoom lens system at a shortest focal length condition.

10. A zoom lens system as claimed in claim 9, wherein said second lens unit is movable toward the object side during a focusing operation from an object at infinity to a close object.

11. A zoom lens system as claimed in claim 9, wherein the following condition is fulfilled:

$$0.1 < Bfw/Yim < 0.25$$

where,

Bfw represents a back focus at a shortest focal length condition, and

Yim represents an image diagonal length.

12. A zoom lens system as claimed in claim 9, wherein the following condition is fulfilled:

$$0.6 < Lt/f_t < 1.0$$

where,

Lt represents a total length of said zoom lens system at a longest focal length condition, and $f_t$ represents a focal length of said zoom lens system at the longest focal length condition.

13. A zoom lens system as claimed in claim 9, wherein the following condition is fulfilled:

$$4.0 < f_t/f_w^2 \times Yim < 9.0$$

where, $f_t$ represents a focal length of said zoom lens system at a longest focal length condition, $f_w$ represents a focal length of said zoom lens system at a shortest focal length condition, and Yim represents an image diagonal length.

14. A zoom lens system as claimed in claim 9, wherein the following condition is fulfilled:

$$vp > vn$$

where, vp represents an Abbe number of said positive lens element, and vn represents an Abbe number of said negative lens element.

15. A zoom lens system comprising, in order from an object side:

a first lens unit having a positive optical power;

a second lens unit having a negative optical power;

a third lens unit having a positive optical power, said third lens unit composing, from the object side, a front lens unit and a rear lens unit, said front lens unit including a positive lens element and a negative lens element, and an image side lens unit having a negative optical power, wherein zooming is performed by varying distances between said first, second, third and image side lens units, wherein said front lens unit moves in a direction perpendicular to an optical axis of said zoom lens system so as to compensate for an image blur caused by vibrating said zoom lens system, and wherein the following conditions are fulfilled:

$$8 < f/\{\beta r(1-d)\} < 100$$

$$-0.8 < f_{last}/f_w < -0.5$$

where, f represents a focal length of the entire zoom lens system,

βr represents a composite lateral magnification of lens units provided at an image side of said front lens unit, βd represents a lateral magnification of said front lens unit, $f_{last}$ represents a focal length of said image side lens unit, and $f_w$ represents a focal length of said zoom lens system at a shortest focal length condition.

16. A zoom lens system as claimed in claim 15, wherein said second lens unit is movable toward the object side during a focusing operation from an object at infinity to a close object.

17. A zoom lens system as claimed in claim 15, wherein the following condition is fulfilled:

$$0.1 < Bfw/Yim < 0.25$$

where,

Bfw represents a back focus at a shortest focal length condition, and

Yim represents an image diagonal length.

18. A zoom lens system as claimed in claim 15, wherein the following condition is fulfilled:

$$0.6 < Lt/f_t < 1.0$$

where,

Lt represents a total length of said zoom lens system at a longest focal length condition, and $f_t$ represents a focal length of said zoom lens system at the longest focal length condition.

19. A zoom lens system as claimed in claim 15, wherein the following condition is fulfilled:

$$4.0 < f_t/f_w^2 \times Yim < 9.0$$

where, $f_t$ represents a focal length of said zoom lens system at a longest focal length condition, $f_w$ represents a focal length of said zoom lens system at a shortest focal length condition, and Yim represents an image diagonal length.

20. A zoom lens system as claimed in claim 15, wherein the following condition is fulfilled:

$$vp > vn$$

where, vp represents an Abbe number of said positive lens element, and vn represents an Abbe number of said negative lens element.

* * * * *

UNITED STATES PATENT AND TRADEMARK OFFICE
CERTIFICATE OF CORRECTION

PATENT NO : 6,081,390
DATED : June 27, 2000
INVENTOR(S) : Kenji Konno

It is certified that error appears in the above-identified patent and that said Letters Patent are hereby corrected as shown below:

On the title page, item: [75] Inventors:, the first line, delete "Sakai", and insert --Sakai-Shi--.

Column 2, line 41, delete "with".

Column 4, line 21, delete "an", and insert --a--.

Column 4, line 54, after "condition", insert --,--.

Column 4, line 58, after "condition", insert --,--.

Column 11, line 49, after "optical", insert --power,--.

Column 13, line 22, delete the first instance of "the", and insert --a--.

Column 33, line 19 (claim 1, line 8), delete "comination", and insert --combination--.

UNITED STATES PATENT AND TRADEMARK OFFICE
CERTIFICATE OF CORRECTION

PATENT NO : 6,081,390
DATED : June 27, 2000
INVENTOR(S) : Kenji Konno

It is certified that error appears in the above-identified patent and that said Letters Patent are hereby corrected as shown below:

Column 33, line 66 (claim 5, line 7), after "focal", delete ",".

Column 35, line 33 (claim 15, line 1), delete "sys tem", and insert --system--.

Column 35, line 41 (claim 15, line 8), after "element", delete ",", and insert --;--.

Column 35, line 51 (claim 15, line 19), delete "8<f/{βr(1-d)}<100", and insert --8<f/{βr(1-βd)}<100--.

Signed and Sealed this

Eighth Day of May, 2001

NICHOLAS P. GODICI

Attest:

Attesting Officer

Acting Director of the United States Patent and Trademark Office